US008684839B2

(12) United States Patent
Mattice et al.

(10) Patent No.: US 8,684,839 B2
(45) Date of Patent: *Apr. 1, 2014

(54) CONTROL OF WAGER-BASED GAME USING GESTURE RECOGNITION

(75) Inventors: Harold E. Mattice, Gardnerville, NV (US); Chan Griswold, Reno, NV (US); James Stockdale, Clio, CA (US); Richard Wilder, Sparks, NV (US); Chris Gadda, Las Vegas, NV (US); Binh Nguyen, Reno, NV (US)

(73) Assignee: IGT, Las Vegas, NV (US)

( * ) Notice: Subject to any disclaimer, the term of this patent is extended or adjusted under 35 U.S.C. 154(b) by 1430 days.

This patent is subject to a terminal disclaimer.

(21) Appl. No.: 11/825,477

(22) Filed: Jul. 6, 2007

(65) Prior Publication Data

US 2007/0259716 A1    Nov. 8, 2007

Related U.S. Application Data

(63) Continuation-in-part of application No. 11/515,183, filed on Sep. 1, 2006, now Pat. No. 8,287,380, and a continuation-in-part of application No. 10/871,068, filed on Jun. 18, 2004, now Pat. No. 7,815,507.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/36; 463/29; 463/37; 463/43

(58) Field of Classification Search
USPC ........................................... 463/36
See application file for complete search history.

(56) References Cited

U.S. PATENT DOCUMENTS 3,662,105 A    5/1972   Hurst et al.
3,697,698 A    10/1972  Oswald et al.
(Continued)

FOREIGN PATENT DOCUMENTS

AU    704691       4/1997
AU    2005265179   1/2011
(Continued)

OTHER PUBLICATIONS

Australian Office Action from Application Serial No. 2005265179, dated Jan. 28, 2010.
(Continued)

*Primary Examiner* — Michael Cuff
*Assistant Examiner* — Kevin Y Kim
(74) *Attorney, Agent, or Firm* — Neal, Gerber & Eisenberg LLP

(57) ABSTRACT

Various techniques are described for controlling a wager-based game played at a gaming system. In one embodiment the gaming system may include a gesture input interface device operable to detect movements gestures associated with one or more persons, and a gesture interpretation component operable to identify selected movements or gestures detected by the gesture input interface device. In at least one embodiment, the gesture interpretation component may also be operable to generate gesture interpretation information relating to interpretation of the selected movements or gestures. In at least one embodiment, the gaming system may be operable to automatically detect a gesture by a player participating in a game session at the gaming system; interpret the gesture with respect to a set of criteria; generate gesture interpretation information relating to the interpretation of the gesture; and advance a state of the game session using at least a portion of the gesture interpretation information. In at least one embodiment, the system may include a handheld device which is operable to perform one or more of the functions relating to gesture recognition and/or interpretation.

57 Claims, 19 Drawing Sheets

(56) References Cited

U.S. PATENT DOCUMENTS

| | | | |
|---|---|---|---|
| 3,724,932 A | 4/1973 | Cornsweet et al. |
| 3,986,030 A | 10/1976 | Teltscher |
| 4,071,689 A | 1/1978 | Talmage et al. |
| 4,072,930 A | 2/1978 | Lucero et al. |
| 4,109,145 A | 8/1978 | Graf |
| 4,283,709 A | 8/1981 | Lucero et al. |
| 4,339,798 A | 7/1982 | Hedges et al. |
| 4,348,696 A | 9/1982 | Beier |
| 4,433,814 A | 2/1984 | Pontes et al. |
| 4,553,222 A | 11/1985 | Kurland et al. |
| 4,595,990 A | 6/1986 | Garwin et al. |
| 4,836,670 A | 6/1989 | Hutchinson |
| 4,837,728 A | 6/1989 | Barrie et al. |
| 4,856,787 A | 8/1989 | Itkis |
| 4,950,069 A | 8/1990 | Hutchinson |
| 4,973,149 A | 11/1990 | Hutchinson |
| 5,033,744 A | 7/1991 | Bridgeman et al. |
| 5,038,022 A | 8/1991 | Lucero |
| 5,042,809 A | 8/1991 | Richardson |
| 5,048,831 A | 9/1991 | Sides |
| 5,059,959 A | 10/1991 | Barry |
| 5,116,055 A | 5/1992 | Tracy |
| 5,179,517 A | 1/1993 | Sarbin et al. |
| 5,280,809 A | 1/1994 | Tive |
| 5,288,078 A | 2/1994 | Capper et al. |
| 5,367,315 A | 11/1994 | Pan |
| 5,371,345 A | 12/1994 | LeStrange et al. |
| 5,429,361 A | 7/1995 | Raven et al. |
| 5,442,168 A | 8/1995 | Gurner et al. |
| 5,470,079 A | 11/1995 | LeStrange et al. |
| 5,517,021 A | 5/1996 | Kaufman et al. |
| 5,536,016 A | 7/1996 | Thompson |
| 5,577,731 A | 11/1996 | Jones |
| 5,605,334 A | 2/1997 | McCrea, Jr. |
| 5,616,078 A | 4/1997 | Oh |
| 5,618,045 A | 4/1997 | Kagan et al. |
| 5,638,826 A | 6/1997 | Wolpaw et al. |
| 5,643,086 A | 7/1997 | Alcorn et al. |
| 5,655,961 A | 8/1997 | Acres et al. |
| 5,702,304 A | 12/1997 | Acres et al. |
| 5,704,836 A | 1/1998 | Norton et al. |
| 5,716,273 A | 2/1998 | Yuen |
| 5,718,632 A | 2/1998 | Hayashi |
| 5,741,183 A | 4/1998 | Acres et al. |
| 5,759,102 A | 6/1998 | Pease et al. |
| 5,761,647 A | 6/1998 | Boushy |
| 5,766,076 A | 6/1998 | Pease et al. |
| 5,768,382 A | 6/1998 | Schneier et al. |
| 5,769,716 A | 6/1998 | Saffari et al. |
| 5,770,533 A | 6/1998 | Franchi |
| 5,779,545 A | 7/1998 | Berg et al. |
| 5,788,573 A | 8/1998 | Baerlocher et al. |
| 5,795,228 A | 8/1998 | Trumbull et al. |
| 5,796,389 A | 8/1998 | Bertram et al. |
| 5,797,085 A | 8/1998 | Beuk et al. |
| 5,803,809 A | 9/1998 | Yoseloff |
| 5,809,482 A | 9/1998 | Strisower |
| 5,811,772 A | 9/1998 | Lucero |
| 5,816,918 A | 10/1998 | Kelly et al. |
| 5,833,536 A | 11/1998 | Davids et al. |
| 5,833,540 A | 11/1998 | Miodunski et al. |
| 5,844,824 A | 12/1998 | Newman et al. |
| 5,851,148 A | 12/1998 | Brune et al. |
| 5,855,515 A | 1/1999 | Pease et al. |
| 5,871,398 A | 2/1999 | Schneier et al. |
| D406,612 S | 3/1999 | Johnson |
| 5,885,158 A | 3/1999 | Torango et al. |
| 5,892,566 A | 4/1999 | Bullwinkel |
| 5,910,048 A | 6/1999 | Feinberg |
| 5,913,727 A | 6/1999 | Ahdoot |
| 5,919,091 A | 7/1999 | Bell et al. |
| 5,951,397 A | 9/1999 | Dickinson |
| 5,954,583 A | 9/1999 | Green |
| 5,957,776 A | 9/1999 | Hoehne |
| 5,967,896 A | 10/1999 | Jorasch et al. |
| 5,971,271 A | 10/1999 | Wynn et al. |
| 5,982,326 A | 11/1999 | Chow et al. |
| 5,984,779 A | 11/1999 | Bridgeman et al. |
| 5,999,808 A | 12/1999 | LaDue |
| 6,001,016 A | 12/1999 | Walker et al. |
| 6,003,013 A | 12/1999 | Boushy et al. |
| 6,003,651 A | 12/1999 | Waller et al. |
| 6,008,800 A | 12/1999 | Pryor |
| 6,010,404 A | 1/2000 | Walker et al. |
| 6,012,832 A | 1/2000 | Saunders et al. |
| 6,012,983 A | 1/2000 | Walker et al. |
| 6,038,666 A | 3/2000 | Hsu et al. |
| 6,048,269 A | 4/2000 | Burns et al. |
| 6,050,895 A | 4/2000 | Luciano, Jr. et al. |
| 6,062,981 A | 5/2000 | Luciano, Jr. et al. |
| 6,068,552 A | 5/2000 | Walker et al. |
| 6,077,163 A | 6/2000 | Walker et al. |
| 6,089,975 A | 7/2000 | Dunn |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker et al. |
| 6,110,043 A | 8/2000 | Olsen |
| 6,113,492 A | 9/2000 | Walker et al. |
| 6,113,493 A | 9/2000 | Walker et al. |
| 6,113,495 A | 9/2000 | Walker et al. |
| 6,135,884 A | 10/2000 | Hedrick et al. |
| 6,135,887 A | 10/2000 | Pease et al. |
| 6,139,431 A | 10/2000 | Walker et al. |
| 6,142,876 A | 11/2000 | Cumbers |
| 6,146,273 A | 11/2000 | Olsen |
| 6,149,522 A | 11/2000 | Alcorn et al. |
| 6,161,059 A | 12/2000 | Tedesco et al. |
| 6,162,121 A | 12/2000 | Morro et al. |
| 6,162,122 A | 12/2000 | Acres et al. |
| 6,168,522 B1 | 1/2001 | Walker et al. |
| 6,174,234 B1 | 1/2001 | Seibert, Jr. et al. |
| 6,182,221 B1 | 1/2001 | Hsu et al. |
| 6,183,362 B1 | 2/2001 | Boushy |
| 6,190,256 B1 | 2/2001 | Walker et al. |
| 6,191,773 B1 | 2/2001 | Maruno et al. |
| 6,210,279 B1 | 4/2001 | Dickinson |
| 6,227,972 B1 | 5/2001 | Walker et al. |
| 6,227,974 B1 | 5/2001 | Eliat et al. |
| 6,234,900 B1 | 5/2001 | Cumbers |
| 6,244,958 B1 | 6/2001 | Acres |
| 6,247,643 B1 | 6/2001 | Lucero |
| 6,253,119 B1 | 6/2001 | Dabrowski |
| 6,264,560 B1 | 7/2001 | Goldberg et al. |
| 6,264,561 B1 | 7/2001 | Saffari et al. |
| 6,267,671 B1 | 7/2001 | Hogan |
| 6,270,410 B1 | 8/2001 | DeMar et al. |
| 6,280,328 B1 | 8/2001 | Holch et al. |
| 6,285,868 B1 | 9/2001 | LaDue |
| 6,293,866 B1 | 9/2001 | Walker et al. |
| 6,302,790 B1 | 10/2001 | Brossard |
| 6,307,956 B1 | 10/2001 | Black |
| 6,313,871 B1 | 11/2001 | Schubert |
| 6,319,125 B1 | 11/2001 | Acres |
| 6,341,353 B1 | 1/2002 | Herman et al. |
| 6,346,044 B1 | 2/2002 | McCrea, Jr. |
| 6,368,216 B1 | 4/2002 | Hedrick et al. |
| 6,371,852 B1 | 4/2002 | Acres |
| 6,379,246 B1 | 4/2002 | Dabrowski |
| 6,383,076 B1 | 5/2002 | Tiedeken |
| 6,409,595 B1 | 6/2002 | Uihlein et al. |
| 6,409,602 B1 | 6/2002 | Wiltshire et al. |
| 6,439,993 B1 | 8/2002 | O'Halloran |
| 6,443,843 B1 | 9/2002 | Walker et al. |
| 6,450,885 B2 | 9/2002 | Schneier et al. |
| 6,471,591 B1 | 10/2002 | Crumby |
| 6,488,585 B1 | 12/2002 | Wells et al. |
| 6,508,710 B1 | 1/2003 | Paravia et al. |
| 6,511,376 B2 | 1/2003 | Walker et al. |
| 6,511,377 B1 | 1/2003 | Weiss |
| 6,519,607 B1 | 2/2003 | Mahoney et al. |
| 6,530,835 B1 | 3/2003 | Walker et al. |
| 6,554,705 B1 | 4/2003 | Cumbers |
| 6,561,903 B2 | 5/2003 | Walker et al. |

| | | |
|---|---|---|
| 6,582,310 B1 | 6/2003 | Walker et al. |
| 6,585,592 B1 | 7/2003 | Crumby |
| 6,599,193 B2 | 7/2003 | Baerlocher et al. |
| 6,607,443 B1 | 8/2003 | Miyamoto et al. |
| 6,611,253 B1 | 8/2003 | Cohen |
| 6,620,047 B1 | 9/2003 | Alcorn et al. |
| 6,624,561 B2 | 9/2003 | Nakamura et al. |
| 6,628,939 B2 | 9/2003 | Paulsen |
| 6,629,890 B2 | 10/2003 | Johnson |
| 6,637,883 B1 | 10/2003 | Tengshe et al. |
| 6,641,484 B2 | 11/2003 | Oles et al. |
| 6,645,077 B2 | 11/2003 | Rowe |
| 6,645,078 B1 | 11/2003 | Mattice |
| 6,650,318 B1 | 11/2003 | Arnon |
| 6,651,985 B2 | 11/2003 | Sines et al. |
| 6,676,522 B2 | 1/2004 | Rowe et al. |
| 6,682,421 B1 | 1/2004 | Rowe et al. |
| 6,685,480 B2 | 2/2004 | Nishimoto et al. |
| 6,685,567 B2 | 2/2004 | Cockerille et al. |
| 6,712,698 B2 | 3/2004 | Paulsen et al. |
| 6,720,949 B1 | 4/2004 | Pryor et al. |
| 6,722,985 B2 | 4/2004 | Criss-Puszkiewicz et al. |
| 6,739,975 B2 | 5/2004 | Nguyen et al. |
| 6,743,097 B2 | 6/2004 | Walker et al. |
| 6,776,715 B2 | 8/2004 | Price |
| 6,783,459 B2 | 8/2004 | Cumbers |
| 6,800,029 B2 | 10/2004 | Rowe et al. |
| 6,804,763 B1 | 10/2004 | Stockdale et al. |
| 6,830,515 B2 | 12/2004 | Rowe |
| 6,846,238 B2 | 1/2005 | Wells |
| 6,852,031 B1 | 2/2005 | Rowe |
| 6,863,608 B1 | 3/2005 | LeMay et al. |
| 6,863,609 B2 | 3/2005 | Okuda et al. |
| 6,866,586 B2 | 3/2005 | Oberberger et al. |
| 6,884,170 B2 | 4/2005 | Rowe |
| 6,908,387 B2 | 6/2005 | Hedrick et al. |
| 6,921,332 B2 | 7/2005 | Fukunaga et al. |
| 6,922,276 B2 | 7/2005 | Zhang et al. |
| 6,939,231 B2 | 9/2005 | Mantyjarvi et al. |
| 6,965,868 B1 | 11/2005 | Bednarek |
| 6,997,807 B2 | 2/2006 | Weiss |
| 7,001,277 B2 | 2/2006 | Walker et al. |
| 7,022,017 B1 | 4/2006 | Halbritter et al. |
| 7,035,626 B1 | 4/2006 | Luciano, Jr. |
| 7,083,518 B2 | 8/2006 | Rowe |
| 7,111,141 B2 | 9/2006 | Nelson |
| 7,112,138 B2 | 9/2006 | Hedrick et al. |
| 7,128,651 B2 | 10/2006 | Miyamoto et al. |
| 7,168,089 B2 | 1/2007 | Nguyen et al. |
| 7,217,190 B2 | 5/2007 | Weiss |
| 7,275,991 B2 | 10/2007 | Burns et al. |
| 7,515,718 B2 | 4/2009 | Nguyen et al. |
| 7,611,407 B1* | 11/2009 | Itkis et al. ............ 463/29 |
| 7,815,507 B2 | 10/2010 | Parrott et al. |
| 7,883,415 B2 | 2/2011 | Larsen et al. |
| 7,942,744 B2 | 5/2011 | Wells |
| 8,287,380 B2 | 10/2012 | Nguyen et al. |
| 2001/0000118 A1 | 4/2001 | Sines et al. |
| 2001/0028147 A1 | 10/2001 | Ornstein et al. |
| 2001/0031663 A1 | 10/2001 | Johnson |
| 2001/0039204 A1 | 11/2001 | Tanskanen |
| 2001/0040572 A1 | 11/2001 | Bradski et al. |
| 2002/0002072 A1 | 1/2002 | Sines et al. |
| 2002/0022518 A1 | 2/2002 | Okuda et al. |
| 2002/0036617 A1 | 3/2002 | Pryor |
| 2002/0042297 A1 | 4/2002 | Torango |
| 2002/0046100 A1 | 4/2002 | Kinjo |
| 2002/0055383 A1 | 5/2002 | Onda et al. |
| 2002/0075240 A1 | 6/2002 | Lieberman et al. |
| 2002/0098888 A1 | 7/2002 | Rowe et al. |
| 2002/0103024 A1 | 8/2002 | Jeffway, Jr. et al. |
| 2002/0103027 A1 | 8/2002 | Rowe et al. |
| 2002/0107066 A1 | 8/2002 | Seelig et al. |
| 2002/0133418 A1 | 9/2002 | Hammond et al. |
| 2002/0142824 A1 | 10/2002 | Kazaoka et al. |
| 2002/0142825 A1 | 10/2002 | Lark et al. |
| 2002/0142844 A1 | 10/2002 | Kerr |
| 2002/0142846 A1 | 10/2002 | Paulsen |
| 2002/0147047 A1 | 10/2002 | Letovsky et al. |
| 2002/0198052 A1 | 12/2002 | Soltys et al. |
| 2003/0003988 A1 | 1/2003 | Walker et al. |
| 2003/0017872 A1 | 1/2003 | Oishi et al. |
| 2003/0027632 A1 | 2/2003 | Sines et al. |
| 2003/0032485 A1 | 2/2003 | Cockerille et al. |
| 2003/0045354 A1 | 3/2003 | Giobbi |
| 2003/0050806 A1 | 3/2003 | Friesen et al. |
| 2003/0054881 A1 | 3/2003 | Hedrick et al. |
| 2003/0069071 A1 | 4/2003 | Britt et al. |
| 2003/0078101 A1 | 4/2003 | Schneider et al. |
| 2003/0078103 A1 | 4/2003 | LeMay et al. |
| 2003/0083132 A1 | 5/2003 | Berg et al. |
| 2003/0083943 A1 | 5/2003 | Adams et al. |
| 2003/0100361 A1 | 5/2003 | Sharpless et al. |
| 2003/0109308 A1 | 6/2003 | Rowe |
| 2003/0148808 A1 | 8/2003 | Price |
| 2003/0148812 A1 | 8/2003 | Paulsen et al. |
| 2003/0162593 A1 | 8/2003 | Griswold |
| 2003/0190944 A1 | 10/2003 | Manfredi |
| 2003/0203756 A1 | 10/2003 | Jackson |
| 2004/0001182 A1 | 1/2004 | Dyner |
| 2004/0002386 A1 | 1/2004 | Wolfe |
| 2004/0027450 A1 | 2/2004 | Yoshino |
| 2004/0029635 A1 | 2/2004 | Giobbi et al. |
| 2004/0043814 A1 | 3/2004 | Angell et al. |
| 2004/0046736 A1 | 3/2004 | Pryor et al. |
| 2004/0053675 A1 | 3/2004 | Nguyen et al. |
| 2004/0063480 A1 | 4/2004 | Wang |
| 2004/0063481 A1 | 4/2004 | Wang |
| 2004/0082385 A1 | 4/2004 | Silva et al. |
| 2004/0085293 A1 | 5/2004 | Soper et al. |
| 2004/0087370 A1 | 5/2004 | Tarantino |
| 2004/0092310 A1 | 5/2004 | Brosnan et al. |
| 2004/0116174 A1 | 6/2004 | Baerlocher et al. |
| 2004/0127277 A1 | 7/2004 | Walker et al. |
| 2004/0147314 A1 | 7/2004 | LeMay et al. |
| 2004/0162139 A1 | 8/2004 | Blanco |
| 2004/0166937 A1* | 8/2004 | Rothschild et al. ............ 463/36 |
| 2004/0189720 A1 | 9/2004 | Wilson et al. |
| 2004/0193413 A1 | 9/2004 | Wilson et al. |
| 2004/0199284 A1 | 10/2004 | Hara |
| 2004/0251630 A1 | 12/2004 | Sines et al. |
| 2004/0254006 A1 | 12/2004 | Lam et al. |
| 2005/0037844 A1 | 2/2005 | Shum et al. |
| 2005/0076242 A1 | 4/2005 | Breuer |
| 2005/0143169 A1 | 6/2005 | Nguyen et al. |
| 2005/0212753 A1 | 9/2005 | Marvit et al. |
| 2005/0255911 A1 | 11/2005 | Nguyen et al. |
| 2005/0255922 A1 | 11/2005 | Nguyen et al. |
| 2005/0261059 A1 | 11/2005 | Nguyen et al. |
| 2005/0261060 A1 | 11/2005 | Nguyen et al. |
| 2005/0261061 A1 | 11/2005 | Nguyen et al. |
| 2005/0273815 A1 | 12/2005 | Orr et al. |
| 2005/0282603 A1* | 12/2005 | Parrott et al. ............ 463/1 |
| 2006/0018942 A1 | 1/2006 | Rowe et al. |
| 2006/0040730 A1 | 2/2006 | Walker et al. |
| 2006/0040739 A1 | 2/2006 | Wells |
| 2006/0052109 A1 | 3/2006 | Ashman et al. |
| 2006/0058091 A1 | 3/2006 | Crawford, III et al. |
| 2006/0073888 A1 | 4/2006 | Nguyen et al. |
| 2006/0079333 A1 | 4/2006 | Morrow et al. |
| 2006/0189367 A1 | 8/2006 | Nguyen et al. |
| 2006/0189382 A1 | 8/2006 | Muir et al. |
| 2007/0004510 A1 | 1/2007 | Underdahl et al. |
| 2007/0021198 A1 | 1/2007 | Muir et al. |
| 2007/0052636 A1 | 3/2007 | Kalt et al. |
| 2007/0191109 A1 | 8/2007 | Crowder et al. |
| 2007/0202952 A1 | 8/2007 | Francis et al. |
| 2007/0259717 A1 | 11/2007 | Mattice et al. |
| 2008/0076505 A1 | 3/2008 | Nguyen et al. |
| 2008/0076506 A1 | 3/2008 | Nguyen et al. |
| 2008/0146344 A1 | 6/2008 | Rowe et al. |
| 2009/0069090 A1 | 3/2009 | Moser et al. |
| 2009/0280910 A1 | 11/2009 | Gagner et al. |
| 2009/0325686 A1 | 12/2009 | Davis et al. |
| 2010/0087241 A1 | 4/2010 | Nguyen et al. |
| 2010/0255902 A1 | 10/2010 | Goldstein et al. |

| | | | |
|---|---|---|---|
| 2011/0065490 | A1 | 3/2011 | Lutnick |
| 2011/0212778 | A1 | 9/2011 | Wells |
| 2011/0275432 | A1 | 11/2011 | Lutnick et al. |

FOREIGN PATENT DOCUMENTS

| | | |
|---|---|---|
| CN | 1969301 | 5/2007 |
| DE | 100 34 275 | 1/2002 |
| EP | 0 698 858 | 2/1996 |
| EP | 0 744 786 | 11/1996 |
| EP | 0 769 769 | 4/1997 |
| EP | 0 924 657 | 6/1999 |
| EP | 0942285 | 9/1999 |
| EP | 1120757 | 8/2001 |
| EP | 1 231 577 | 8/2002 |
| EP | 1 482 459 | 12/2004 |
| EP | 1 494 182 | 5/2005 |
| GB | 2 284 913 | 6/1995 |
| GB | 2429564 | 2/2007 |
| JP | 07-299248 | 11/1995 |
| JP | 2001-218982 A | 8/2001 |
| JP | 2003-181137 A | 7/2003 |
| JP | 2004-113755 | 4/2004 |
| WO | 95/24689 | 9/1995 |
| WO | 96/00950 | 1/1996 |
| WO | 98/50876 | 11/1998 |
| WO | 98/58509 | 12/1998 |
| WO | 99/07153 | 2/1999 |
| WO | 99/10061 | 3/1999 |
| WO | 01/00291 | 1/2001 |
| WO | 01/01379 | 1/2001 |
| WO | 01/03786 | 1/2001 |
| WO | 01/27759 | 4/2001 |
| WO | 01/48712 | 5/2001 |
| WO | 01/76710 | 10/2001 |
| WO | 02/24288 | 3/2002 |
| WO | WO 02/50652 A2 | 6/2002 |
| WO | 02/055163 | 7/2002 |
| WO | 02/058020 | 7/2002 |
| WO | 03/019486 | 3/2003 |
| WO | 03/084623 | 10/2003 |
| WO | WO 2004025595 | 3/2004 |
| WO | 2004/027584 | 4/2004 |
| WO | 2004/034905 | 4/2004 |
| WO | 2004/056432 | 7/2004 |
| WO | 2004/070591 | 8/2004 |
| WO | 2005/023389 | 3/2005 |
| WO | 2006/009917 | 1/2006 |
| WO | 2006/010011 | 1/2006 |
| WO | 2006/023285 | 3/2006 |
| WO | 2006/090197 | 8/2006 |
| WO | 2008/028148 | 3/2008 |
| WO | 2008/030777 | 3/2008 |
| WO | 2009/009224 | 1/2009 |
| WO | 2009/009225 | 1/2009 |

OTHER PUBLICATIONS

Chinese Office Action from Application Serial No. 200580020194.0, dated Apr. 3, 2009.

International Preliminary Report on Patentability from Application Serial No. PCT/US2008/064779, dated Jan. 12, 2010.

International Preliminary Report on Patentability from Application Serial No. PCT/US2008/064776, dated Jan. 12, 2010.

U.S. Final Office Action from U.S. Appl. No. 10/871,068, dated Jan. 19, 2010.

U.S. Office Action from U.S. Appl. No. 10/871,068, dated Jun. 29, 2009.

U.S. Restriction Requirement from U.S. Appl. No. 10/871,068, dated Jul. 5, 2007.

International Search Report from International Patent Application No. PCT/US2005/021605, dated Sep. 29, 2005.

Written Opinion from International Patent Application No. PCT/US2005/021605, dated Sep. 29, 2005.

International Preliminary Report on Patentability from International Patent Application No. PCT/US2005/021605, dated Dec. 20, 2006.

International Search Report from International Patent Application No. PCT/US2008/064779 mailed Sep. 30, 2008.

Written Opinion from International Patent Application No. PCT/US2008/064779 mailed Sep. 30, 2008.

International Search Report from International Patent Application No. PCT/US2008/064776, dated Sep. 29, 2008.

Written Opinion from International Patent Application No. PCT/US2008/064776, dated Sep. 29, 2008.

International Search Report and Written Opinion for PCT/US2007/077427 mailed on Mar. 19, 2008.

International Search Report and Written Opinion for PCT/US2007/077428 mailed on Feb. 5, 2008.

British Examination Report from Patent Application No. GB0625344.7, dated Oct. 5, 2007 (3 pages).

British Examination Report from Patent Application No. GB0625344.7, dated Sep. 12, 2008.

U.S. Office Action from U.S. Appl. No. 10/871,068, mailed Oct. 16, 2007 (13 pages).

U.S. Final Office Action from U.S. Appl. No. 10/871,068, mailed Mar. 4, 2008 (11 pages).

U.S.Office Action from U.S. Appl. No. 10/871,068, mailed Jul. 28, 2008.

Wang Z et al., "Casino Technology: Player Tracking and Slot Accounting Systems" Gaming Research and Review Journal, UNLV International Gaming Institute, Las Vegas, NV, U.S.

Defendant's Invalidity Contentions in Litigation Proceedings: *IGT* vs. *Bally's* District of Nevada Case No. CV-S-04-1676-RCJ-(RJJ) 194 pgs.

Bally's Brief in Support of their Proposed Constructions for the '698 and '985 patents: *IGT* v. *Alliance Gaming Corp.; Bally Gaming International; and Bally Gaming, Inc.* U.S. District Court of Nevada Case No. CV-S-04-1676-RCJ-(RJJ) 38 pgs.

Declaration of John F. Acres in Support of Defendant's Opening Claim Construction Brief for the '698 and '985 patents; *IGT* v. *Alliance Gaming, Corp.; Bally Gaming International, Inc.*; and Bally Gaming, Inc. U.S. District Court of Nevada Case No. CV-S-04-1676-RCJ-(RJJ) 47 pgs.

Declaration of Bart A. Lewin in Support of Plantiff LGT's Opening Claim Construction Brief Addressing U.S. Patent No. 6,712,698 and U.S. Patent No. 6,722,985 (The "Player Tracking Unit" Patents): *IGT* v. *Alliance Gaming Corporation; Bally Gaming International; and Bally Gaming, Inc.* U.S. District of Nevada Case No. CV-S-04-1676-RCJ-(RJJ) 13 pgs.

Plaintiff IGT's Opening Claim Construction Brief Addressing U.S. Patent No. 6,712,698 and U.S. Patent No. 6,722,985 (The "Player Tracking Unit" Patents) U.S. District Court of Nevada Case No. CV-S-04-1676-RCJ-(RJJ) 34 pgs.

Bravo-Escos, Miguel., "Networking gets personal," IEE Review Jan. 2002, pp. 32-36.

Defendant's Third Supplemental Disclosures Pursuant to Paragraph 4b of the Stipulated First Amended Discovery Plan and First Amended Scheduling Order; *IGT* v. *Alliance Gaming Corp.; Bally Gaming International, Inc.; and Bally Gaming, Inc.* U.S. District Court of Nevada Case No. CV-S-04-1676- RCJ-(RJJ) 13 pgs.

Exhibit AA, *IGT* v. *Bally*, Claim Chart for Jorasch et al. '896 Patent ("Jorasch '896") 32 pgs.

Exhibit BB, *IGT* v. *Bally*, Claim Chart for Wynn et al. '271 Patent ("Wynn '271") 39 pgs.

Exhibit CC, *IGT* v. *Bally*, Claim Chart for Heidel et al. '691 (AU) Patent ("Heidel '691") 60 pgs.

Exhibit DD, *IGT* v. *Bally*, Claim Chart for Heidel et al. '769 Patent (Heidel et al.) 30 pgs.

Exhibit EE, *IGT* v. *Bally*, Claim Chart for Raven et al. '361 Patent ("Raven et al. '361") 33 pgs.

Exhibit FF, *IGT* v. *Bally*, Claim Chart for Walker '041 Patent ("Walker '041") 27 pgs.

Exhibit GG, *IGT* v. *Bally*, Claim Chart for Walker '495 Patent ("Walker '495") 33 pgs.

Exhibit HH, *IGT* v. *Bally*, Claim Chart for SDSD MC220+ 49 pgs.

Exhibit II, *IGT* v. *Bally*, Claim Chart for ACSC's Slot Marketing System 76 pgs.

Exhibit JJ, *IGT* v. *Bally*, Claim Chart for United Coin's V-7000 based Gambler's Bonus 28 pgs.

(56) References Cited

OTHER PUBLICATIONS

Exhibit KK, *IGT* v. *Bally*, Appendix B—Prior Art for '698 & '985 Patents 12 pgs.
Exhibit PP, *IGT* v. *Bally*, Claim Chart for U.S. Patent No. 6,280,328 ("Holch '328") 17 pgs.
Exhibit QQ, *IGT* v. *Bally*, Claim Chart for "Acres VFD" 30 pgs.
Exhibit V, *IGT* v. *Bally*, Claim Chart for Acres et al. '961 Patent ("Acres '961") 36 pgs.
Exhibit W, *IGT* v. *Bally*, Claim Chart for Acres '125 Patent ("Acres '125") 38 pgs.
Exhibit X, *IGT* v. *Bally*, Claim Chart for Franchi et al. '533 Patent ("Franchi et al. '533") 35 pgs.
Exhibit Y, *IGT* v. *Bally*, Claim Chart for Kelly et al. '918 Patent ("Kelly '918") 31 pgs.
Exhibit Z, *IGT* v. *Bally*, Claim Chart for Miodunski et al. '540 Patent ("Miodunski '540").
UK Office Action, dated Nov. 7, 2007 for GB Patent Application No. 0625344.7.
ECMA International, "Near Field Communication Interface and Protocol—2 (NFCIP-2)," Standard ECMA—352, $1^{st}$ Edition, 8 pages, 2003.
ECMA International, "Near Field Communication Interface and Protocol—2 (NFCIP-1)," Standard ECMA—340, $2^{nd}$ Edition, 60 pages, 2004.
ECMA International, "Near Field Communication—White Paper" ECMA/TC32-TG19/2004/1, 9 pages, 2004.
PokerPro Promotional Material obtained from ATEI Exhibition Jan. 24-26, London, UK, 2006, 4 pages.
J. Eric Townsend, et al., 11 page document entitled "Mattel Power Glove FAQ version 0.1, May 7, 1993" http://www.ccs.new.edu/home/ivan/pglove/faq-0.1.html.
LC Technologies, Inc., 9 page document entitled "The Eyegaze Analysis System, Research Tools" Copyright 2003, http://www.eyegaze.com/2Products/Development/Developmentmain.htm.
LC Technologies, Inc., 4 page document entitled "Eyeglaze Technology, Solutions and Applications" Copyright 2003, http://www.eyegaze.com/SOLUTIONS.htm.
Article by Katie Dean, 2 page document entitled "Wired News: Gesture Your Mouse Goodbye" May 28, 2003, http://www.wired.com/new/gizmos/0.1452.58978.00.html.
Article, Canesta, Inc., 1 page document entitled "Getting Started With Canesta, Device Prototyping Program" Copyright 2002, Canesta, Inc., http://www.canesta.com/devtools.htm.
U.S. Notice of Alowance from U.S. Appl. No. 10/871,068 dated Jun. 23, 2010.
U.S. Office Action from U.S. Appl. No. 11/825,481, dated Nov. 24, 2010.
U.S. Restriction Requirement from U.S. Appl. No. 10/921,518, dated Nov. 15, 2007.
www.eink.com.
www.keyence.com.
U.S. Final Office Action from U.S. Appl. No. 11/825,481, dated May 3, 2011.
Canadian Office Action from Serial No. 2,570,901, dated May 18, 2011.
Third Party Submission for U.S. Appl. No. 13/077,606, filed Oct. 31, 2011.
U.S. Notice of Allowance from U.S. Appl. No. 13/077,606, dated Apr. 4, 2012.
U.S. Notice of Allowance from U.S. Appl. No. 13/077,606, dated Jul. 11, 2012.
Canadian Office Action from Application Serial No. 2,570,901, dated May 3, 2012.
U.S. Office Action from U.S. Appl. No. 11/825,481, dated Nov. 13, 2012.
U.S. Notice of Allowance from U.S. Appl. No. 13/077,606, dated Nov. 15, 2012.
Office Action for Canadian Patent Application No. 2,570,901, dated Jul. 2, 2013. (6 pages).
U.S. Final Office Action from U.S. Appl. No. 10/871,068, mailed Jan. 27, 2009.
Fischetti, Mark., At Your Fingertips—Touch Screens, Apr. 2001, Scientific American, pp. 102-103.
Yao, Paul., Microsoft Windows CE 2.0: It's Not Just for Handheld PCs Anymore—MSJ, May 1998; www.microsoft.com/msj/0598/wince.aspx (pp. 1-23).
Bricklin, Dan., About Tablet Computing Old and New, Nov. 22, 2002; http://www.bricklin.com/tablecomputing.htm (pp. 1-7).
EP Office Action dated Dec. 20, 2005 from EP Application No. 02773484.7 3 pgs.
International Search Report and Written Opinion dated Jun. 14, 2006 from PCT Application No. PCT/US2006/005685 8 pgs.
EP Office Action dated Jan. 12, 2007 from EP Application No. 02773484.7.
U.S. Office Action dated Feb. 15, 2008 from U.S. Appl. No. 11/064,168.
U.S. Office Action dated Feb. 12, 2008 from U.S. Appl. No. 11/186,729.
U.S. Office Action dated Feb. 12, 2008 from U.S. Appl. No. 11/186,210.
U.S. Office Action dated Feb. 15, 2008 from U.S. Appl. No. 11/188,088.
U.S. Office Action dated Feb. 15, 2008 from U.S. Appl. No. 11/190,986.
U.S. Office Action dated Mar. 4, 2008 from U.S. Appl. No. 11/192,729.
Bravo-Escos, Miguel., "Networking gets personal," IEE Review Jan. 2002, pp. 32-36.
Saleem, Rae., "Preferred Payment Architecture: Local Payment," Mobey Forum-Mobile Financial Services Ltd., Sep. 2002, Document Version 1.0.
The definition of graphical, The American Heritage Dictionary of the English Language, Third Edition, copyright 1992 by Houghton Mifflin Company.
Australian Office Action dated Aug. 30, 2007 from AU Application No. 2002336624.
U.S. Office Action dated Sep. 15, 2008 from U.S. Appl. No. 11/064,168.
U.S. Office Action dated Oct. 31, 2008 from U.S. Appl. No. 11/186,729.
U.S. Office Action dated Oct. 31, 2008 from U.S. Appl. No. 11/186,210.
U.S. Office Action dated Oct. 31, 2008 from U.S. Appl. No. 11/188,088.
U.S. Office Action dated Oct. 31, 2008 from U.S. Appl. No. 11/190,986.
U.S. Office Action dated Oct. 31, 2008 from U.S. Appl. No. 11/192,729.
U.S. Office Action dated Apr. 17, 2009 from U.S. Appl. No. 11/064,168.
First Office Action dated Feb. 13, 2009 from Chinese Application No. 2006800056903.
U.S. Office Action from U.S. Appl. No. 10/921,518, dated Mar. 17, 2008.
U.S. Restriction Requirement from U.S. Appl. No. 10/921,518, dated Nov. 21, 2008.
U.S. Final Office Action from U.S. Appl. No. 10/921,518, dated Apr. 20, 2010.
U.S. Notice of Allowance from U.S. Appl. No. 10/921,518, dated Oct. 21, 2010.
U.S. Notice of Allowance from U.S. Appl. No. 10/921,518, dated Feb. 2, 2011.
Chinese Office Action from Application Serial No. 200580020194.0, dated Aug. 5, 2010.
International Preliminary Report on Patentability dated Feb. 20, 2007 from Application No. PCT/US2005/027731.
International Search Report, dated Jan. 16, 2006, from corresponding International Application No. PCT/US2005/027731, 7 pp. including Notification of Transmittal.
Written Opinion of the International Searching Authority, dated Jan. 16, 2006, from corresponding International Application No. PCT/US2005/027731, 10 pp.

(56) References Cited

OTHER PUBLICATIONS

"CHI97: The Magic Carpet; Physical Sensing for Immersive Environments", website, http://www.acm.org/sigchi/chi97/proceedings/short-demo/jp.htm, 5 pages, Nov. 8, 2004.

Paradiso, "Several Sensor Approaches that Retrofit Large Surfaces for Interactivity", ACM Ubicomp 2002 Workshop on Collaboration with Interactive Walls and Tables, Gothenburg, Sweden, Sep. 29, 2002, 8 pages.

* cited by examiner

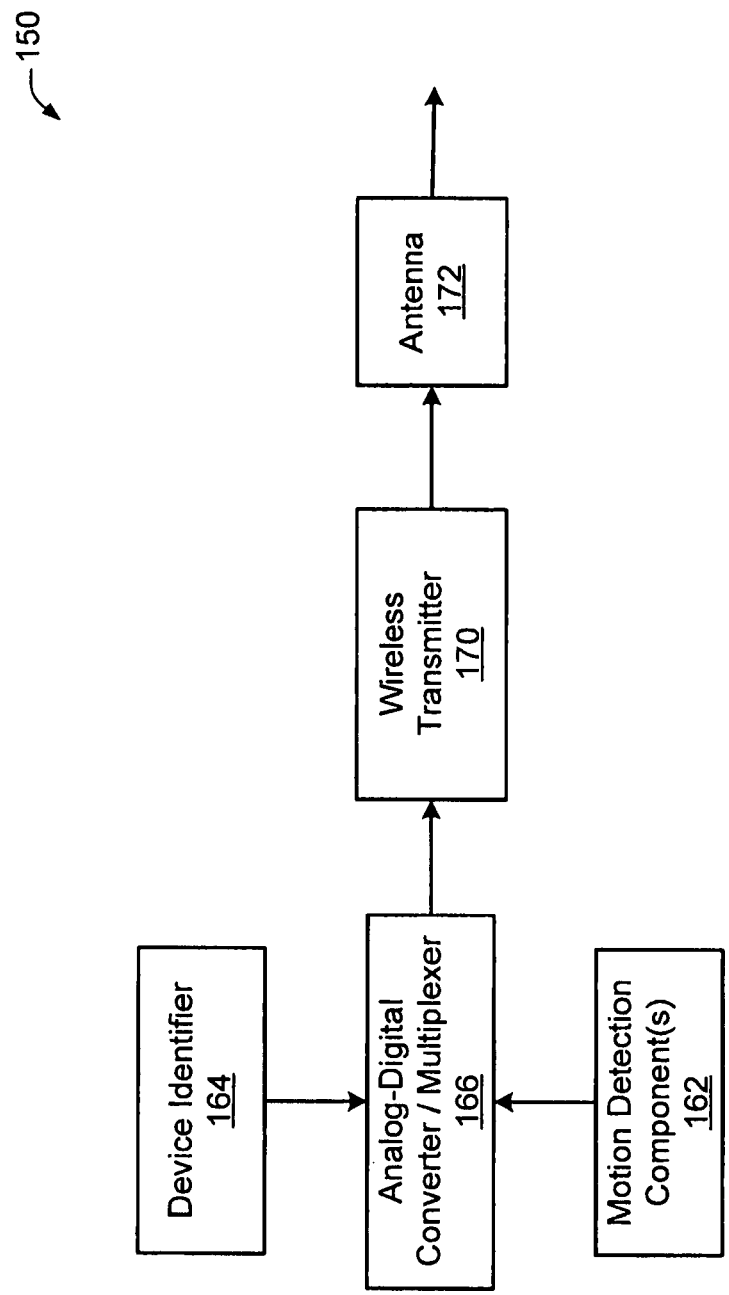

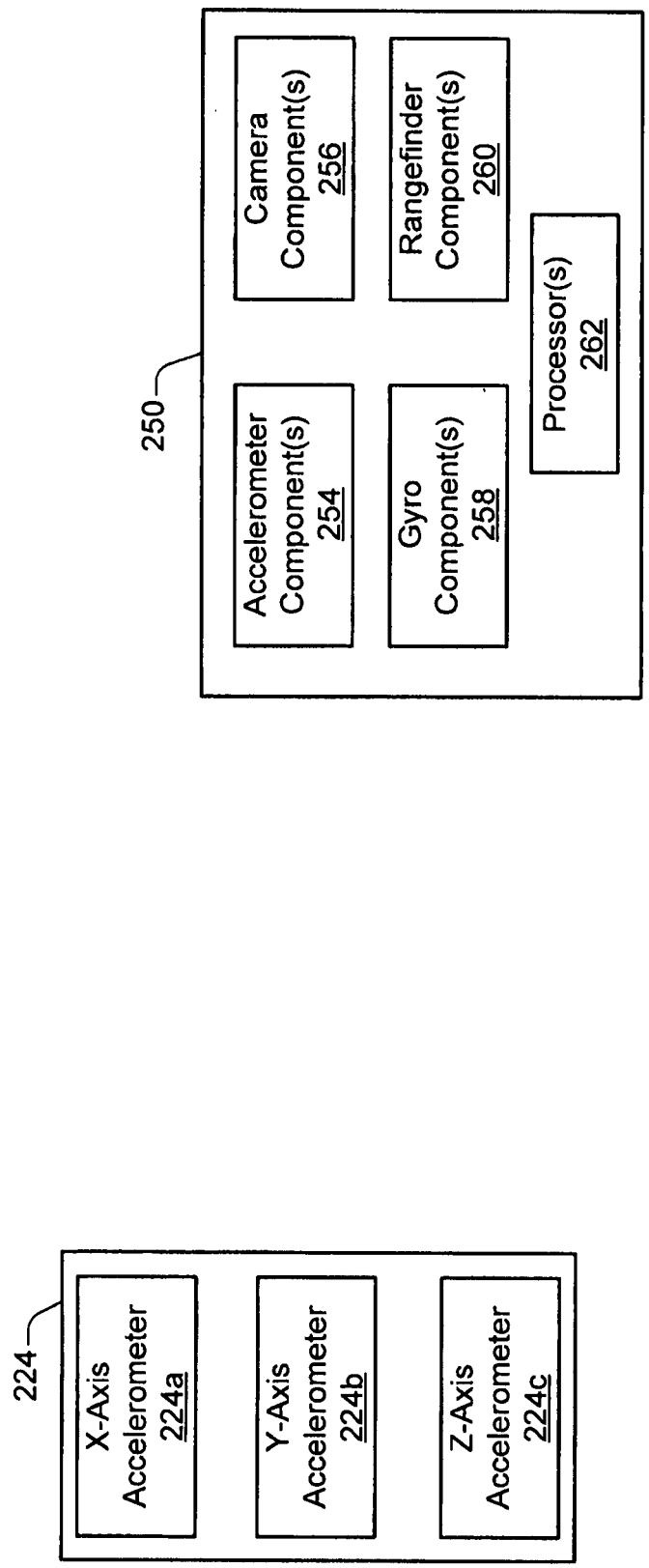

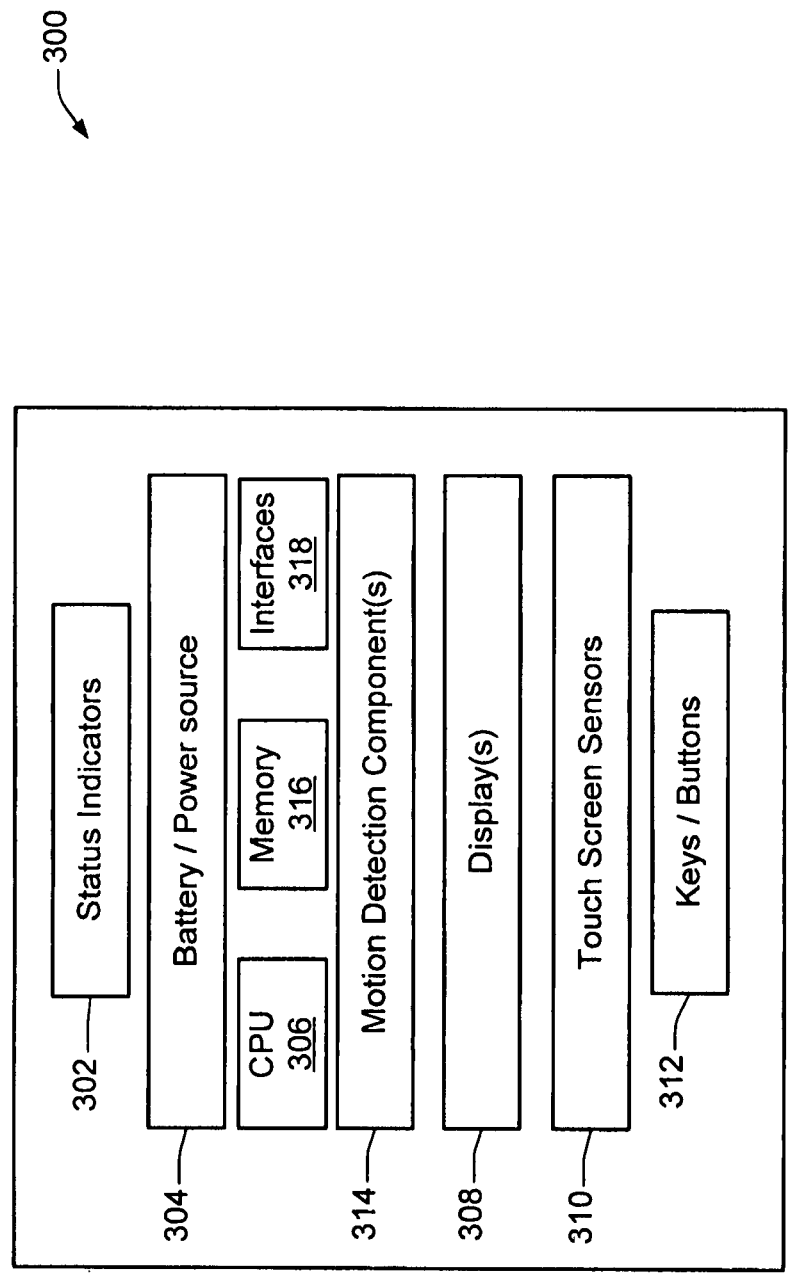

ID

CONTROL OF WAGER-BASED GAME USING GESTURE RECOGNITION

RELATED APPLICATION DATA

This application is also a continuation-in-part application of prior U.S. patent application Ser. No. 11/515,183, by Nguyen et al., entitled "INTELLIGENT WIRELESS MOBILE DEVICE FOR USE WITH CASINO GAMING TABLE SYSTEMS", filed on Sep. 1, 2006 now U.S. Pat. No. 8,287,380, the entirety of which is incorporated herein by reference for all purposes, and from which priority is claimed pursuant to the provisions of 35 U.S.C. 120.

This application is also a continuation-in-part application of prior U.S. patent application Ser. No. 10/871,068, by Parrott, et al., entitled "GAMING MACHINE USER INTERFACE", filed Jun. 18, 2004 now U.S. Pat. No. 7,815,507, the entirety of which is incorporated herein by reference for all purposes, and from which priority is claimed pursuant to the provisions of 35 U.S.C. 120.

BACKGROUND OF THE INVENTION

The present invention relates generally to gaming systems, and, more particularly, to gaming systems which include handheld devices having motion detection capabilities.

Casino gaming and other types of gambling activities are enjoyed worldwide. Gaming activities are typically conducted in fixed locations, such as, for example, in a hotel, casino or other facility. Casinos may be subject to state and local laws relating to gambling in that jurisdiction. Frequently, these laws have certain reporting requirements to provide revenue and/or winnings information and to ensure certain betting odds.

Recently, portable remote gaming devices have been proposed for playing various types of casino games such as poker, slots and keno. In some casino gaming environments, it has been proposed to allow mobile game play via the use of portable computing devices, such as, for example, cellular phones, personal digital assistants (PDAs), etc.

More generally, it is recognized that the existence and use of portable electronic devices within casino environments has dramatically increased over the past decade.

SUMMARY OF THE INVENTION

Various aspects are directed to different methods, systems, and computer program products for controlling a wager-based game played at a gaming system. In one embodiment the gaming system may include a gesture input interface device operable to detect movements gestures associated with one or more persons, and a gesture interpretation component operable to identify selected movements or gestures detected by the gesture input interface device. In at least one embodiment, the gesture interpretation component may also be operable to generate gesture interpretation information relating to interpretation of the selected movements or gestures. In at least one embodiment, the gaming system may be operable to automatically detect a gesture by a player participating in a game session at the gaming system; interpret the gesture with respect to a set of criteria; generate gesture interpretation information relating to the interpretation of the gesture; and advance a state of the game session using at least a portion of the gesture interpretation information. In at least one embodiment, the system may include a handheld device which is operable to perform one or more of the functions relating to gesture recognition and/or interpretation. In at least one embodiment, information relating to the gesture and/or information relating to the gesture interpretation may be recorded as part of the game history associated with the game session.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1B illustrates a portion of a handheld device with motion interface capability, in accordance with an alternate embodiment.

FIGS. 2A and 2B illustrate different embodiments of various motion detection components which may be used for implementing various aspects and/or features described herein.

FIG. 3 shows a simplified block diagram of various components which may be used for implementing a handheld device in accordance with an alternate embodiment.

DETAILED DESCRIPTION OF EXAMPLE EMBODIMENTS

Figure 1A:
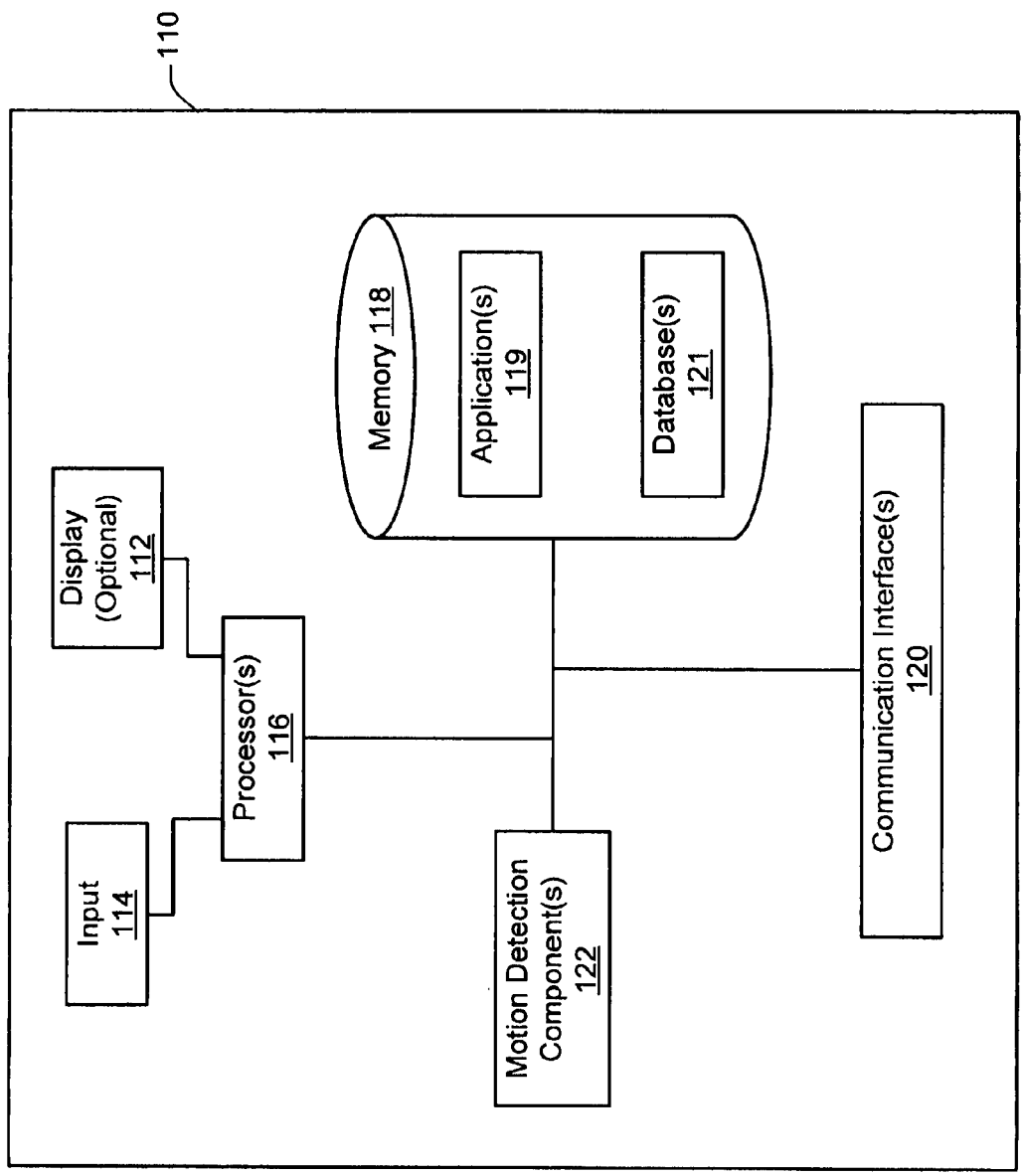
FIG. 1A illustrates a handheld device with motion interface capability, in accordance with a particular embodiment.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

FIG. 1A illustrates a handheld device 110 with motion interface capability, in accordance with a particular embodiment. In one embodiment, handheld device 110 may be operable to recognize movement of the device and to implement various functions and/or operations in response to such movement. In this way, movement of the device operates as a form of input for the device. Such movement input may directly alter what is being displayed on a device display and/or may trigger initiation of various operations/functions.

According to specific embodiments, handheld device 110 may be configured or designed to include functionality relating to various different types of mobile or handheld devices, which, for example, may include, but are not limited to, one or more of the following (or combination thereof): a mobile phone, a personal digital assistant (PDA), a still camera, a video camera, a pocket calculator, a portable music or video player, a digital thermometer, a game device, a portable electronic device, a watch, an electronic player tracking card, and/or any other device capable of being held or worn by a user. As indicated in the examples listed above, handheld device 110 may include wearable portable devices such as watches, bracelets, rings, etc. According to one embodiment, at least some of the wearable portable devices include computing devices worn around a user's wrist, hand, forearm, etc.

In at least one embodiment, handheld device 110 may include input component(s) 114, processor 116, memory 118, communication interface(s) 120, one or more motion detection components 122. Further, in at least some embodiments, handheld device 110 may optionally include a display 1112. In one embodiment, display 112 may be operable to present visual output of the device and may comprise a liquid crystal display (LCD), a light emitting diode (LED) and/or any other type of display for communicating output to a user.

In one embodiment, input 114 provides an interface for a user to communicate input to the device. Input 114 may comprise a keyboard, keypad, track wheel, knob, touchpad, touchscreen, stencil or any other component through which a user may communicate an input to device 110. In particular embodiments, display 112 and input 114 may be combined into the same component, such as a touchscreen.

Processor 116 may include a microprocessor, controller and/or any other suitable computing device or resource. In one embodiment, processor 116 may be adapted to execute various types of computer instructions in various computer languages for implementing functions available within system handheld device 110. Processor 116 may include any suitable controllers for controlling the management and operation of handheld device 110.

Memory 118 may be any form of volatile or nonvolatile memory including, without limitation, magnetic media, optical media, random access memory (RAM), read only memory (ROM), removable media or any other suitable local or remote memory component. According to specific embodiments, memory 118 may include various components, logic modules, and/or or software executable by processor 1116. In some embodiments, memory 118 may include various applications 119 with user interfaces utilizing motion input, such as, for example, gesture interpretation, menu scrolling, mapping, calendar and file management applications, etc. In at least some embodiments, memory 118 may also include various databases, such as, for example, gesture databases, function or gesture mapping databases, etc. According to specific embodiments, components of memory 118 may be combined and/or divided for processing according to particular needs or desires.

According to specific embodiments, communication interface(s) 120 may be operable to support wireless and/or wired communication of data and information with other devices, such as, for example, other handheld devices, deeming machines, game tables, basic stations, remote servers, etc.

In at least one embodiment, motion detection component(s) 122 may be operable to track movement of the handheld device 110 which may be used as a form of input to perform specific functions/operations. Such input movement may result from a user moving the device in a desired fashion to perform desired tasks, as further discussed below.

In other embodiments, handheld device 110 may include any suitable processing and/or memory modules for performing at least some of the various functions and/or operations as described herein. Examples of such modules may include, but are not limited to, one or more of the following (or combination thereof): a control module, a motion tracking module, a video analysis module, a motion response module, a display control module, a signature detection module, etc.

In particular embodiments, input movement may be in the form of translations and/or gestures. According to one embodiment, translation-based input may be based, at least in part, on characteristics relating to a beginning point and endpoint of a motion, and differences between such beginning points and endpoints. In at least one embodiment, gesture-based input may be based, at least in part, on characteristics relating to a actual path(s) traveled by the device, which, for example, may be represented as a holistic view of a set of points traversed.

As an example, when navigating a map using translation-based input, motion in the form of an "O" may change the display during the movement but may ultimately yield no change between the information displayed prior to the movement and the information displayed at the end of the movement assuming, for example, that the ending position of the device is the same as the starting position of the device.

However, according to one embodiment, in a gesture input mode, the device may be operable to recognize that it has traveled in the path of an "O", for example, by tracking the path it has traveled during the motion or movement between a beginning point and an endpoint of the gesture, even though the beginning and endpoints may be the same. According to a specific embodiment, this gesture "O" movement may be mapped to particular functions such that when the device recognizes it has traveled along a path to constitute an "O" gesture, it may perform the functions, as further elaborated upon below. In particular embodiments, movement of the device intended as a gesture may be recognized as by the device as a gesture by matching a series, sequence or pattern of accelerations of the movement to those defining gestures of a gesture database.

In other embodiments, at least some handheld device may not include some of the components of the handheld device illustrated in FIG. 1A. For example, in at least one other embodiment, a handheld device may not include input component(s) 114 which are distinct from the motion detection component(s). In at least one embodiment, the motion of the handheld device may provides the sole or primary input mechanism for the device. It should be noted that handheld devices in accordance with other embodiments may include additional components not specifically illustrated with respect to device 110.

FIG. 1B illustrates a portion of a handheld device with motion interface capability, in accordance with an alternate embodiment. As illustrated in the example of FIG. 1B, handheld device components 150 may include one or more motion detection component(s) 162 operable to provide motion detection information to analog-digital converter/multiplexer 166. In at least one embodiment, the handheld device may also have a unique, statically or dynamically assigned device identifier 164 (e.g., MAC address, network address, serial number, etc.). In one embodiment, the handheld device may be operable to provide its device identifier information to analog-digital converter/multiplexer 166. In at least one embodiment, analog-digital converter/multiplexer 166 may be operable to generate multiplexed information from its various input sources for transmission (e.g., via wireless transmitter 170 and antenna 172) to one or more gaming systems, and/or remote devices.

According to specific embodiments, the handheld device may be operable to transmit wireless data using a variety of different wireless communication protocols and/or modulation schemes. For example, in some embodiments, wireless transmitter 170 may be operable to transmit wireless information via one or more of the following types of protocols and/or modulation schemes (and/or combinations thereof): CDMA, TDMA, FDMA, frequency modulation, amplitude modulation, baseband modulation, etc. For example, in some embodiments, each handheld device may be assigned a different frequency to be used for communicating with a particular gaming system to thereby allow multiple handheld devices to communicate with the gaming system at the same time. In other embodiments, a plurality of handheld devices may use the same frequency for communicating with a particular gaming system, but may each be assigned different timeslots for transmitting its information to the gaming system. In this way wireless message collisions may be avoided.

FIGS. 2A and 2B illustrate different embodiments of various motion detection components which may be used for implementing various aspects and/or features described herein.

For example, as shown in the example of FIG. 2A, motion detection device 224 may include a plurality of accelerometers (e.g., 224*a*, 224*b* and 224*c*). In one embodiment, accelerometers 224*a*, 224*b* and 224*c* may be operable to detect movement of the handheld device by detecting acceleration along one or more respective sensing axes. For example, in one embodiment, a particular movement of the handheld device may comprise a series, sequence and/or pattern of accelerations detected by the accelerometers. In one embodiment, when the handheld device is tilted along a sensing axis of a particular accelerometer, the gravitational acceleration along the sensing axis may dynamically change. This change in gravitational acceleration may be detected by the accelerometer and reflects the tilt of the device. Similarly, translation of the handheld device, or movement of the device without rotation or tilt may also produce changes in acceleration along one or more sensing axes, which may be detected by one or more of the accelerometers.

In the example embodiment of FIG. 2A, motion detector device 224 comprises: an x-axis accelerometer 224a operable to detect movement of the device along an x-axis; a y-axis accelerometer 224b operable to detect movement of the device along a y-axis, and a z-axis accelerometer 224c operable to detect movement of the device along a z-axis. In combination, accelerometers 224a, 224b and 224c are able to detect rotation and/or translation of a handheld device such as handheld device 110. As indicated above, rotation and/or translation of device 110 may serve as an input from a user to operate the device.

The use of three accelerometers for motion detection provides certain advantages. For example, if only two accelerometers were used, the motion detector may not be able to disambiguate translation of the handheld device from tilt in the plane of translation. However, using a third, z-axis accelerometer (an accelerometer with a sensing axis at least approximately perpendicular to the sensing axes of the other two accelerometers) enables many cases of tilt to be disambiguated from many cases of translation.

FIG. 2B shows an alternate embodiment of various motion detection components which may be used for implementing various aspects and/or features described herein. For example, as shown in the example of FIG. 2B, motion detection device 250 may include, for example, accelerometer component(s) 254, gyro component(s) 258, camera component(s) 256, rangefinder component(s) 260, etc.

According to one embodiment, camera component(s) 256 may include a plurality of cameras which may comprise charge coupled device (CCD) cameras or other optical sensors. In one embodiment, the cameras may provide another way to detect movement of the handheld device (both tilt and translation). Additionally, by using at least two cameras, tilt and translation may be distinguished from each other.

In at least one embodiment, when the handheld device is rotated, the magnitude of the movement of the external world to the cameras may be directly related to the magnitude of the rotation of the device. Thus, for example, in one embodiment, the amount of the rotation can accurately be determined based on such movement of the external world from the perspective of the cameras.

However, in at least one embodiment, when the device is translated, the magnitude of the translation may be related to both the magnitude of the movement of the external world to the cameras and to the distance to the objects in the field of view of the cameras. Accordingly, in at least some embodiments, in order to accurately determine the amount of translation using cameras alone, it may be desirable to obtain some form of information concerning the distance to objects in the camera fields of view. In at least some embodiments, one or more rangefinder component(s) 260 may be used for this purpose (and/or for other desired purposes).

It will be appreciated that, even without such distance information, the optical information provided by the cameras may be of significant value, for example, when correlated against the information from accelerometers and/or other sensors. For example, optical camera input may be used to inform the handheld device that no significant motion is taking place. This could provide a solution to problems of drift which may be inherent in using acceleration data to determine absolute position information for certain device functions.

As discussed above, distance information may be useful to determine amount of translation when cameras are being used to detect movement. In the example of FIG. 2B, such distance information may be provided via one or more rangefinder components 260. According to specific embodiments, rangefinder component(s) 260 may comprise, for example, ultrasound rangefinders, laser rangefinders and/or any other suitable distance measuring components. Other components may also be used to determine distance information. For example, cameras with rangefinding capabilities may be used. In one embodiment, multiple cameras may be utilized on the same side of the handheld device to function as a range-finder using stereopsis. In at least one embodiment, determined distance information may allow for improved accuracy and/or explicit computation of detected translation and/or rotation.

As shown in the example of FIG. 2B, motion detection device 250 may additionally include one or more gyro component(s) 258. In at least one embodiment, gyro component(s) 258 may be used in combination with the other components of motion detection device 250 to provide increased accuracy in detecting movement of the handheld device.

In at least one embodiment, the motion detection device may include one or more processors (e.g., 262), which, for example, may be operable to processes data from the various motion detection components (e.g., accelerometers, cameras, gyros, rangefinders, etc.) to produce an output indicative of the motion of the handheld device. Processor 232 may comprise a microprocessor, controller or any other suitable computing device or resource, such as a video analysis module for receiving a video stream from each camera. In some embodiments, the processing described herein with respect to processor 232 of motion detection device 250 may be performed by processor 16 of handheld device 10 or any other suitable processor, including processors located remote to the handheld device.

It will be appreciated that, in other embodiments, one or more motion detection devices may include additional, fewer, or different components than those illustrated in FIGS. 2A and 2B. For example, some embodiments may include a motion detector device with two or three accelerometers and one or more gyros; two or three accelerometers and one or more cameras; or two or three accelerometers and one or more rangefinders, etc. In addition, the location of the motion detection components on the handheld device may vary for different embodiments. For example, some embodiments may include cameras on different surfaces of a device, while other embodiments may include two cameras on the same surface.

Altering the type, number and location of components of motion detection device 250 may affect the ability of motion detector to detect or accurately measure various types of movement. As indicated above, the type and number of components of motion detectors may vary in different embodiments in order to fulfill particular needs. Fewer or less accurate components may be used in particular embodiments when it is desired to sacrifice accuracy to reduce manufacturing cost of a handheld device with motion detection capabilities. For example, some handheld devices may only need to detect that the handheld device has been translated and may not need to detect exact amount of such translation to perform desired functions of the handheld device. Such handheld devices may thus include a motion detector with accelerometer and/or camera components but without rangefinder or other component providing distance information. In particular embodiments, components described above, such as cameras and rangefinders, may also be used for other purposes by the handheld device than those described above relating to motion detection functionality.

FIG. 3 shows a simplified block diagram of various components which may be used for implementing a handheld device in accordance with an alternate embodiment. As illustrated in the example of FIG. 3, handheld device 300 may include a variety of components, modules and/or systems for providing functionality relating to one or more aspects described herein. Other handheld device embodiments (not shown) may include different or other components than those illustrated in FIG. 3. For example, handheld device 300 may include, but not limited to, one or more of the following (or combination thereof):

- At least one processor or CPU (306). In at least one implementation, the processor(s) 306 may be operable to implement features and/or functionality similar to other processors described herein.
- Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may be operable to implement features and/or functionality similar to other memory described herein.
- Interface(s) 318 which, for example, may include wired interfaces and/or wireless interfaces. In at least one implementation, the interface(s) 318 may be operable to implement features and/or functionality similar to other interfaces described herein. For example, in at least one implementation, the wireless communication interface(s) may be configured or designed to communicate with components of electronic game tables, electronic gaming machine, remote servers, electronic gaming machines, other wireless devices (e.g., PDAs, other handheld devices, cell phones, player tracking transponders, etc.), base stations, etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- At least one power source 304. In at least one implementation, the power source may include at least one mobile power source for allowing the handheld device to operate in a mobile environment. For example, in one implementation, the battery 304 may be implemented using a rechargeable, thin-film type battery. Further, in embodiments where it is desirable for the handheld device to be flexible, the battery 304 may be designed to be flexible.
- One or more display(s) 308 (if desired). According to various embodiments, such display(s) may be implemented using, for example, LCD display technology, OLED display technology, and/or other types of conventional display technology. In at least one implementation, display(s) 308 may be adapted to be flexible or bendable. Additionally, in at least one embodiment the information displayed on display(s) 308 may utilize e-ink technology (such as that available from E Ink Corporation, Cambridge, Mass., www.eink.com), or other suitable technology for reducing the power consumption of information displayed on the display(s) 308. In some embodiments, it may be desirable to not include a display at the handheld device.
- One or more user I/O Device(s) such as, for example, motion detection/gesture interpretation input interfaces, touch keys/buttons 312, scroll wheels, cursors, touch-screen sensors 310, etc.
- One or more status indicators 302. For example, in one implementation, one or more colored status indicators (such as, for example, LEDs) may be included on one or more sides of a handheld device, and adapted to provide various information such as, for example: communication status; game play status; bonus status, handheld device health status; handheld device operating mode; battery power status; battery charging status; status of cards being dealt; input or gesture detection status; error detection status; team status; out of range status; etc.
- At least one motion detection component 314 for detecting motion or movement of the handheld device and/or for detecting motion, movement, gestures and/or other input data from user.

In one embodiment, the motion detection component 314 may be operable to detect gross motion of a user (e.g., player, dealer, etc.). Additionally, in at least one embodiment, the motion detection component 314 may further be operable to perform one or more additional functions such as, for example: analyze the detected gross motion or gestures of a participant; interpret the participant's motion or gestures (e.g., in the context of a casino game being played) in order to identify instructions or input from the participant; utilize the interpreted instructions/input to advance the game state; etc. In other embodiments, at least a portion of these additional functions may be implemented at a remote system or device.

For example, during play of a game of blackjack at a conventional game table, a player may signal "hit me" to the dealer by the player flicking or moving his cards in a sweeping motion towards the player. In at least one embodiment where the player is performing the "hit me" gesture using a handheld device (e.g., instead of or in addition to using conventional playing cards), the handheld device may be adapted to automatically detect the player's gesture (e.g., gross motion) by sensing motion or movement (e.g., rotation, displacement, velocity, acceleration, etc.) using, for example, one or more motion detection sensors. In one embodiment, the handheld device may also be adapted to analyze the detected motion data in order to interpret the gesture (or other input data) intended by the player. Once interpreted, the handheld device may then transmit the interpreted player input data (e.g., "hit me") to the game table for advancement of the game state. Alternatively, the handheld device may be adapted to transmit information relating to the detected motion data to the game table, and the game table adapted to analyze the detected motion data in order to interpret the gesture (or other input data) intended by the player.

According to different embodiments, other criteria may also be used when analyzing the detected motion data for proper interpretation of the player's gestures and/or other input instructions. For example, the interpretation of the detected motion data may be constrained based on one or more of the following criteria (or combination thereof): type of game being played (e.g., craps, blackjack, poker, slots, etc.), location of the player/handheld device; current handheld device operating mode (e.g., table game operating mode, gaming machine operating mode, bonus game operating mode, restaurant operating mode, theater operating mode, lounge operating mode, hotel operating mode, parking service operating mode, room service operating mode, news magazine operating mode, etc.); game rules; time; player ID; player preferences; previous motion interpretation/analysis; and/or other criteria described herein.

In at least one embodiment, the motion detection component 314 may include one or more motion detection sensors such as, for example, MEMS (Micro Electro Mechanical System) accelerometers, that can detect the acceleration and/or other movements of the handheld device as it is moved by a user. Examples of suitable MEMS accelerometers may include, but are not limited to, one or more of the following (or combination thereof): Si-Flex™ SF1500L Low-Noise Analog 3g Accelerometer (available from Colibrys, Inc., Stafford, Tex.); MXC6202 Dual Axis Accelerometer (available from MEMSIC, Inc. 800, North Andover, Mass.); ADXL330 iMEMS Accelerometer (available from Analog Devices, Norwood, Mass.); etc.

In at least some embodiments, other types of motion detection components may be used such as, for example, inertial sensors, MEMS gyros, and/or other motion detection components described herein. For example, MEMS accelerometers may be particularly suited for applications involving relatively large degrees of vibration, impact, and/or fast motion. MEMS gyros are great for may be particularly suited for applications involving orientation sensing and/or slow movements.

In at least one embodiment, motion detection component 314 may include at least one "Spring Board Accelerometer". One embodiment of the Spring Board Accelerometer may be implemented in a manner similar to that of a diving board, in that it may be attached at one end and may be allowed to bend (under the influence of gravity). If desired, a specified amount of mass may be added to the free end.

In at least one embodiment, the free end of the "spring board" may be implemented as movable plate of a capacitor with the other plate of the capacitor being fixed (e.g., to a frame or body). Such a Spring Board Accelerometer embodiment may be used to measure the influence of gravity. For example, according to one embodiment, as gravity bends the board, the distance between the plates of the capacitor decreases (e.g., the plates get closer to each other), and the capacitance increases [e.g., Capacitance=(k*Area of plates)/distance between plates]. For example, if the accelerometer is stationary (e.g., lying on a table with the spring board parallel with the table top) then the output of that board may be +1 g and a first output signal (e.g., DC voltage signal) may be output from the device (e.g., using electronics operable to measure the capacitance of the plates, and/or to generate the DC output signal(s)). If the spring board is subsequently turned over, the output of that board will be at −1 g, and the DC voltage output signal will also change polarity. As the board is rotated about an axis parallel to the board, the output may dynamically change from +1 g to −1 g, with 0 g being the point where the board is perpendicular to the force of gravity.

In one embodiment, a graph of this function may be expressed as a cosine function from 0 to pi.

According to specific embodiments, spring board accelerometers may be suitable for use as sensors of vibration. For example, in one embodiment the spring board accelerometer(s) may be optimized to detect vibration frequencies of less than 400 Hz for use in gesture interpretation analysis. In one embodiment, it may be preferable that the frequency of detected vibration(s) (e.g., for use in gesture interpretation analysis) is below the resonance frequency of the spring board. For example, in at least one embodiment, the length of the spring board and the mass of the spring board may be configured or designed such that the frequency of resonance of the board is greater than 400 Hz.

Spring board accelerometers may also be suitable for use as sensors of impacts since, for example, such devices may be configured or designed to detect and withstand relatively fast accelerations (e.g., resulting from free fall conditions) in one or more planes. For example, fast acceleration in one plane may result in the board bending until its limits are encountered. Such devices may be suitable for use as sensors for measuring tilt of an object. For example, in one embodiment, a spring board accelerometer may be configured or designed to provide an output DC voltage that is proportional to the angle of tilt, acceleration, rotation of an object such as, for example, a portable gaming device or a player's hand or arm.

In at least one embodiment, the handheld device may be further adapted to transmit motion information (and other related information) to a gaming machine, game table and/or other devices. In one implementation, the motion information may include data such as, for example: a handheld device ID for use in identifying the handheld device which transmitted information; user ID information for use in identifying the user holding the handheld device, movement data relating to the X, Y, and/or Z axes, etc. According to one implementation, analog acceleration data output from the accelerometers may be digitized and fed into a multiplexer and transmitted to a remote device or system such as, for example, a gaming machine, a game table, a remote server, etc.

According to various embodiments, game tables, gaming machines, and/or other devices which are operable to receive communication from the handheld device may include at least one receiver for receiving information relating to the detected motion data and/or interpreted player input data. In one embodiment, the receiver may be implemented as a multi-channel multi-frequency receiver adapted to receive signals from a plurality of different handheld devices.

In at least one embodiment, the handheld device 300 may be operable to automatically and dynamically select an appropriate mode of operation based on various parameters and/or upon detection of specific events or conditions such as, for example: the handheld device's current location; identity of current user; user input; system override (e.g., emergency condition detected); proximity to other handheld devices belonging to same group or association; proximity to specific objects, regions, zones, etc. Additionally, the handheld device may be operable to automatically update or change its current operating mode to the selected mode of operation. The handheld device may also be adapted to automatically modify accessibility of user-accessible features and/or information in response to the updating of its current mode of operation.

According to specific embodiments, associations may be made between handheld devices and players (and/or player positions at a game table) such that each active handheld device is associated with a unique player or user during a given time period.

According to specific embodiments, the handheld device may also be adapted to perform other functions such as, for example, one or more of the following (or combination thereof):

allowing a player conduct game play activities;
    allowing a player to input game play instructions;
    allowing a player to perform wagering activities (e.g., increasing bets, checking bets, performing side wagering/backbetting activities, etc.);
    retrieving and/or displaying player tracking data;
    retrieving and/or displaying player account data;
    displaying game play assistance information;
    displaying casino layout information;
    displaying promotional information;
    notify a player of messages;
    displaying multimedia information from external sources;
    displaying player's current location;
    etc.

For example, in one implementation, a handheld device may be adapted to communicate with a remote server to access player account data, for example, to know how much funds are available to the player for betting/wagering.

In at least one implementation, the handheld device may also include other functionality such as that provided by PDAs, cell phones, and/or other mobile computing devices. Further, in at least one implementation, the handheld device may be adapted to automatically and/or dynamically change its functionality depending on various conditions such as, for example: type of game being played; user input; current location or position; detection of local electronic gaming tables/devices; etc.

In at least one embodiment, a handheld device may be implemented using conventional mobile electronic devices (e.g., PDAs, cell phones, etc.) which have been specifically adapted to implement at least a portion of the handheld device functionalities described herein.

Figure 4:
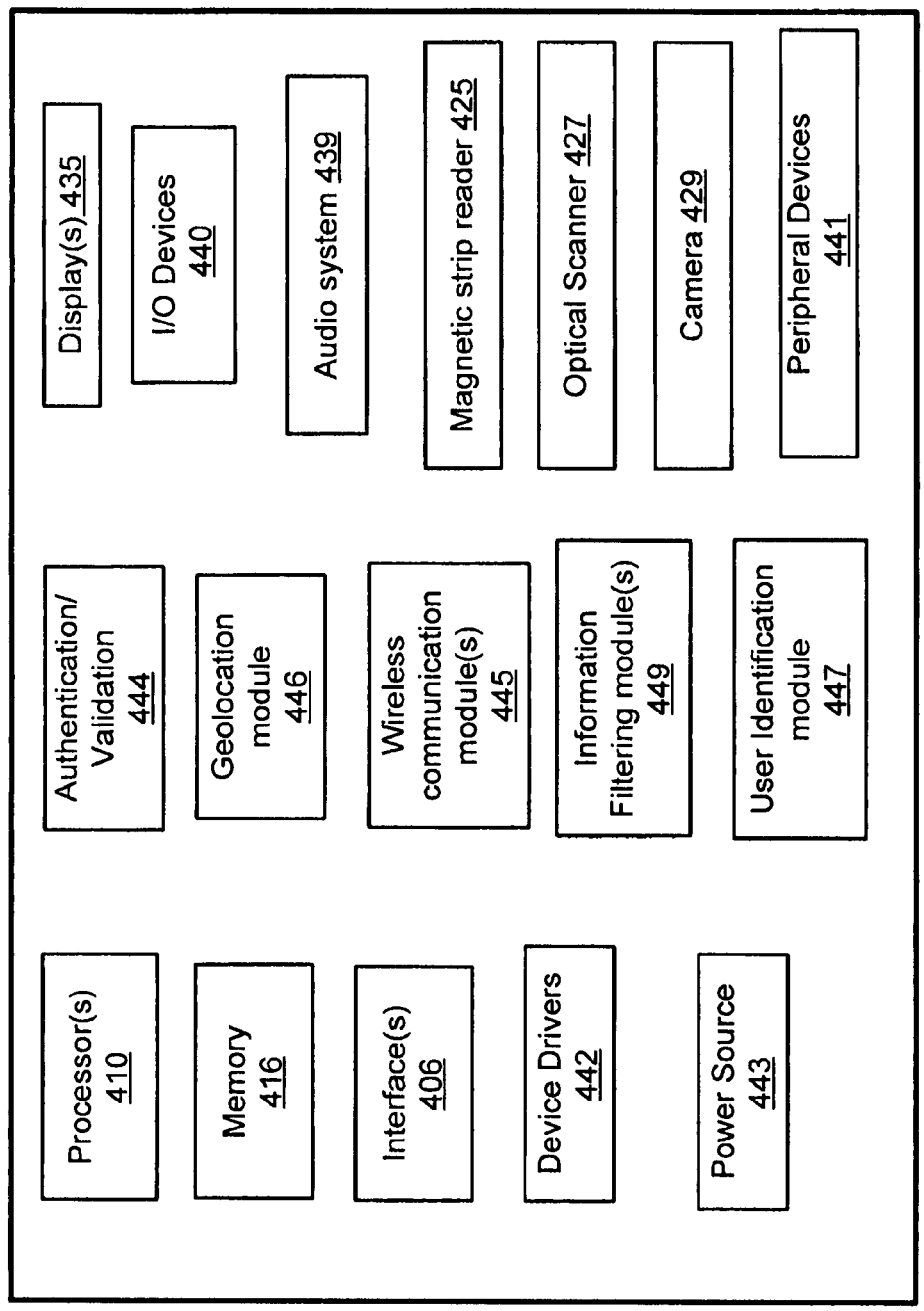
FIG. 4 is a simplified block diagram of an alternate example mobile device or handheld device 400 in accordance with another embodiment.

FIG. 4 is a simplified block diagram of an alternate example mobile device or handheld device 400 in accordance with another embodiment. As illustrated in the example of FIG. 4, handheld device 400 may include a variety of components, modules and/or systems for providing functionality relating to one or more aspects described herein. For example, as illustrated in FIG. 4, handheld device 400 may include one or more of the following:

- At least one processor 410.
- Memory 416, which, for example, may include volatile memory (e.g., RAM), non-volatile memory (e.g., disk memory, FLASH memory, EPROMs, etc.), unalterable memory, and/or other types of memory. Interface(s) 406 which, for example, may include wired interfaces and/or wireless interfaces.
- Device driver(s) 442. In at least one implementation, the device driver(s) 442 may be operable to implement features and/or functionality similar to other device driver(s) described herein.
- At least one power source 443. In at least one implementation, the power source may include at least one mobile power source for allowing the handheld device to operate in a mobile environment.
- Authentication/validation components 444 which, for example, may be used for authenticating and/or validating local hardware and/or software components and/or hardware/software components residing at the handheld device. In at least one implementation, the authentication/validation component(s) 443 may be operable to implement features and/or functionality similar to other authentication/validation components described herein.
- Geolocation module 446 which, for example, may be configured or designed to acquire geolocation information from remote sources and use the acquired geolocation information to determine information relating to a relative and/or absolute position of the handheld device. For example, in one implementation, the geolocation module 446 may be adapted to receive GPS signal information for use in determining the position or location of the handheld device. In another implementation, the geolocation module 446 may be adapted to receive multiple wireless signals from multiple remote devices (e.g., gaming machines, servers, wireless access points, etc.) and use the signal information to compute position/location information relating to the position or location of the handheld device.
- Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- User Identification module 447. In one implementation, the User Identification module may be adapted to determine the identity of the current user or owner of the handheld device. For example, in one embodiment, the current user may be required to perform a log in process at the handheld device in order to access one or more features. Alternatively, the handheld device may be adapted to automatically determine the identity of the current user based upon one or more external signals such as, for example, an RFID tag or badge worn by the current user which provides a wireless signal to the handheld device for determining the identity of the current user. In at least one implementation, various security features may be incorporated into the handheld device to prevent unauthorized users from accessing confidential or sensitive information.
- Information filtering module(s) 449.
- One or more display(s) 435.
- One or more user I/O Device(s) 430 such as, for example, keys, buttons, scroll wheels, cursors, touchscreen interfaces, motion detection/gesture interpretation interfaces, audio command interfaces, etc.
- Audio system 439 which, for example, may include speakers, microphones, wireless transmitter/receiver devices for enabling wireless audio and/or visual communication between the handheld device 400 and remote devices (e.g., radios, telephones, computer systems, etc.). For example, in one implementation, the audio system may include componentry for enabling the handheld device to function as a cell phone or two-way radio device.
- Magnetic strip reader 425, which, for example, may be configured or designed to read information from magnetic strips such as those on credit cards, player tracking cards, etc.
- Optical scanner 427, which, for example, may be configured or designed to read information such as text, barcodes, etc.
- Camera 429 which, for example, may be configured or designed to record still images (e.g., digital snapshots) and/or video images.
- Other types of peripheral devices 431 which may be useful to the users of such handheld devices, such as, for example: PDA functionality; memory card reader(s); fingerprint or other biometric reader(s); image projection device(s); ticket reader(s); etc.

According to a specific embodiment, the handheld device 400 may be adapted to implement at least a portion of the features associated with the mobile game service system described in U.S. patent application Ser. No. 10/115,164, which is now U.S. Pat. No. 6,800,029, issued Oct. 4, 2004, which is hereby incorporated by reference in its entirety for all purposes. For example, in one embodiment, the handheld device 400 may be comprised of a hand-held game service user interface device (GSUID) and a number of input and output devices. The GSUID may include a display screen which may display a number of game service interfaces. These game service interfaces may be generated on the display screen by a microprocessor of some type within the GSUID. Examples of a hand-held GSUID which may accommodate the game service interfaces are manufactured by Symbol Technologies, Incorporated of Holtsville, N.Y.

In addition to the features described above, the handheld device of the present invention may also include additional functionality for displaying, in real-time, filtered information to the user based upon a variety of criteria such as, for example, geolocation information, casino data information, player tracking information, game play information, wager information, motion detection information, gesture interpretation information, etc.

As used herein, the term "handheld device" may be used to describe and variety of different types of electronic devices which may include, but are not limited to, one or more of the following (or combination thereof): mobile devices, wireless devices, portable devices, contactless devices, etc.

According to specific embodiments, the handheld device may be implemented a wrist bracelet (e.g., bracelet, wrist watch, etc.) that contains electrical circuitry used to sense the movement of the wrist. The wrist bracelet may also be operable to transmit information relating to detected wrist movement(s) to one or more receiver(s) which, for example, may be located within a casino game table, gaming machine, kiosk, and/or systems/devices. According to specific embodiments, the wrist bracelet may be operable to transmit information relating to detected wrist movement(s) via one or more wireless communication interfaces such as, for example, those utilizing radio frequency waves, light beams, ultrasonic waves, and/or other wireless transmission mediums.

According to one embodiment, this wrist bracelet may utilize one or more MEMS (Micro Electro Mechanical System) accelerometers for sensing or detecting acceleration of the bracelet (e.g., that is warn by the user). In at least one embodiment, the wrist bracelet may include a plurality of MEMS accelerometers, a low power transmitter, and a battery, and may be operable to transmit information relating to detected wrist movement(s) to one or more receivers associated with one or more game tables and/or gaming machines. In one embodiment, the transmitted signal(s) may include data such as, for example: start header, serial number, acceleration in the X, Y, and Z axes, end of message header, and/or other desired information. In one embodiment, the serial number may be expressed using alpha-numeric characters, and assigned to the user of the handheld device. Further, in at least one embodiment, the analog acceleration data may be digitized and fed into a multiplexer. In one embodiment, the data out of the multiplexer may be sent to an RF transmitter operable to transmit this information on ISM bands and/or other frequencies reserved for RFID communications.

According to a specific embodiment, a receiver used for receiving the motion information from the wrist bracelet may be implemented as a multi-channel, multi-frequency receiver, in order to allow the receiver to receive signals from multiple different transmitters at the same time, for example. In one embodiment, each transmitter may be assigned a dedicated frequency and channel to transmit on. In other embodiments several different transmitters may be coordinated to transmit their respective data on the same frequency at a different time intervals (e.g., different time slots). Alternatively, communication between the transmitters and receiver may be accomplished by assigning different modulation methods for each transmitter. For example, frequency modulation on one frequency may not interfere with amplitude modulation on the same frequency. Additionally, on/off keying may not interfere with either of the above modulation types.

According to various embodiments, different handheld devices may include different combinations of features which, for example, may include, but are not limited to, one or more of the following (or combination thereof):

Scrolling Menus—This technology may be used for scrolling through menus. For example, the user (e.g., player) may tilt the handheld device forward, backwards or to ether side to scroll through different menus and/or other information, such as, for example, selecting different games to play (e.g., via the handheld device).

Navigation Through Menus—Menu scrolling/navigation of the handheld device may be accomplished via tilting motions and/or other gestures performed by the user. In at least some embodiments, such a feature may be enabled in combination with other input from the user (such as, for example, the depressing of a specific button or key on the handheld device).

Volume Control—Volume control of the handheld device may be accomplished via tilting motions and/or other gestures performed by the user. For example, as the unit is tilted forward, the volume may be increased, and as the unit was tilted backwards, the volume may be decreased. In at least some embodiments, such a feature may be enabled in combination with other input from the user (such as, for example, the depressing of a specific button or key on the handheld device).

Speed Of Play—Speed of play of a particular game at the handheld device may be controlled via tilting motions and/or other gestures performed by the user. In at least some embodiments, such a feature may be enabled in combination with other input from the user (such as, for example, the depressing of a specific button or key on the handheld device).

Change Settings—Wager and/or denomination settings may be changed via tilting motions and/or other gestures performed by the user at the handheld device. For example, in one embodiment, if the unit was tilted left, the wager to be placed may decrease, and if tilted to the right, the wager to be placed may increase. In at least some embodiments, such a feature may be enabled in combination with other input from the user (such as, for example, the depressing of a specific button or key on the handheld device).

Fast Advancing Using Acceleration—Rapid advancement through one or more menus/scrolling may be accelerated, for example, by the user accelerating the handheld device. An the handheld device may be operable to analyze the amount of acceleration and advance menu navigation and/or scrolling in a manner which is proportionate or relative to the acceleration. For example, in one embodiment, if a large amount of acceleration was detected, the handheld device may rapidly advance through one or more menus, and if small amount of acceleration was detected, the handheld device may slowly advance through one or more menus.

Thump As A Button—The accelerometer sensor(s) of the handheld device may be utilized as a virtual "thump" button. For example, in one embodiment, if the user thumped on the outside case of the handheld device (e.g., by hitting the handheld device with an object, or causing the handheld device to hit or bump into an object), the thump may be detected by the accelerometer(s) and used, for example, as an input selection mechanism (e.g., in order to select an item that is being highlighted on the display of the handheld device).

Menu Overlay—A menu overlay may be used (e.g., in conjunction with a stationary indicator) such that, as the user tilted the handheld device in various directions, the displayed menu(s) or other objects displayed may move under the stationary indicator, thereby allowing the user to navigate from menu to menu or around menus that the user did not wish to select.

Maze Game Function—In this function (e.g., which may be initiated during a bonus game session) the player would tilt the handheld device (e.g., in different directions) to navigate an object through a maze. An example may be "Bull in a China Cabinet" game. As the player tilted the handheld device, the bull would be shown moving through the china cabinet, and various points/bonuses may be awarded. In one embodiment, play of the bonus game may be terminate when the bull contacts or breaks an object in the game. According to different embodiments, this type of game may be implemented as a game of skill, a game of chance (e.g., having a random outcome) and/or some combination thereof.

Simulated Game of Skill but Random—The actions of tilting the handheld device in various directions may be used to facilitate play of a simulate a game of skill with a random outcome.

Fixed Object, Movable Graphics—A fixed ball or other reference object (e.g., in the center of the handheld device display screen) may be moved through a movable graphical maze, for example, by tilting the handheld device in various directions.

Fixed Graphics, Movable Objects—A fixed graphical maze may be used with a movable ball and/or other movable objects by tilting the handheld device in various directions.

Movable Graphics and Movable Ball—Tilting the handheld device (e.g., in various directions) moves all objects which are displayed.

Spinning of Reels—Spinning of reels (e.g., such as those displayed at the handheld device, or at a gaming machine or slot machine) may be accomplished via tilting motions and/or other gestures performed by the user. In at least some embodiments, such a feature may be enabled in combination with other input from the user (such as, for example, the depressing of a specific button or key on the handheld device). For example, when the handheld device is tilted backwards, the reels may be cocked. Tilting the handheld device forward may initiate spinning of the reels. Tilting the handheld device to either side may initiate stopping of the reels.

Dice Throwing—Dice throwing may be accomplished via tilting motions and/or other gestures performed by the user. In at least some embodiments, such a feature may be enabled in combination with other input from the user (such as, for example, the depressing of a specific button or key on the handheld device).

Spinning Wheel—Spinning of a wheel (e.g., at a gaming machine, or displayed at the handheld device) may be accomplished via tilting motions and/or other gestures performed by the user. In at least some embodiments, such a feature may be enabled in combination with other input from the user (such as, for example, the depressing of a specific button or key on the handheld device).

Tilt To Get Another View Of An Object—Tilting the handheld device in various directions may allow the user to view an object from different perspectives or reference points, for example, in order, for example, to see the back of the object, through the object, around the object, and the like.

Game Play—Tilting, rocking and or other gestures at the handheld device may be used to facilitate play of various games played at the handheld device such as, for example, a coin pitching game and/or other games which may be played either at the handheld device or on remote systems via the handheld device.

Game Play Examples

The following examples are intended for illustrative purposes.

In a first example embodiment, an electronic Black Jack game table may be provided which may be controlled by a master table controller. Each player at the game table may be provided with a respective LCD display. Using an embodiment of a handheld device as described herein, a human dealer may deal a virtual deck of cards, for example, by performing gross hand motions similar to those performed when dealing an actual deck of cards. The dealt cards may be displayed on the LCDs in front of the players. Using their respective handheld devices, the players may input their game play instructions using hand movements and/or other gestures.

In another example embodiment the operation of a spinning reel game may be facilitated via the use of the handheld device. In embodiments where the game is to be played at the handheld device, the selecting of one of the spinning reel games may be implemented using forward, backward and/or sideways tilting actions (and/or other gestures) conducted at the handheld device. In other embodiments, the handheld device may be registered or activated for use at a selected remote system (e.g., gaming machine, game table, etc) where the game play is conducted. In one embodiment, wagers may also be placed on the outcome of the game, for example, via tilting actions and/or other gestures conducted at the handheld device. For example, in one embodiment, by rocking the top of the handheld device back toward the player, the reels may be cocked. In one embodiment, the cocking of a reel may include moving the reel backwards about one half of a stop. Tilting the handheld device forward may initiate spinning of the reels. In one embodiment, the reels may automatically coast to a stop with the winning reel positions on the selected pay lines and the winner may be paid accordingly.

In another example embodiment, the operation of a dice game may be facilitated via the use of the handheld device. In embodiments where the game is to be played at the handheld device, the selecting of one of the dice games may be implemented using forward, backward and/or sideways tilting actions (and/or other gestures) conducted at the handheld device. In other embodiments, the handheld device may be registered or activated for use at a selected remote system (e.g., gaming machine, game table, etc) where the game play is conducted. In one embodiment, wagers may also be placed on the outcome of the game, for example, via tilting actions and/or other gestures conducted at the handheld device. According to one embodiment, a player may simulate the shaking of virtual dice by performing a shaking gesture at the handheld device. The player may execute or initiate the dice throw, for example, by performing a gesture with the handheld device which simulates a dice throw gesture (e.g., corresponding to movements typically conducted when performing a dice throw with conventional dice). In one embodiment, the dice may automatically stop tumbling, and the winning bets may be paid.

In another example embodiment the operation of a roulette wheel may be facilitated via the use of the handheld device. In embodiments where the game is to be played at the handheld device, the selecting of one of the roulette game may be implemented using forward, backward and/or sideways tilting actions (and/or other gestures) conducted at the handheld device. In other embodiments, the handheld device may be registered or activated for use at a selected remote system (e.g., gaming machine, game table, etc) where the game play is conducted. In one embodiment, wagers may also be placed on the outcome of the game, for example, via tilting actions and/or other gestures conducted at the handheld device. According to different embodiments, a player may rock or twist the handheld device backwards/forwards and/or clockwise/counter-clockwise (and/or perform other gestures at the handheld device) to initiate spinning of the roulette wheel. In one embodiment, the player may perform additional movements or gestures at the handheld device to initiate launching of the roulette ball into the roulette wheel. In one embodiment, the roulette wheel may automatically slow down to allow the ball to land in one of the numbered positions on the roulette wheel. The winning bets may then be paid.

In another example embodiment the operation of a card game may be facilitated via the use of the handheld device. In embodiments where the game is to be played at the handheld device, the selecting of one of the card games may be implemented using forward, backward and/or sideways tilting actions (and/or other gestures) conducted at the handheld device. In other embodiments, the handheld device may be registered or activated for use at a selected remote system (e.g., gaming machine, game table, etc) where the game play is conducted. In one embodiment, wagers may also be placed on the outcome of the game, for example, via tilting actions and/or other gestures conducted at the handheld device. In one embodiment, real or virtual cards may be dealt, and a player may perform movements or gestures at his or her handheld device in order to input game play instructions. For example, in one embodiment, the player may rock the handheld device forward to discard a card, rock the handheld device to the right to select the next card to the right, rock the handheld device to the left to select the next card to the left. After all card selections have been made, the user may perform one or more other gestures at the handheld device to advance the game to the next state.

Figure 5:
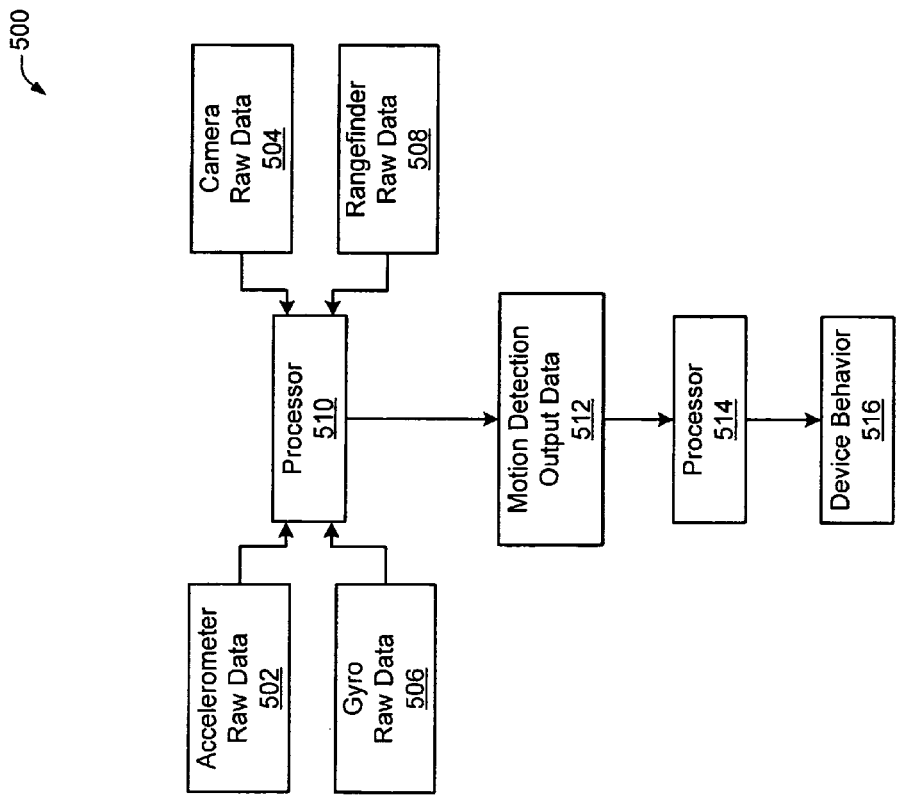
FIG. 5 shows an example of a data flow diagram in accordance with a specific embodiment.

FIG. 5 shows an example of a data flow diagram in accordance with a specific embodiment. As illustrated in the example of FIG. 5, raw data from various motion detection components may be processed at processor 510. Such raw data may include, but is not limited to, one or more of the following (or combination thereof): accelerometer raw data 502 (e.g., x-axis accelerometer raw data, y-axis accelerometer raw data, and/or z-axis accelerometer raw data); camera raw data 504 (e.g., from one or more cameras); gyro raw data 506 (e.g., from one or more gyros); rangefinder raw data 508 (e.g., from one or more rangefinders); etc. If the handheld device includes more, fewer or different motion detection components as may be the case in some embodiments, the raw data may correspond to the components which are included.

In at least one embodiment, the raw data may be processed at one or more processors (e.g., 510) to produce motion detection output data 512. In at least one embodiment, the motion detection output data 512 may include translation data (e.g., along x, y and/or z axes) and/or rotation data (e.g., with respect to the x, y and/or z axes). In one embodiment, the motion detection output data 512 may be provided to one or more additional processors (e.g., 516) which may be operable to analyze and interpret the motion detection output data in order to identify the operation(s), function(s) and/or task(s) which the handheld device may perform (i.e., device behavior 516) in response to the detected movements of the handheld device.

Figure 6:
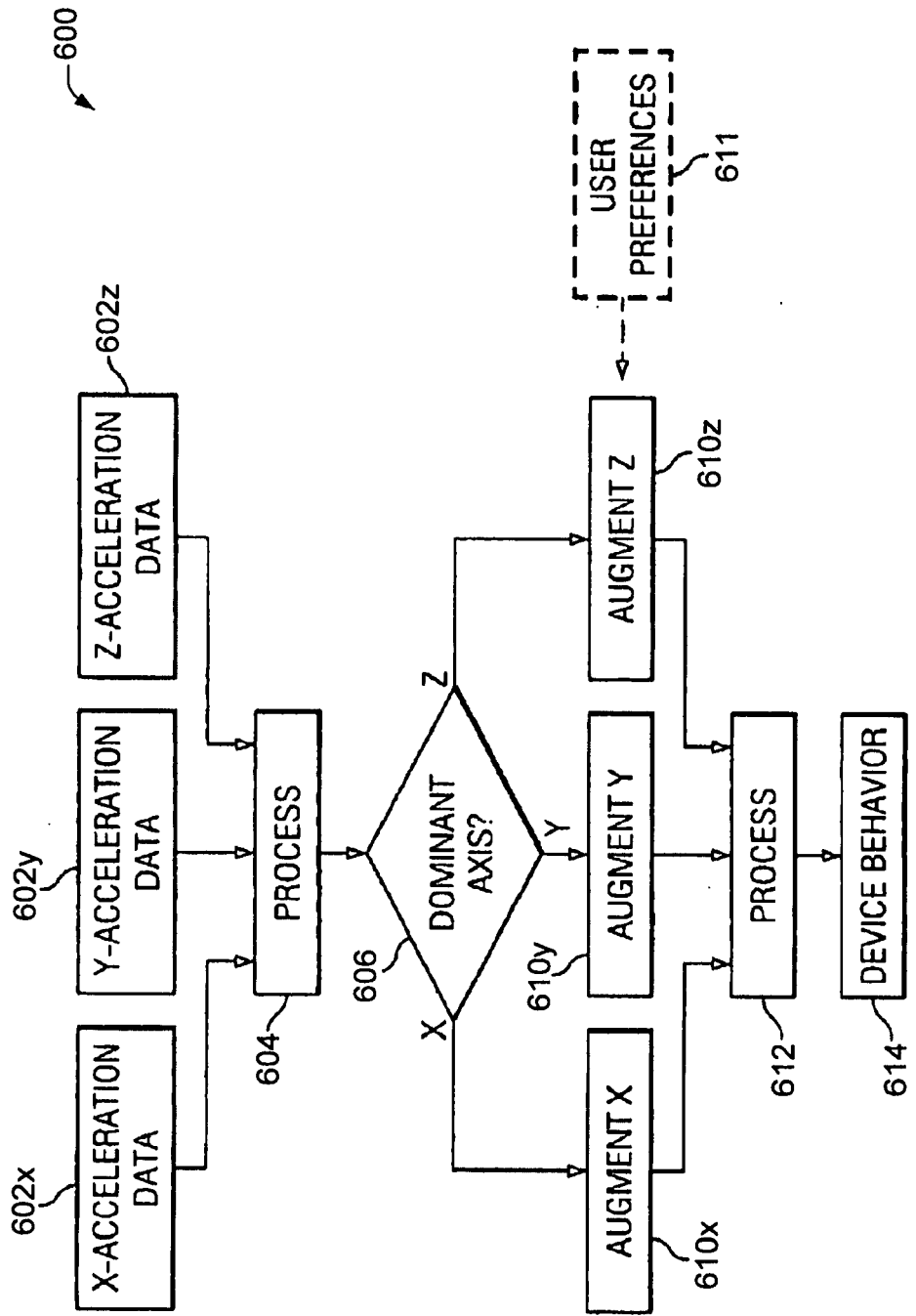
FIG. 6 shows a flow diagram of a Motion Selection Procedure 600 in accordance with a specific embodiment.

FIG. 6 shows a flow diagram of a Motion Selection Procedure 600 in accordance with a specific embodiment. In the example of FIG. 6, it is assumed that raw data corresponding to movement of a handheld device is received. In one embodiment, the raw movement data may include x-acceleration data 602x, y-acceleration data 602y and/or z-acceleration data 602z. In at least one embodiment, the movement data may be processed (604) to yield an output indicating movement of the handheld device. Other embodiments may include other types of movement data, such as, for example, optical or camera data, gyro data, rangefinder data, etc.

As shown at 606 at least one operation may be performed to determine, identify, and/or select a dominant axis of motion. In at least one embodiment, detected movement along the identified dominant axis may be augmented or modified, for example, in order to increase it's significance with respect to particular application(s). For example, in one embodiment, if the identified dominant axis of motion is the x-axis, then the movement along the x-axis may be augmented (610x). If the identified dominant axis of motion is the y-axis, then the movement along the y-axis may be augmented (610y). If the identified dominant axis of motion is the z-axis, then the movement along the z-axis may be augmented (610z). In some embodiments, it may be desirable to select two axes as the dominant or primary axes. In such embodiments, detected movement along each of the identified dominant axes may be individually augmented.

According to specific embodiments, the amount or degree of augmentation of movement in the dominant axis of motion may vary in different embodiments, for example, according to the application(s) being utilized or other characteristics. In some embodiments, user preferences 611 may be utilized to determine type(s) and/or amount(s) of movement augmentation. According to specific embodiments, movement along axes other than the dominant axis of motion may also be augmented (e.g., minimized), for example, in order to reduce or eliminate it's significance with respect to particular application(s).

As shown at 612, the augmented movement(s) may be processed to yield device behavior information 614. According to specific embodiments, such processing may include accessing an application to determine the particular device behavior(s) to perform based on the augmented movement(s). Augmented movement(s) may yield different types of device behavior(s) based, for example, on specific application(s), specific user(s), specific environment(s), etc.

For particular user interfaces utilizing motion input, there may be value in displaying the relative location or position of the handheld device (e.g., via information displayed at display 112 of handheld device 110). For example, in particular embodiments using translation-based input such as for navigating a map displayed at the handheld device, the position of the handheld device may directly determine the portion of the map displayed at display 12. However, if device position information is kept in absolute terms (e.g., as with global positioning satellite (GPS) based systems) the utility for many tasks such as map or menu navigation may be impaired. Thus, it is beneficial in certain circumstances to define a "zero point," or an origin in a local context, that may be used to determine the behavior of the handheld device. For example, if a zero point is defined when the handheld device is at a point A, then motion between point A and a point B may be used as input. Particularly useful applications of setting a zero point may include external behaviors such as moving the virtual display or locating applications in the space around a user's body. Setting a zero point also addresses internal behaviors such as instructing the handheld device to ignore the gravitational acceleration at the current orientation to allow the handheld device to act only on additional, and presumably user generated, accelerations.

Handheld devices according to particular embodiments may include application user interfaces that utilize motion input only at certain times. At other times, for example, the motion of the handheld device may not be utilized as input, and it may be useful to disengage or "turn off" motion sensitivity or the motion detection capability of the handheld device. Disengagement of motion sensitivity may comprise, for example, deactivation of one or more motion detectors, motion sensors, and/or other components, such as, for example, a motion response module of the handheld device. Particular embodiments thus allow for the selective engagement and disengagement of the motion sensitivity of the handheld device.

As an example, a motion response module which modifies display based on motion detected by one or more motion detection components of the handheld device, may have a mode of operation in which it awaits a trigger for switching to another mode of operation in which motion sensitivity is enabled. According to a specific embodiment, when motion sensitivity is not enabled, motion of the handheld device may be disregarded. The trigger may also set a zero-point for the handheld device. When the zero-point is set, the motion response module may measure a baseline orientation of the handheld device based, for example, on measurement from motion detection components. The baseline orientation may comprise the position of the handheld device (determined, for example, from information from motion detector components) when the trigger is received. Future movement of the handheld device may be compared against the baseline orientation to determine the functions to perform or the modifications which should be made to displayed information (e.g., based on the user's motion of the handheld device).

Particular embodiments provide for any number of user-initiated actions (or combinations thereof) to act as a trigger for zero-point selection and selective engagement/disengagement of the motion sensitivity of the handheld device. Such actions may include, for example, the pressing of a key on input, moving device in a particular way (e.g., movement corresponding to a particular gesture), tapping on the touchscreen, and/or other designated actions/events. In at least one embodiment, specific user-initiated action(s) may set a zero-point and/or may engage motion sensitivity of the handheld device. In some embodiments, a period of inactivity or minimal activity (i.e., relative stillness) may also be used to set a zero-point and/or to engage or disengage motion sensitivity.

Figure 7:
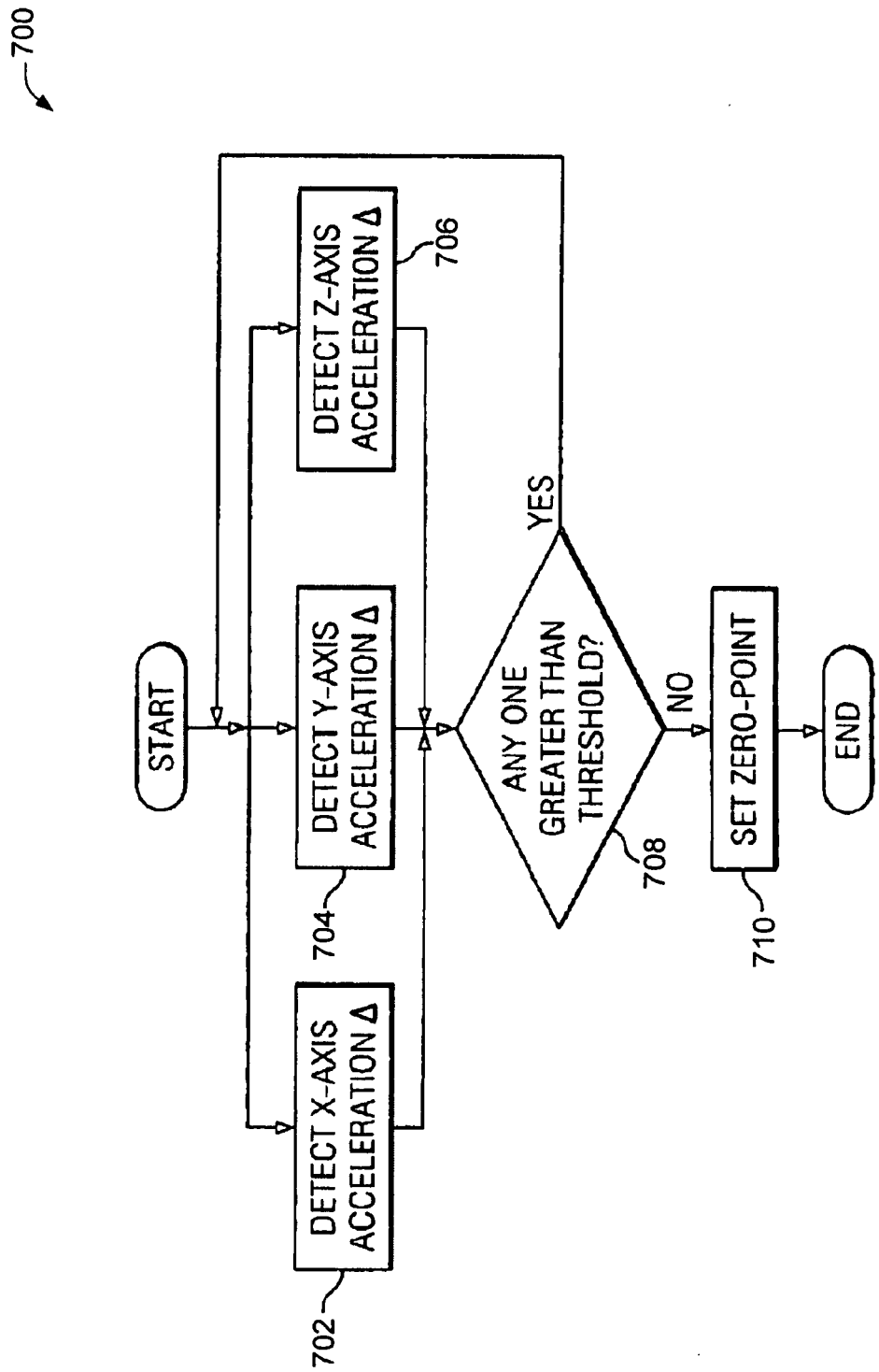
FIG. 7 illustrates a flow diagram of a Zero Point Setting Procedure 700 in accordance with a specific embodiment.

FIG. 7 illustrates a flow diagram of a Zero Point Setting Procedure 700 in accordance with a specific embodiment. In one embodiment, the Zero Point Setting Procedure may be initiated for the passive setting of a zero-point for a handheld device.

As illustrated in the example of FIG. 7, the handheld device may be operable to monitor and/or detect changes in acceleration with respect to one or more specified axes (e.g., change in acceleration with respect to an x-axis 702, change in acceleration with respect to a y-axis 704, and/or change in acceleration with respect to a z-axis 706.

As shown at 708, at least one action or operation may be initiated to determine whether any detected acceleration change exceeds one or more specified threshold value(s). For example, in one embodiment, if detected acceleration change along each (or selected axes) of the three axes is not greater than a predetermined threshold, then the handheld device may be considered to be at rest, and a zero-point may be set (710) in response. According to one embodiment, an at rest position may be determined, for example, from stabilization of the raw data and/or from data received from motion components of one or more motion detection devices at the handheld device. In at least one embodiment, if detected acceleration changes along one or more specified axes is greater than predetermined threshold value(s), then it may be determined that the handheld device is not currently at rest, and no zero point set.

In one embodiment, the technique of passively setting a zero-point may help to ensure that when the handheld device is at rest, a zero point is able to be set. In at least one embodiment, the threshold values may be used to determine whether an acceleration change is high enough so as to trigger (or not to trigger) the setting of a zero-point. For example, in one embodiment, a user is able to passively set the zero point by holding the handheld device relatively still for a predetermined time period. It should be understood that, in at least some other embodiments, similar techniques may be used in connection with motion detector components other than accelerometers. Thresholds may also be used in such similar methods to account for small, unintended movements that may otherwise prevent setting of a zero point.

Particular embodiments may include functionality for allowing a user to repeatedly selectively engage and disengage the motion sensitivity of the handheld device in order to allow greater movement through a virtual desktop (or information space) using motion input. Such functionality may be useful, for example, in environments where there is a limited amount of physical space available for the user to move the handheld device. This process can be analogized to "scrubbing" with a mouse controlling a cursor, or lifting the mouse off of a surface and replacing the mouse on the surface at a different location to allow greater movement of the cursor. Lifting the mouse breaks the connection between the motion of the mouse and the motion of the cursor. Similarly, a user may be able to engage and disengage the connection between the motion of a handheld device and the operations, functions and/or actions based on movement of the handheld device.

Figure 8:
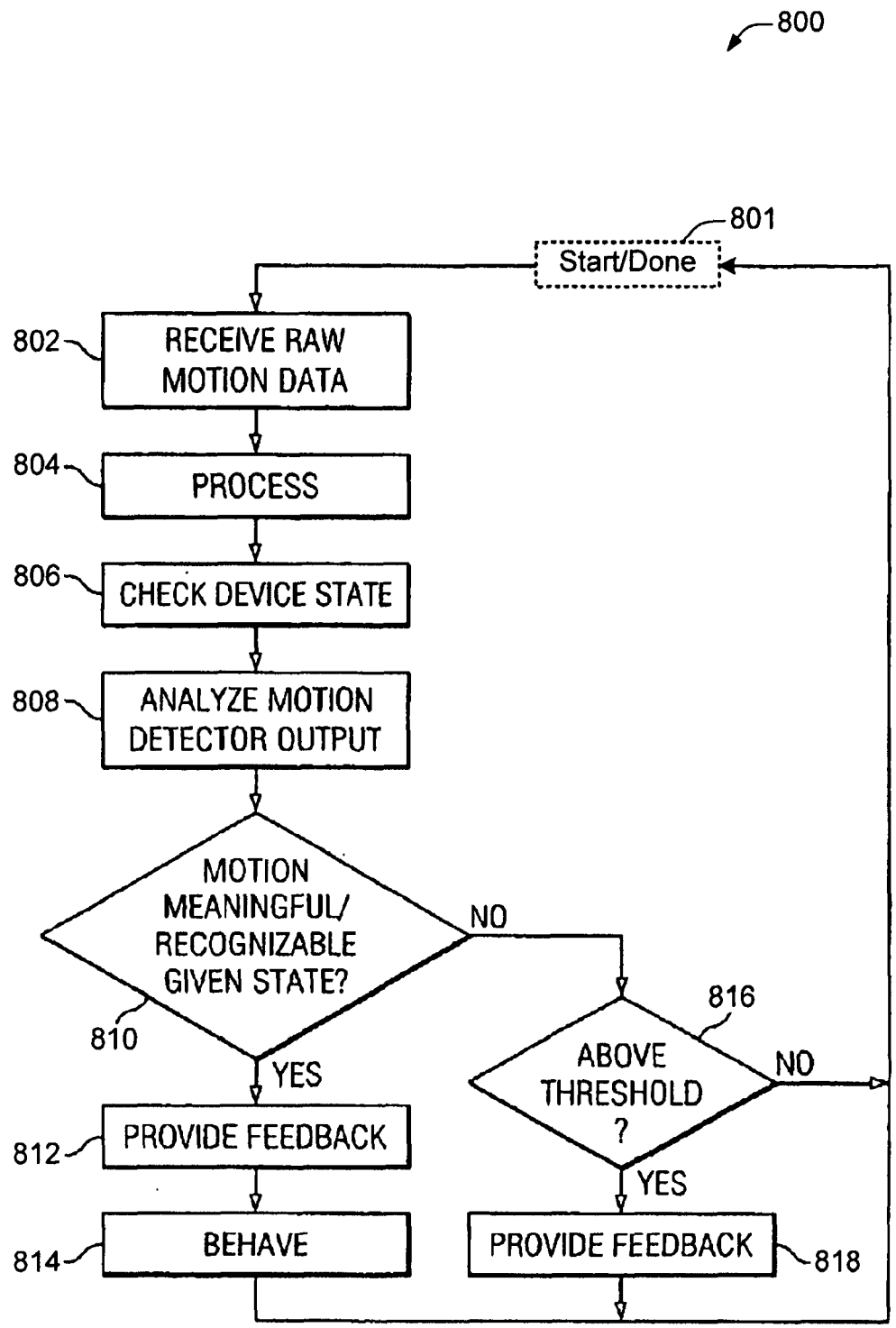
FIG. 8 shows a flow diagram of a Motion Input-Feedback Procedure 800 in accordance with a specific embodiment.

FIG. 8 shows a flow diagram of a Motion Input-Feedback Procedure 800 in accordance with a specific embodiment. In at least one embodiment, the handheld device may be operable to automatically and dynamically adapt its interpretation of motion input data based upon various types of feedback data.

At 802 it is assumed that raw motion data is received at handheld device. As described above, the raw motion data may be generated by any combination of accelerometers, gyros, cameras, rangefinders or any other suitable motion detection components.

At 804, the raw motion data is processed to produce a motion detector output indicative of the motion of the handheld device. Such processing may include various filtering techniques and fusion of data from multiple detection components.

At 806, the handheld device state or operating mode may be checked. In some embodiments the feedback for a particular motion may depend on the state or mode of operation of the handheld device when the motion is received. Example device states may include, but are not limited to, one or more of the following (or combination thereof):
    menu navigation mode;
    device configuration mode;
    device status check mode;
    resources status check mode;
    silent mode;
    telephone mode;
    PDA mode;
    application specific execution mode;
    Internet access mode;
    active game play mode;

player/user game play input mode;
player/user wager input mode;
bonus game mode;
spinning reel game play mode;
dice game play mode;
roulette game play mode;
card game play mode;
map display mode;
entertainment mode;
bar mode;
restaurant mode;
casino services access mode;
diagnostics mode;
learning mode;
etc.

At 808, the motion detector output may analyzed with respect to the current state or mode of operation of the handheld device.

At 810, a determination is made as to whether the motion indicated by the motion detector output is meaningful or otherwise recognizable given the current state or operating mode of the handheld device. For example, a particular gesture may be interpreted as corresponding to a certain function (or set of functions) in one mode of operation (e.g., menu navigation mode) while the gesture may be interpreted as corresponding to a different function (or different set of functions) in a second mode of operation (e.g., active game play mode).

In one embodiment, if it is determined that the gesture is recognizable or meaningful in light of the state or operating mode of the handheld device, then appropriate feedback may be provided (812). According to specific embodiments, such feedback may be presented in a variety of different formats such as, for example, audio, visual and/or vibratory formats. In some cases the feedback may merely be an indication that the handheld device recognizes the gesture given the current state or mode of operation of the handheld device. In other cases, the feedback may include a further query for additional input, for example, if the user was utilizing a particular application of the handheld device that provided for a series of inputs to perform one or more functions.

As shown at 814, the handheld device may behave in accordance with a response to the gesture (e.g., corresponding to the motion input) which has been interpreted with respect to the device state/operating mode.

According to at least one embodiment, if it is determined (e.g., at 810) that the motion indicated by the motion detector output is not meaningful or recognizable given the current state or operating mode of the handheld device, then a determination may be made as to whether the motion meets or exceeds specific threshold criteria. This determination may be made, for example, to determine whether particular motion input was, for example, intended to be a gesture. According to specific embodiments, the threshold criteria may include various types of information such as, for example: the amplitude of the motion input, the time course of the motion input, the number and spacing of accelerations of the motion, etc.

According to at least one embodiment, if it is determined (e.g., at 816) that the motion input does not meet or exceed specific threshold criteria, then no feedback data is generated (e.g., based on that motion input data). If, however, the motion input does meet or exceed specific threshold criteria, then it may be possible that a gesture had been intended but was not recognized. Accordingly, as shown at 818, appropriate feedback may be provided. According to specific embodiments, the feedback may include audio, visual and/or vibratory feedback, and may indicate that the gesture was not recognizable or properly interpretable. In particular embodiments, the feedback may also include a query regarding the intended gesture and/or may otherwise present the user with possible candidates of the intended gesture(s) from which the user may select the particular gesture intended.

It will be appreciated that at least some other embodiments may not include at least some of the operations described in the example of FIG. 8, while other embodiments may include additional operations and/or similar operations in different orders. Further, at least some embodiments may utilize different types of motion input feedback (e.g., including feedback "conversations") for different selected applications and/or modes of operations.

According to at least one embodiment, the handheld device may be operable to automatically and dynamically modify its motion/gesture interpretation capabilities, as desired. For example, in at least some situations where particular user movements or gestures are detected, but are not able to be interpreted (e.g., detection of a non-meaningful user gesture), a gesture interpretation tuning procedure may be implemented in order to improve the device's gesture interpretation capabilities.

Figure 19:
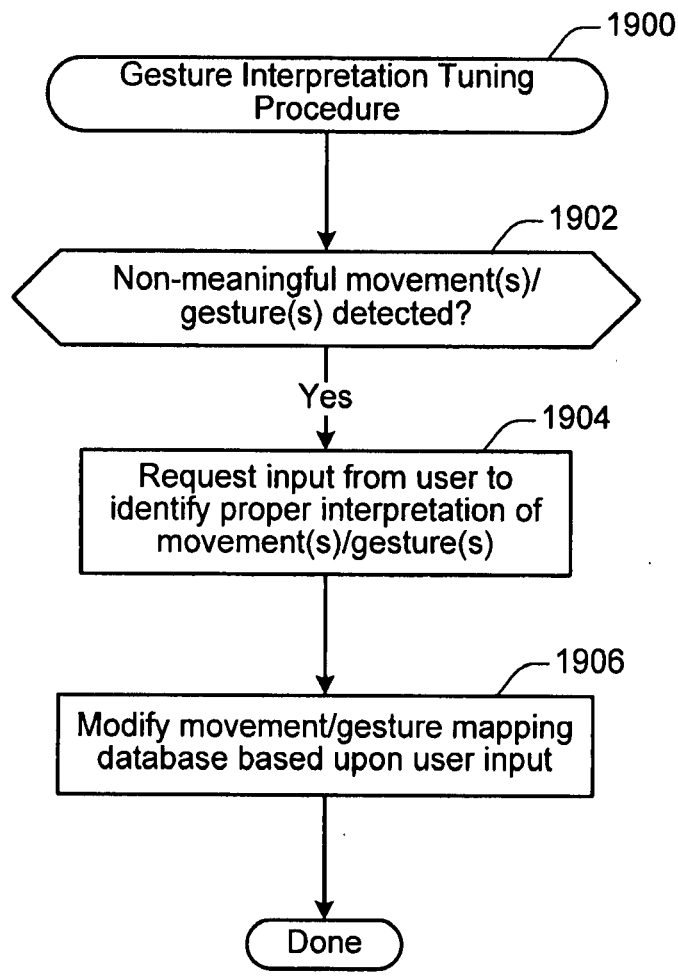
FIG. 19 shows a flow diagram of a Gesture Interpretation Tuning Procedure in accordance with a specific embodiment.

FIG. 19 shows a flow diagram of a Gesture Interpretation Tuning Procedure in accordance with a specific embodiment. As illustrated in the example of FIG. 19, when non-meaningful movement(s) and/or non-meaningful gesture(s) is/are detected (1902) at the handheld device, the handheld device may request (1904) input from the user in order to help identify the proper interpretation of the detected movement(s)/gesture(s). In at least some embodiments, the handheld device may identify a list of candidates corresponding to possible interpretations of a detected non-meaningful movement/gesture, and present the list of candidates to the user for selection. For example, in one example, the handheld device may display the following message to the user: "Was that a gesture for 'HIT ME'? (Y/N)". In at least one embodiment, the user may select one of the candidates suggested by the handheld device, or may provide additional input relating to a new or different interpretation (e.g., not suggested by the handheld device).

At 1906, at least a portion of the user's input may be used to modify the device's movement/gesture interpretation capabilities. For example, in one embodiment, at least a portion of the user's input may be used to modify information stored in a movement/gesture mapping database which may be used by the handheld device to perform movement/gesture detection, analysis, and/or interpretation. For example, in one embodiment, a new profile may be added to the movement/gesture mapping database which characterizes the newly identified motion/gesture, and which maps the identified movement/gesture to the interpretation indicated by the user. In another embodiment, characteristics of existing movement/gesture profiles in the movement/gesture mapping database may be modified based upon the characteristics of the newly identified motion/gesture and/or based upon the user's input.

According to specific embodiments, various handheld devices described herein may receive gesture motion input to control a variety of functions relating to applications running at the handheld device and/or relating to applications running at remote devices and/or systems.

Some applications which may be operable to utilize gesture input (e.g., via the handheld device) may include gaming activities conducted at game tables or gaming machines. In at least one embodiment, some form of authentication may be implemented to authenticate a player or user of the handheld device, such as, for example, a personal identification numbers (PINs), credit card information, player tracking information, etc. Another form of authentication may include a user's written signature, and at least some embodiments described herein may utilize motion input (e.g., detected at the handheld device) to receive a user's signature as a form of authentication.

According to specific embodiments, a written signature (e.g., on paper) may be considered a two dimensional record of a gesture. When utilizing a handheld device with motion input, a user's signature may be represented in three dimensions and may thus comprise a "spatial signature." Moreover, when combined with other forms of input received at the handheld device, a user's signature can take on any number of dimensions (e.g., four, five or even more dimensions). For example, a three-dimensional gesture "written" in space using the handheld device and detected at motion detector component(s) 122 may be combined with key-presses and/or other inputs to increase the number of dimensions of the signature.

According to at least one embodiment, these spatial signatures may be tracked, recorded, and/or analyzed by one or more motion detector of handheld devices. Additionally, at least a portion of the spatial signatures may be recorded with varying degrees of precision (e.g., by different motion detector components) to serve as an effective form of authentication. For example, in one embodiment, a user's spatial signature may comprise a three-dimensional form based on the user's traditional two-dimensional written signature and/or may comprise any other suitable gesture which the user records at the handheld device as his or her signature.

In some embodiments, the process for recognizing a spatial signature may involve pattern recognition and learning algorithms. The process may analyze relative timings of key accelerations associated with the signature. These may correspond to starts and stops of motions, curves in motions and other motion characteristics. In some cases, some hash of a data set of a points of a signature motion may be stored, and subsequent signatures may be compared against the hash for recognition. This may further verify if the signature was genuine by determining whether it was unique. For example, in particular embodiments, a signature may be detected (e.g., by a signature detection module) by comparing a particular movement of the handheld device with respect to an initial or reference position. Such comparison may be made by comparing a sequence of accelerations of the movement with a predetermined sequence of accelerations of a stored spatial signature. In at least some embodiments, this determination may be made regardless of the scale of the user's input motion signature. Further, in at least some embodiments, the handheld device may be operable to detect whether motion of the handheld device matches a signature by determining whether positions of the handheld device in motion (e.g., relative to an initial position) match the spatial signature.

Figure 9:
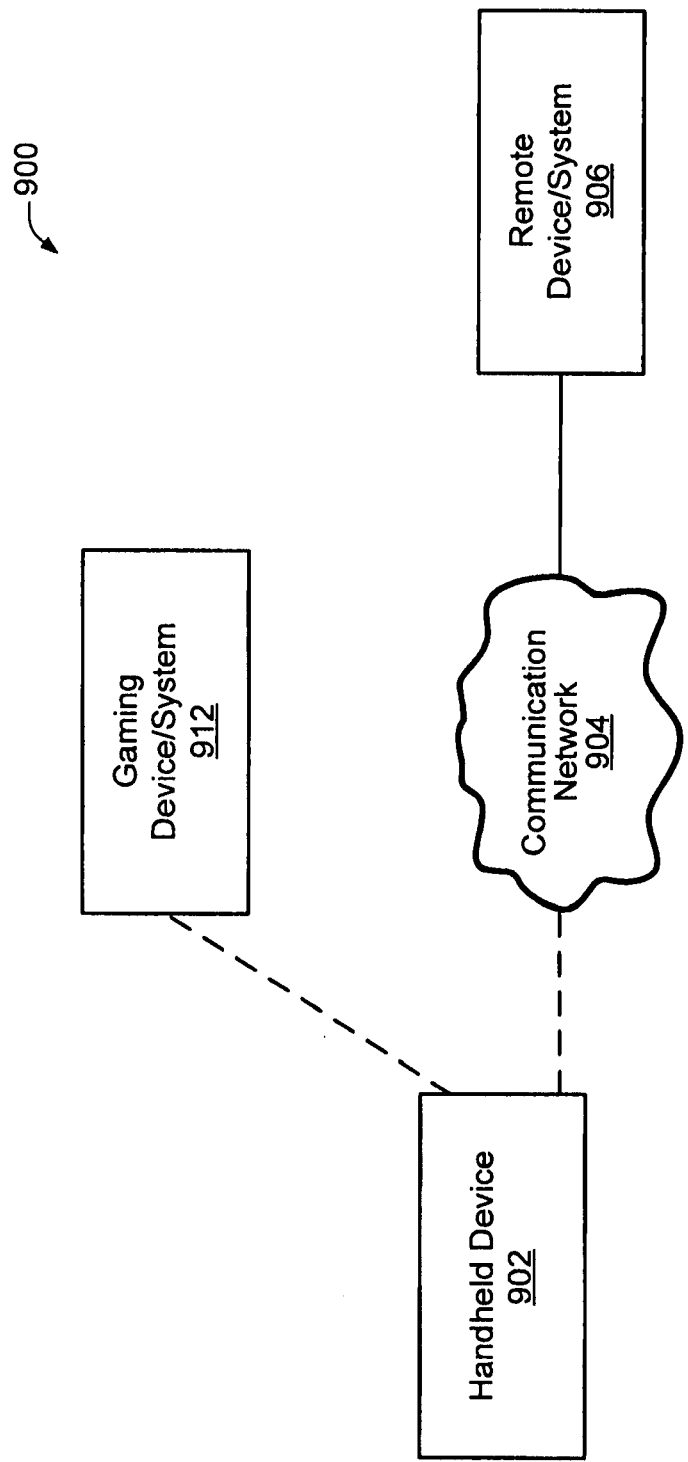
FIG. 9 illustrates an example of network portion 900, which may be used for illustrating various aspects and/or features described herein.

FIG. 9 illustrates an example of network portion 900, which may be used for illustrating various aspects and/or features described herein. In at least one embodiment, handheld device 902 may be operable to receive gesture input from a user and provide user instructions (and/or other input information) to one or more gaming systems, gaming devices, game tables, and/or remote systems of a gaming network.

As shown in the example of FIG. 9, handheld device 902 may communicate with one or more gaming device(s)/system(s) 912 and/or one or more remote device/system(s) 906 (e.g., via communication network 904).

According to one embodiment, handheld device 902 may detect motion of the handheld device, and may generate raw motion data via one or more motion detection components, such as, for example, accelerometers, cameras, rangefinders, gyros, etc. The raw motion data may be processed at the handheld device. Particular databases (such as, for example, gesture and gesture mapping databases) may be accessed to determine matching gesture(s) and intended function(s) based on motion tracked by a control module of the handheld device. In one embodiment, the intended function may be intended for implementation at a different system/device (such as, for example, gaming device/system 912 and/or remote device/system 906) which, for example, may be responsive to instructions received from the handheld device 902. Further, in at least one embodiment, the motion/gesture detection functionality at the handheld device may be operable to serve as an interface for input, operation, and/or control signals communicated from handheld device 902 to the other device(s)/system(s). In other embodiments, the raw motion data or other data merely indicating a particular motion input for device 902 may be provided to gaming device/system 912 and/or remote device/system 906 for subsequent analysis and response.

In at least some embodiments, gaming device/system 912 and/or remote device/system 906 may be operable to process the raw motion data received from handheld device 902, for example, in order to determine one or more intended functions or operations to be performed based on the raw motion data. In some embodiments, a user of device 902 may indicate to device 902 (e.g., through motion or otherwise) the other device(s)/system(s) which are intended to receive instructions and/or other information from the handheld device. It will be appreciated that other embodiments may include different number(s) of devices and/or system(s) of varying types which may be responsive to instructions/information received from handheld device 902.

Specific embodiments described herein may include functionality for providing the ability to control other devices/systems through motion input of one or more handheld devices such as handheld device 902. In some embodiments a user of handheld device 902 may identify or select one or more device(s)/system(s) that the handheld device 902 is intended to control. For example, a user may use input of handheld device 902 (e.g., by pressing a button or moving a trackwheel) to select a local or remote device/system to control (and/or to provide user input to) before initiating movement of the handheld device for the purpose of conveying gesture input information. In some embodiments, a user may also move handheld device 902 according to a particular gesture in order to select the desired devices/systems (e.g., other local or remote devices/systems) for communication/control.

In yet other embodiments, the intended recipient (e.g., gaming device/system 912, remote device/system 906, etc.) of the user's gesture input information (which is input via the handheld device) may be dynamically and/or automatically selected based upon predetermined criteria such as, for example: proximity, authentication, user identity, device/system identity, user preferences, etc. For example, in at least some embodiments where a user of the handheld device is participating in (or desires to participate in) game play at a selected game table or selected gaming machine, the handheld device may be operable to provide the user's gesture input information to the selected game table or selected gaming machine.

According to specific embodiments, handheld device 902 may include a plurality of different gesture command maps which may be used to correlate input gestures (e.g., detected at the handheld device) with behaviors and/or commands to be implemented at one or more different recipient device(s)/ system(s). In one embodiment, a control module of the handheld device may select a particular command map corresponding to a specific type of device or system that has been selected or identified to receive input gesture information and/or commands from the handheld device. In some embodiments, handheld device 902 may include a device locator operable to detect, for each of a plurality of remote device/systems, a direction from the handheld device to each remote device/system.

While motion input for handheld device 902 may be used for interactions with other devices, other types of input mechanisms may also be used such as, for example, other types of input mechanisms described herein.

According to specific embodiments, handheld device 902 may be operable to detect motion of the handheld device via motion detection components, and may be operable to modify its behavior in some way according to the motion detected. Further, in at least some embodiments, at least some handheld devices may be operable to model of their particular environments and subsequently modify their behaviors based on such environments.

As an example, if a handheld device changes its behavior when moved according to a particular gesture, that may be considered sensing or detecting a particular motion and reacting based on the motion detected. However, in at least some embodiments, the interpretation of the handheld device motion (and subsequent responses/reactions) may be dependent upon the particular environment in which the handheld device is located.

In at least one embodiment, the handheld device may be operable to detect environmental conditions associated with a location of the handheld device. Additionally, the handheld device may be operable to initiate environmental modeling behaviors based upon detected environmental events and/or conditions. According to specific embodiments, environmental modeling may not require an immediate response to a user input. In at least one embodiment, modeling an environment may involve sensing or detecting a pattern of motion (or lack thereof), matching it to a predefined set of environmental conditions, and/or modifying the behavior of the handheld device based on the modeled environment. The behavior implemented based on the environment modeled may also change based on a particular application in use or in focus. In some cases, the handheld device may change its sensitivity to particular motions based on the environment modeled.

As an example, a handheld device may recognize (e.g., through accelerometers and/or other motion detection components) that it is at rest on an approximately horizontal surface. Such recognition may result from a determination that the handheld device is not moving, or still, with a static 1 g of acceleration orthogonal to a surface. The handheld device may be able to differentiate resting on a table from resting in a user's hand, for example, because a user's hand typically will not be able to hold the handheld device perfectly still. The handheld device may, in response, behave in a certain manner according to the recognition that it is at rest on an approximately horizontal surface.

For example, if handheld device 902 recognized that it was lying at rest on a table, it may power off (or go into standby mode or power save mode) in response to determining that it has been lying in such position for a specified amount of time. As another example, a cellular phone in a vibrate mode may vibrate more gently if it recognizes it is on a table upon receipt of a call or upon any other event that may trigger vibration of the phone. In some embodiments, the handheld device may recognize its orientation while lying on a table such that it may behave in one manner when lying in a "face down" position (e.g., it may power off the display), while it may behave in a different manner when lying in a non-face down position. For example, if handheld device 902 includes cellular phone functionality, it may enter a speaker mode when it is on a call, and may recognize that it has been placed by a user in a "face up" position on a table while on the call. If, on the other hand, the cellular phone is engaged in an active call and is placed face down on the table, it may enter a mute mode.

As another example, handheld device 902 may recognize through a brief period of approximately 0 g that it is in free-fall, and in response may behave accordingly to reduce damage due to impending impact with the ground or another surface. Such behavior may include, for example, powering down chips and/or hard drives, retracting lenses, applying covers or any other device behavior.

In particular embodiments, non-hand-held devices or devices that do not otherwise detect motion for input may also be able to model their environment and to behave based on the environment modeled. As an additional example, acceleration patterns may be detected to recognize that a handheld device 902 is in a moving environment (e.g., being held by a user who is moving about the casino) and may adjust various sensitivities, threshold and/or other characteristics to enable better performance of the handheld device in that environment.

If handheld device 902 comprised a device that utilized a cradle for syncing up with another device, such as a PC, then device 902 may recognize that it is in the cradle based on its stillness (or supported state) and its particular orientation. The handheld device may then operate or function according to its state of being in the cradle (e.g., it may then sync up with its associated PC).

Figure 10:
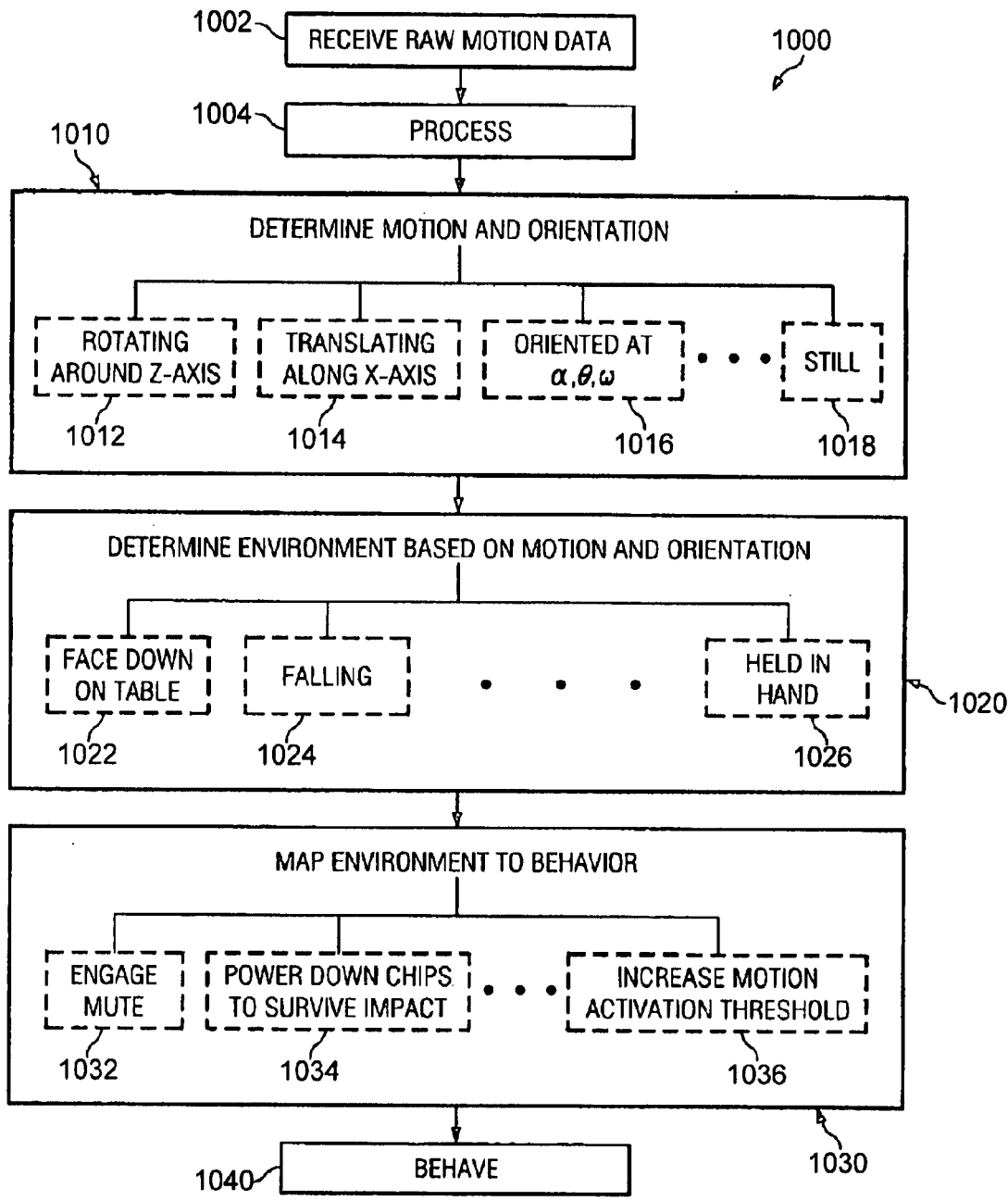
FIG. 10 shows a flow diagram of a specific example embodiment 1000 illustrating an environmental modeling process.

FIG. 10 shows a flow diagram of a specific example embodiment 1000 illustrating an environmental modeling process. In at least one embodiment, the environmental process 1000 may be implemented at an appropriately configured handheld device.

At 1002, it is assumed that raw motion data is received at the handheld device. As described above, the raw motion data may be received by any combination of accelerometers, gyros, cameras, rangefinders and/or any other suitable motion detection components.

At 1004, the raw motion data is processed. In one embodiment, the raw motion data may be processed to produce motion detector output information from which motion and/or orientation of the handheld device may be determined (e.g., at 1006).

At 1006 one or more actions may be initiated in order to determine motion and/or orientation data relating to the handheld device. For example, as illustrated in the example of FIG. 10, blocks 1012-1018 illustrate different types of example motions and/or orientations which may be associated with the handheld device, such as, for example, rotating around one or more axes (e.g., z-axis 1012), translating along one or more axes (e.g., x-axis 1014), oriented at particular angles (e.g., α, θ, ω 1016), absence of detected motion/movement (e.g., 1018), etc. It will be appreciated that the example of FIG. 10 provides only a few example motions and/or orientations which may be used to characterize the handheld device. Other embodiments may include other combinations of motion and/or revocation characteristics which may be determined at 1006. In at least some embodiments, the determined orientations may comprise an orientation of the handheld device with respect to particular reference criteria (such as, for example, the direction of gravity).

At 1020 one or more actions may be initiated in order to determine environment data relating to the handheld device.

In at least one embodiment, the environment data may be based at least in part upon on the motion/orientation (e.g., determined at 1006). For example, as illustrated in the example of FIG. 10, blocks 1022-1026 illustrate different types of example environments which may be associated with the handheld device, such as, for example, face down on a table (1022), falling (1024), held in hand (1026), etc. According to specific embodiments, different types of environments may be determined based, for example, on motion and orientation data (e.g., determined at 1006). In particular embodiments, the environmental determination may also be based on a history of the handheld device, such as, for example, a motion/orientation history. In at least one embodiment, such history may comprise a previous motion/orientation of the handheld device and/or any other information relating to the device's history.

For example, when implementing a speaker mode function of a cellular phone, the handheld device may detect a short sequence of "jarring" movements, followed by the unit being placed in a relatively horizontal orientation during a call, followed by relative stillness (e.g., the short jarring movements may be caused by a user placing the phone face up on a table). The handheld device may be operable to detect that it was jarred, and using such information, may interpret subsequent detections of movements/orientations (e.g., stillness, orientation to perpendicular position relative to gravity, etc.) differently than it would had the jarring not been detected.

At 1030, the determined environment may be mapped to a particular behavior. In one embodiment, the mapped behavior may be based on various criteria in addition to the determined environment. Examples of such criteria may include, but are not limited to, one or more of the following (or combination thereof): desired characteristics of the particular user using the handheld device at the time, the particular application in use or focus at the time, time of day, location, target device(s)/system(s) which have been identified or selected for communication with the handheld device, current state or operating mode of the handheld device, etc.

For example, the behavior according to a particular modeled environment may include engaging a mute function of the handheld device (e.g., 1032), powering down components of the handheld device (e.g., 1034), increasing or decreasing a motion activation threshold of the handheld device (e.g., 1036), etc. In one embodiment, the mute behavior indicated at 1032 may be implemented, for example, when the handheld device has engaged its cellular phone functionality, and its environment (e.g., 1022) comprises laying face down on a table. In one embodiment, the powering down chips behavior at 1034 may be implemented when the environment (e.g., 1024) of handheld device comprises a free fall of the handheld device. In one embodiment, the increasing a motion activation threshold behavior at 1036 may be implemented when a handheld device's environment (e.g., 1026) comprises being held in the hand of a user. Other embodiments may include a variety of other types of behaviors which may be mapped to one or more modeled environments.

As shown at 1040, the handheld device may be operable to behave according to the behavior(s) to which its environment has been mapped (e.g., at 1030).

As indicated above, users may move handheld devices according to particular gestures to cause the handheld devices to perform desired functions, operations and/or tasks. In particular embodiments, gestures used as motion input for the handheld device may comprise pre-existing symbols, such as letters of the alphabet, picture symbols or any other alphanumeric character or pictographic symbol or representation. For example, gestures used as motion input may mimic upper and lower case members of an alphabet in any language, Arabic and Roman numerals and shorthand symbols. Other types of gestures used as motion input may mimic player motions or movements during various types of game play activities such as, for example player movements which may occur during play of various types of wager based games such as blackjack, poker, baccarat, craps, roulette, slots, etc. Preexisting gestures may be used for handheld device input for other local and/or remote devices as well. Using preexisting gestures for handheld device input may facilitate the learning process for users with respect to gesture motion interfaces.

Figure 11:
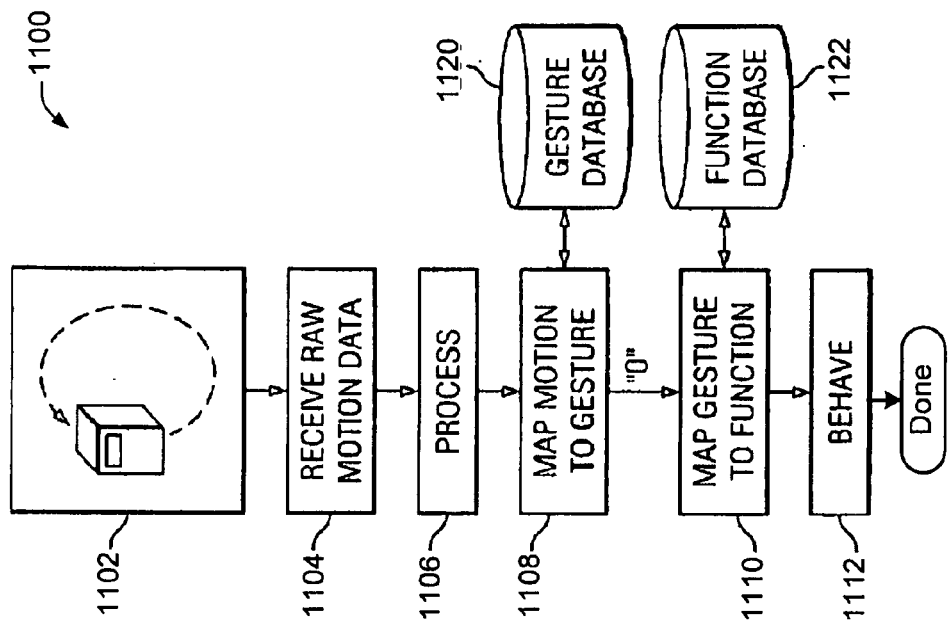
FIG. 11 shows a flow diagram of a specific example embodiment 1100 illustrating utilization of a preexisting symbol gesture as motion input.

FIG. 11 shows a flow diagram of a specific example embodiment 1100 illustrating utilization of a preexisting symbol gesture as motion input.

In the example of FIG. 11, it is assumed, for purposes of illustration, that a user moves handheld device along a circular path (e.g., which resembles the letter "O"), as illustrated at 1102.

At 1104, handheld device receives raw motion data of the circular movement (herein referred to as the "O" movement) from motion detection components.

At 11106, the handheld device may process the raw motion data, for example, to determine the actual motion of the handheld device.

At 1108, the handheld device may access a gesture database 1120 which may include a plurality of gestures recognizable by the handheld device to map the actual motion of the handheld device to the gesture "O." In at least one embodiment, at least some of the gestures of the gesture database may each be defined by a series of accelerations relating to one or more movement(s). In one embodiment, the actual motion of the handheld device may be matched to a series of accelerations of one of the gestures of the gesture database.

At 1110, the handheld device may map the gesture "O" to a particular function by accessing a function database 1122 (or a gesture mapping database) which may include a plurality of functions that may be performed by one or more applications running on the handheld device. In an alternate embodiment, the handheld device may map the gesture "O" to a particular sequence of operations to be implemented at the handheld device by accessing the gesture mapping database. In at least one embodiment, the sequence of operations may include generating specific user input data based upon the identified gesture "O." In some embodiments, the user input data may be provided to one or more system(s) and/or device(s) (e.g., gaming machines, game tables, remote servers, etc.) in order to advance selected game play activities. For example, in one embodiment where the user of the handheld device corresponds to a player who is engaged in active game play at a spinning reel gaming machine, the identified gesture "O" may be mapped (e.g., by the handheld device) to an instruction to commence spinning of the gaming machine reels. Accordingly, in one embodiment, the handheld device may respond by transmitting instructions to the gaming machine to commence spinning of its reels.

In alternate embodiments, gesture information relating to the identified gesture "O" may be provided by the handheld device to one or more other system(s) and/or device(s). In at least some embodiments, the other system(s)/device(s) may be operable to implement their own gesture mapping analysis of the received gesture information using one or more gesture mapping databases. For example, in one embodiment where the user of the handheld device corresponds to a player who is engaged in active game play at a game table, information relating to the identified gesture "O" may be transmitted from the handheld device to the game table, whereupon the game table may then map the identified gesture "O" to a particular set of player input instructions using a gesture mapping database which has been customize specifically for use with table games conducted at that game table. One advantage of such an alternate embodiment is that it allows for use in implementation of less sophisticated handheld devices since, for example, the remote system/device are able to perform the gesture interpretation or gesture mapping functionalities.

According to different embodiments, the gesture and/or gesture mapping databases may be stored in local memory at the handheld device and/or at remote memory residing at one or more remote device(s)/system(s).

According to specific embodiments, the particular function mapped to the gesture "O" may depend on a particular application in focus or being used by the user at the time. For example, during game play applications, the gesture "O" may be mapped to a particular gesture associated with game play gestures, while in non-game play applications, the gesture "O" may be mapped to a particular gesture associated with non-game play gestures. In some embodiments, one gesture may be mapped to the same function for all applications, while other gestures may be mapped to different functions for different applications.

At 1112, the handheld device may initiate behavior in accordance with the mapped gesture or mapped function.

According to specific embodiments, gestures used as motion input via a handheld device may have different meanings (e.g., functions, operations, tasks) based on different contexts. For example, a particular gesture may be mapped as a command to scroll a page up when running a web browser at the handheld device, while the same gesture may be mapped as a "hit me" command when the handheld device is engaged in an active game session at a blackjack table. The ability for a particular gesture to be mapped to different commands depending on the context increases the utility of the handheld device.

Additionally, in at least some embodiments, handheld devices may be able to utilize less sophisticated (or fewer) motion detection components if gestures are mapped to different commands depending on the context. As an example, a handheld device may include particular motion detection components such that the handheld device may only be able to recognize and distinguish between a predetermined number (e.g., 20) of different gestures. In one embodiment, if each gesture is mapable to a different behavior for each of four different applications, then the ability to only recognize twenty unique gestures may provide eighty different behaviors at the handheld device (e.g., twenty for each application).

It will be appreciated that the ability to use fewer and/or less complex components in the handheld device may lead to reduced costs in the components utilized. Additionally, the ability to map gestures to different commands, functions, operations and/or behaviors based on different contexts can also simplify the task of physically learning gestures required to control the handheld device. In some cases, gestures may be mapped to different behaviors depending on the state of a particular application running at the handheld device and/or running at a remote device and/or system. in at least some embodiments, a command map associated with the gesture function mappings may include gesture mappings for each of such states.

Figure 12:
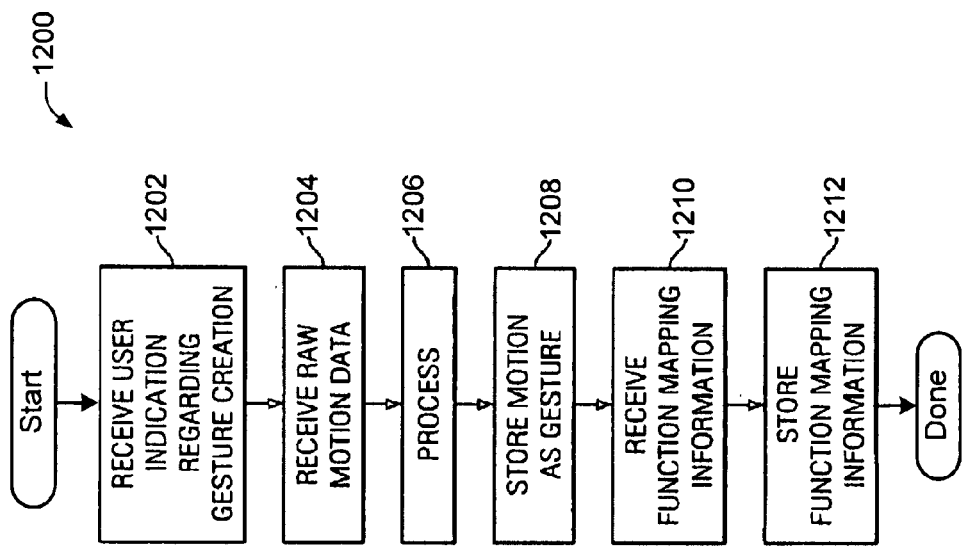
FIG. 12 shows an example embodiment of a flow diagram 1200 illustrating a gesture assignment process for user-created gestures.

FIG. 12 shows an example embodiment of a flow diagram 1200 illustrating a gesture assignment process for user-created gestures.

At 1202 it is assumed that an indication is received from a user for gesture creation. According to specific embodiments, the indication may be received in any of a variety of ways using one or more different types of input formats (e.g., keys, trackwheel, motion, touchscreen, etc.).

At 1204, the user may move the handheld device according to a specific user-created gesture such that raw motion data for the user-created gesture is received at the handheld device. In at least one embodiment, the raw motion data may comprise a sequence of accelerations and/or other movements relating to a gesture. In one embodiment, the sequence of accelerations may be measured with reference to a base reference position. In at least one embodiment, the recording of the raw motion data may continue for a predetermined time interval, and/or may continue until an indication is received to stop recording the raw motion data. In at least one embodiment, indications to start and/or stop recording a user-created gesture may include motion and/or non-motion indications (e.g., key presses, key releases, etc.).

At 1206 at least a portion of the recorded raw motion data may be processed, for example, in order to determine one or more motions to be associated with the raw motion data.

At 1208, the motion is stored as a gesture, for example, at a gesture database. In particular embodiments, the indication for gesture creation may be received after the user moves the handheld device according to a user-created gesture. For example, the user may move the handheld device according to a user-created gesture that is currently unrecognizable by the handheld device. The handheld device may query the user to determine if the user desires to store the unrecognized gesture for a particular function. The user may respond in the affirmative so that the user may utilize the gesture as motion input in the future.

At 1210, function mapping information for the gesture may be received from the user. According to specific embodiments, the function mapping information may include, for example, functions, operations, input instructions, and/or tasks which the user desires to be mapped to the user-created gesture. In particular embodiments, such function mapping information may comprise a series of functions (e.g., a macro) that may be mapped to a particular gesture. The user may assign different functions for a gesture according to various conditions and/or criteria such as, for example, one or more of the following: type of game being played (e.g., craps, blackjack, poker, slots, etc.), location of the player/handheld device; current handheld device operating mode (e.g., table game operating mode, gaming machine operating mode, bonus game operating mode, restaurant operating mode, theater operating mode, lounge operating mode, hotel operating mode, parking service operating mode, room service operating mode, news magazine operating mode, etc.); game rules; time; player ID; player preferences; previous motion interpretation/analysis; current game state; proximity to other objects, etc. For example, according to one embodiment, a given gesture may be mapped to a first set of user input instructions if the user is playing blackjack, and may be mapped to a second set of user input instructions if the user is playing craps.

In some cases, a user may desire to map different gestures to different keys or keystrokes of the handheld device. One example of mapping a series of functions to a gesture may include mapping a long string of characters to a gesture.

At 1212, the function mapping information may be stored, for example, at a function database or gesture mapping database.

It will be appreciated that, it may be difficult for a user to move handheld device in the same precise manner for one or more gestures each time those gestures are to be used as input. Accordingly, particular embodiments may be operable to allow for varying levels of precision in gesture input. Precision describes how accurately a gesture must be executed in order to constitute a match to a gesture recognized by the handheld device, such as a gesture included in a gesture database accessed by the handheld device. According to specific embodiments, the closer a user generated motion must match a gesture in a gesture database, the harder it will be to successfully execute such gesture motion. In particular embodiments movements may be matched to gestures of a gesture database by matching (or approximately matching) a detected series of accelerations of the movements to those of the gestures of the gesture database.

As the precision of gestures required for recognition increases, one may have more gestures (at the same level of complexity) that may be distinctly recognized. In particular embodiments, the precision required by handheld device for gesture input may be varied. Different levels of precision may be required based upon different conditions, events and/or other criteria such as, for example, different users, different regions of the "gesture space" (e.g., similar gestures may need more precise execution for recognition while gestures that are very unique may not need as much precision in execution), different individual gestures, such as signatures, and different functions mapped to certain gestures (e.g., more critical functions may require greater precision for their respective gesture inputs to be recognized), etc. In some embodiments users may be able to set the level(s) of precision required for some or all gestures or gestures of one or more gesture spaces.

According to specific embodiments, gestures may be recognized by detecting a series of accelerations of the handheld device as the handheld device is moved along a path by a user according to an intended gesture. In at least one embodiment, recognition may occur when the series of accelerations (and/or other movements) is/are matched by the handheld device to a gesture of a gesture database.

In some embodiments, each gesture recognizable by the handheld device, or each gesture of a gesture database, may include a matrix of three-dimensional points. In addition, a user movement intended as a gesture input may include a matrix of three-dimensional points. In one embodiment, the handheld device may compare the matrix of the movement with the matrices of each recognizable gesture (or each gesture in the gesture database) to interpret or determine the intended gesture. For example, if a user moves the handheld device such that the movement's matrix correlates to each point of an intended gesture's matrix, then the user may be deemed to have input the intended gesture with perfect precision. As the precision required for gesture input is reduced, the greater the allowable differences between a user gesture movement and an intended gesture of a gesture database for gesture recognition.

Figure 13:
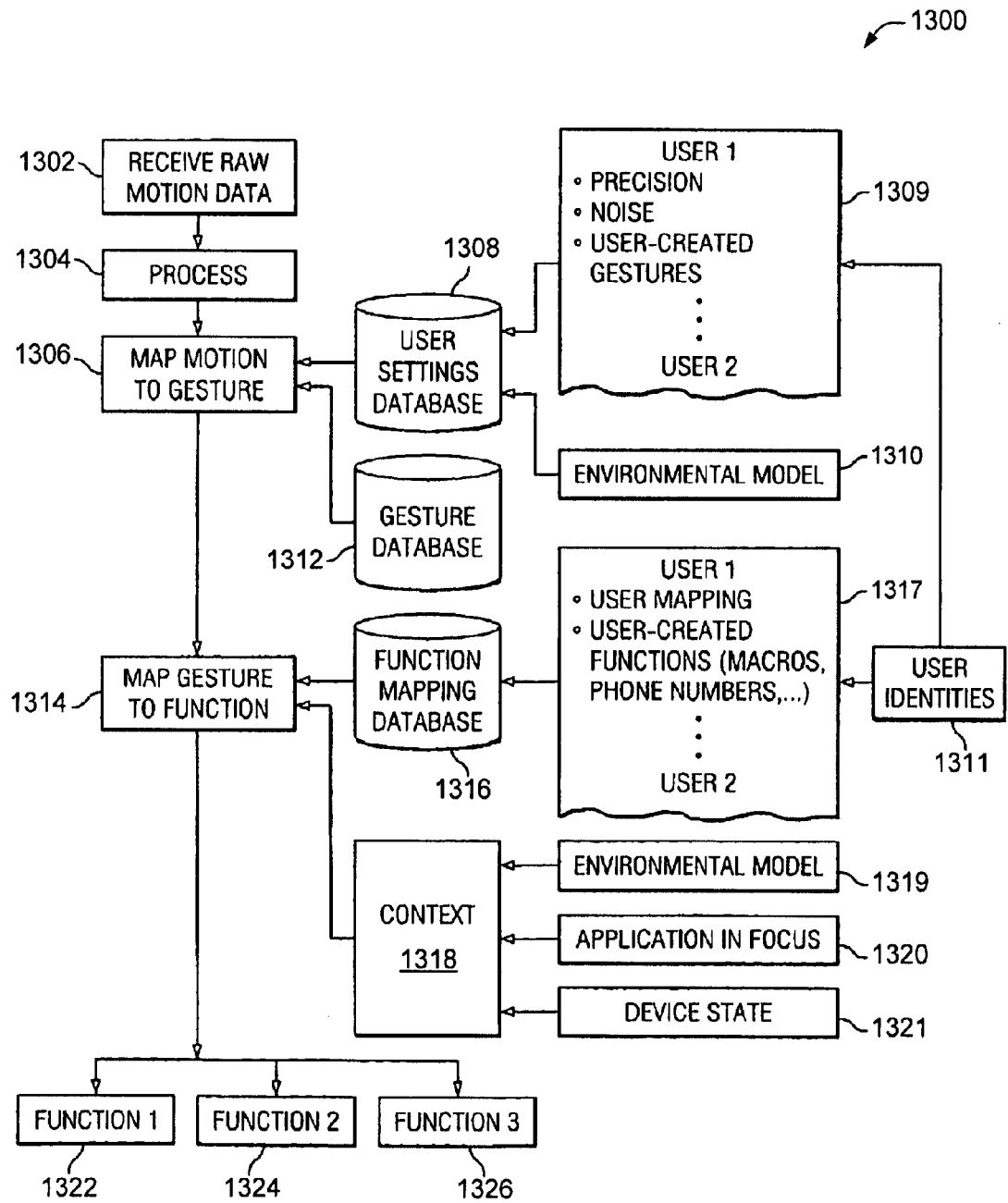
FIG. 13 shows an example embodiment of a flow diagram 1300 illustrating a gesture recognition process.

FIG. 13 shows an example embodiment of a flow diagram 1300 illustrating a gesture recognition process.

At 1302, it is assumed that raw motion data of a particular gesture movement is received at the hand-held device.

At 1304, the raw motion data may be processed, for example, to determine the actual motion of the handheld device. According to different embodiments, such processing may include various filtering techniques and/or fusion of data from multiple detection or sensing components.

At 1306, the actual motion may be mapped to a gesture. According to specific embodiments, the mapping of actual motion(s) to a gesture may include, for example, accessing (1308) a user settings database, which, for example, may include user data (e.g., 1309). According to specific embodiments, such user date may include, for example, one or more of the following (or combination thereof): user precision and/or noise characteristics/thresholds; user-created gestures; user identities (e.g., 1311) and/or other user-specific data or information. According to specific embodiments, user-specific information may be important, for example, because different users of the handheld device may have different settings and motion input characteristics.

In at least one embodiment, user settings database 1308 may also include environmental model information (e.g., 1310) which may be used in interpreting or determining the current gesture. As discussed above, through environmental modeling, the handheld device can internally represent its environment and the effect that environment is likely to have on gesture recognition. For example, if it is determined that the hand-held device is being carried or transported by the user, then the handheld device may automatically raise the noise threshold level, and/or may also reduce the precision required for mapping a particular gesture. Additionally, in at least some embodiments, mapping of the actual motion to a gesture may also include accessing a gesture database (e.g., 1312).

At 1314, the gesture may be mapped to one or more functions, operations, input instructions, and/or tasks. According to at least one embodiment, this may include accessing a function mapping database (e.g., 1316) which may include correlation information between gestures and functions. According to specific embodiments, different users may have different mappings of gestures to functions and different user-created functions. Thus, for example, function mapping database 1316 may also include user-specific mapping instructions, characteristics, user-created functions and/or any other input information which may be applicable to mapping a particular gesture to one or more mapable features (e.g., functions, operations, input instructions, tasks, keystrokes, etc).

According to specific embodiments, other information or criteria may also be used in determining the mapping of a particular gesture to one or more mapable features, such as, for example, user identity information (e.g., 1311), context information (e.g., 1318). In at least one embodiment, such context information may include one or more of the following (or combination thereof): game type information, device location information, device operating mode; time/date information; player ID information; player preferences; game state information; environmental model information (e.g., 1319), application in focus information (e.g., 1320), device state information 1321, etc.

At 1322a-c, the handheld device may initiate the appropriate mapable features which have been mapped to the identified gesture.

In particular embodiments handheld device may comprise digital camera functionality utilizing motion input for at least some of the functions described herein. For example, digital cameras with motion input capabilities may use motion input to flatten menus as discussed above. Motion may also be used to allow a user to zoom in (and/or zoom out) on still photos or video to examine it more closely for smoother and more intuitive functionality. Motion may be used to zoom in and out of a number of thumbnails of photographs or video clips so that it is easy to select one or more to review. Virtual desktops may be used to review many thumbnails of many digital photos or video clips or to review many digital photos or video clips by translating the camera or using gestural input. Gestures and simple motions may be used alone or in combination with other interface mechanisms to modify various settings on digital still and video cameras, such as flash settings, type of focus and light sensing mode. Moreover, free fall may be detected to induce the camera to protect itself in some way from damage in an impending collision. Such protection may include dropping power from some or all parts of the camera, closing the lens cover and retracting the lens.

In particular embodiments handheld device may comprise digital or analog watch functionality utilizing motion input for at least some of the functions described herein. For example, watches with motion input capabilities may use motion input to flatten menus as discussed above. In some embodiments, the tapping of the watch or particular gestures may be used to silence the watch. Other functions may also be accessed through taps, rotations, translations and other more complex gestures. These functions may include starting and/or stopping player tracking sessions, providing game play instructions, providing wager instructions, etc.

Additional details relating to various aspects of gesture mapping technology are described in U.S. patent application Ser. No. 10/807,562 to Marvit et al., entitled "Motion Controlled Remote Controller", filed Mar. 23, 2004, the entirety of which is incorporated herein by reference for all purposes.

Figure 14:
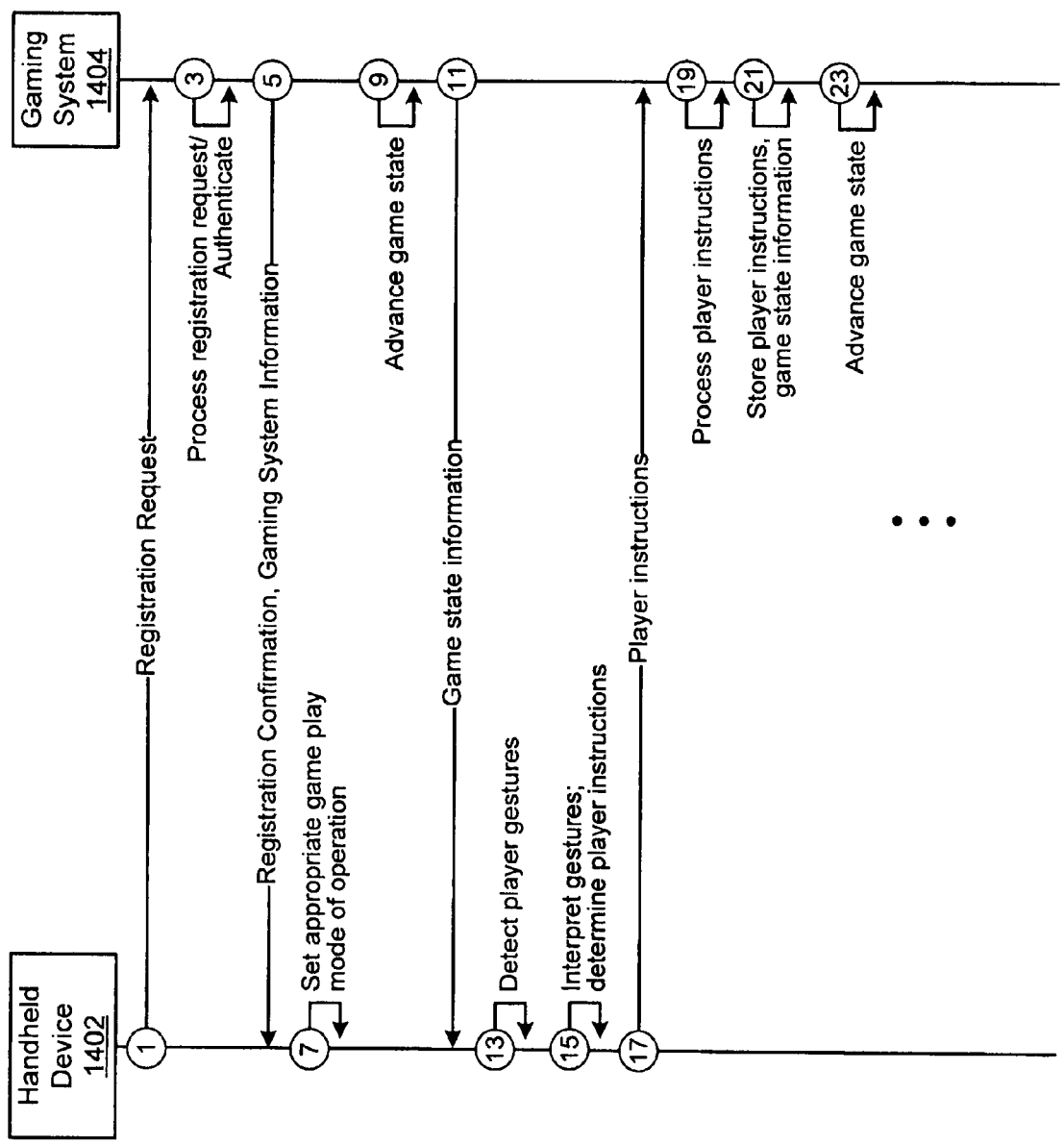
FIG. 14 shows an example interaction diagram illustrating various interactions which may occur between a gaming system and a player's handheld device in accordance with a specific embodiment.

FIG. 14 shows an example interaction diagram illustrating various interactions which may occur between a gaming system (e.g., gaming machine, game table, etc.) and a player's handheld device in accordance with a specific embodiment. For purposes of illustration, it is assumed in the example of FIG. 14 that a player (possessing a handheld device of the present invention) desires to utilize his handheld device 1402 for use in conducting game play activities at a selected casino gaming device or gaming system 1404 such as, for example, a gaming machine, game table, etc.

As shown in the example embodiment of FIG. 14, handheld device 1042 may send a registration request message to the gaming system 1404, in order to allow the handheld device to be used for game play activities (and/or other activities) conducted at gaming system 1404. In at least one embodiment, the registration request message may include different types of information such as, for example: player/user identity information, handheld device identity information, authentication/security information, player tracking information, biometric identity information, PIN numbers, device location, etc.

According to specific embodiments, various events/conditions may trigger the handheld device to automatically transmit the registration request message to gaming system 1404. Examples of such events/conditions may include, but are not limited to, one or more of the following (or combinations thereof):

- physical proximity of handheld device to gaming system detected as satisfying predetermined criteria;
- handheld device shown or handed to dealer and/or other casino employee;
- appropriate input detected at handheld device (e.g., player pushes button, performs gesture, etc.);
- communication received from gaming system;
- specified time constraints detected as being satisfied;
- gaming chip(s) placed detected within player's assigned wagering region;
- presence of player detected at player station;
- detection of player's first wager being placed;
- player location or position detected as satisfying pre-defined criteria;
- appropriate floor supervisor input detected;
- player identity determined (e.g., through the use of directional RFID);
- through placement of player tracking media on a designated spot at a table game; etc.);
- etc.

As shown at (3) the gaming system 1404 may process the registration request. In at least one embodiment, the processing of the registration request may include various types of activities such as, for example, one or more of the following (or combinations thereof): authentication activities and/or validation activities relating to the handheld device and/or player; account verification activities; etc.

At (5) it is assumed that the registration request has been successfully processed at gaming system 1404, and that a registration confirmation message is sent from the gaming system 1402 to handheld device 1402. In at least one embodiment, the registration confirmation message may include various types of information such as, for example: information relating to the gaming system 1404; information relating to game type(s), game theme(s), denomination(s), paytable(s); min/max wager amounts available after the gaming system; current game state at the gaming system; etc.

As shown at (7), the handheld device may change or update its current mode or state of operation to one which is appropriate for use with the gaming activity being conducted at gaming system 1404. In at least one embodiment, the handheld device may utilize information provided by the gaming system to select or determine the appropriate mode of operation of the handheld device. For example, in one embodiment, the gaming system 1404 may correspond to a playing card game table which is currently configured as a blackjack game table. The gaming system may provide gaming system information to the handheld device which indicates to the handheld device that the gaming system 1404 is currently configured as a Blackjack game table. In response, the handheld device may configure its current mode of operation for blackjack game play and/or blackjack gesture recognition/interpretation. In another embodiment where the gaming system 1404 may correspond to a slot-type gaming machine, the gaming system may provide gaming system information to the handheld device which indicates to the handheld device that the gaming system 1404 is currently configured as a slot-type gaming machine. In response, the handheld device may configure its current mode of operation for slot machine game play and/or gesture recognition/interpretation relating to slot machine game play. In at least one embodiment, interpretation of a player's gestures and/or movements at the handheld device may be based, at least in part, on the current mode of operation of the handheld device. Thus, for example, in one embodiment, the same gesture implemented by a player may be interpreted differently by the handheld device, for example, depending upon the type of game currently being played by the player.

At (9) it is assumed that gaming system 1404 advances its current game state (e.g., starts a new game/hand, ends a current game/hand, deals cards, accepts wagers, etc.). At (11) the gaming system 1404 may provide updated game state information to the handheld device 1402. In at least one embodiment, the updated game state information may include information relating to a current or active state of game play which is occurring at the gaming system.

In the present example, it is assumed, at (13), that player the current game state at gaming system 1404 requires input from the player associated with handheld device 1402. In at least one embodiment, the player may perform one or more gestures using the handheld device relating to the player's current game play instructions. For example, in one embodiment where the player is participating in a blackjack game at the gaming system, and it is currently the player's turn to play, the player may perform a "hit me" gesture with the handheld device to convey that the player would like to be dealt another card. According to different embodiments, a gesture may be defined to include one or more player movements such as, for example, a sequence of player movements.

At (15) the handheld device may detect the player's gestures, and may interpret the detected gestures in order to determine the player's intended instructions and/or other intended input. In at least one embodiment, the detected gestures (of the player) and/or movements of the handheld device may be analyzed and interpreted with respect to various criteria such as, for example, one or more of the following (or combinations thereof): game system information; current game state; current game being played (if any); player's current hand (e.g., cards currently dealt to player); wager information; player identity; player tracking information; player's account information; handheld device operating mode; game rules; house rules; proximity to other objects; and/or other criteria described herein.

In at least one alternate embodiment, analysis and/or interpretation of the player's gestures (and/or other handheld device movements) may be performed by a remote entity such as, for example, gaming system 1404. In at least one of such embodiments, the handheld device may be operable to transmit information related to the player's gestures and/or other movements of the handheld device to the gaming system for interpretation/analysis.

At (17) it is assumed that the handheld device has determined the player's instructions (e.g., based on the player's gesture(s) using the handheld device), and transmits player instruction information to the gaming system. In at least one embodiment, the player construction information may include player instructions relating to gaming activities occurring at gaming system 1404.

As shown at (19), the gaming system may process the player instructions received from handheld device 1402. Additionally, if desired, the information relating to the player's instructions, as well as other desired information (such as current game state information, etc.) may be stored (21) in a database (e.g., local and/or remote database(s)). Such information may be subsequently used, for example, for auditing purposes, player tracking purposes, etc.

At (23) the current game state of the game being played at gaming system 1404 may be advanced, for example, based at least in part upon the player's instructions provided via handheld device 1402. In at least one embodiment, the game state may not advance until specific conditions have been satisfied. For example, at a table game of blackjack using virtual cards, a player may perform a "hit me" gesture with a handheld device during the player's turn to cause another card to be dealt to that player. However, the dealing of the next virtual may not occur until the dealer performs a "deal next card" gesture.

In at least one embodiment, flow may continue (e.g., following an advancement of game state) in a manner similar to the operations described with respect to reference characters 11-23 of FIG. 14, for example.

According to other embodiments, various handheld devices and/or gaming systems (e.g., gaming machines, game tables, etc.) may include non-contact input interfaces which allow players to use gestures, movements, voice commands and/or other natural modes of communicating information to selected systems and/or devices.

According to specific embodiments, the inputs allowed via the non-contact interfaces may be regulated in each gaming jurisdiction in which such non-contact interfaces are deployed, and may vary from gaming jurisdiction to gaming jurisdiction. For example, for a voice interface, certain voice commands may be allowed/required in one jurisdiction but not another. In at least one embodiment, the handheld devices and/or gaming systems may be configurable such that by inputting the gaming jurisdiction where the handheld device/gaming system is located (or by specifying it in a software package shipped with the handheld device/gaming system), the handheld device/gaming system may self-configure itself to comply with the regulations of the jurisdiction where it is located.

Another aspect of handheld device and/or gaming system operations that may also by regulated by a gaming jurisdiction is providing game history retrieval capabilities. For instance, for dispute resolution purposes, it is often desirable to be able to replay information from a past game, such as the outcome of a previous game on the handheld device and/or gaming system. With the non-contact interfaces, it may be desirable to store information regarding inputs made through a non-contact interface and provide a capability of playing information regarding the input stored by the handheld device and/or gaming system.

In at least one embodiment, user gesture information relating to gross motion/gesture detection, motion/gesture interpretation and/or interpreted player input (e.g., based on the motion/gesture interpretations) may be recorded and/or stored in an indexed and/or searchable manner which allows the user gesture information to be easily accessed and retrieved for auditing purposes. For example, in at least one embodiment, player gestures and/or player input interpreted therefrom may be stored along with concurrent game state information to provide various types of audit information such as, for example, game audit trail information, player input audit trail information, etc. In one embodiment, the game audit trail information may include information suitable for enabling reconstruction of the steps that were executed during selected previously played games as they progressed through one game and into another game. In at least one embodiment, the game audit trail information may include all steps of a game. In at least one embodiment, player input audit trail information may include information describing one or more players' input (e.g., game play gesture input) relating to one or more previously played games. In at least one embodiment, the game audit trail information may be linked with player input audit trail information in a manner which enables subsequent reconstruction of the sequence of game states which occurred for one or more previously played game(s), including reconstruction of the player(s) instructions (and/or other game play input information) which triggered the transition of each recorded game state. In at least one embodiment, the gaming system may be implemented as a handheld device. In other embodiments, the gaming system may include a handheld device which is operable to store various types of audit information such as, for example: game history data, user gesture information relating to gross motion/gesture detection, motion/gesture interpretation, game audit trail information, and/or player input audit trail information.

As an example, for a non-contact gesture recognition interface that detects and interprets player movements/gestures, a handheld device and/or gaming system may store player input information relating to detected player gestures (or portions thereof) and/or interpreted player instructions (e.g., based on the detected player movements/gestures) that have been received from one or more players during a game played at the handheld device and/or gaming system, along with other information described herein. An interface may be provided on the handheld device and/or gaming system that allows the player input information to be recalled and output for display (e.g., via a display at the handheld device and/or gaming system). In a game outcome dispute, a casino operator may use a playback interface at the handheld device and/or gaming system to locate and review recorded game history data and/or player input information relating to the disputed event.

According to specific embodiments, various handheld devices and/or gaming systems may include non-contact input interfaces which may be operable to detect (e.g., via the non-contact input interfaces) and interpret various types of player movements, gestures, vocal commands and/or other player activities. For instance, as described in more detail herein, the non-contact input interfaces may be operable to provide eye motion recognition, hand motion recognition, voice recognition, etc. Additionally, the various handheld devices and/or gaming systems may further be operable to analyze and interpret the detected player motions, gestures, voice commands, etc. (collectively referred to herein as "player activities"), in order determine appropriate player input instructions relating to the detected player activities.

In at least one embodiment, at least one gaming system described herein may be operable to monitor and record the movements/gestures of a player during game play of one or more games. The recorded information may be processed to generate player profile movement information which may be used for determining and/or verifying the player's identity. In one embodiment, the player profile movement information may be used to verify the identity of a person playing a particular game at the gaming system. In one embodiment, the player profile movement information may be used to enable and/or disable (and/or allow/prevent access to) selected gaming and/or wagering features of the gaming system. For example, in at least one embodiment, the player profile movement information may be used to characterize a known player's movements and to restrict game play if the current or real-time movement profile of that player changes abruptly or does not match a previously defined movement profile for that player.

Figure 16:
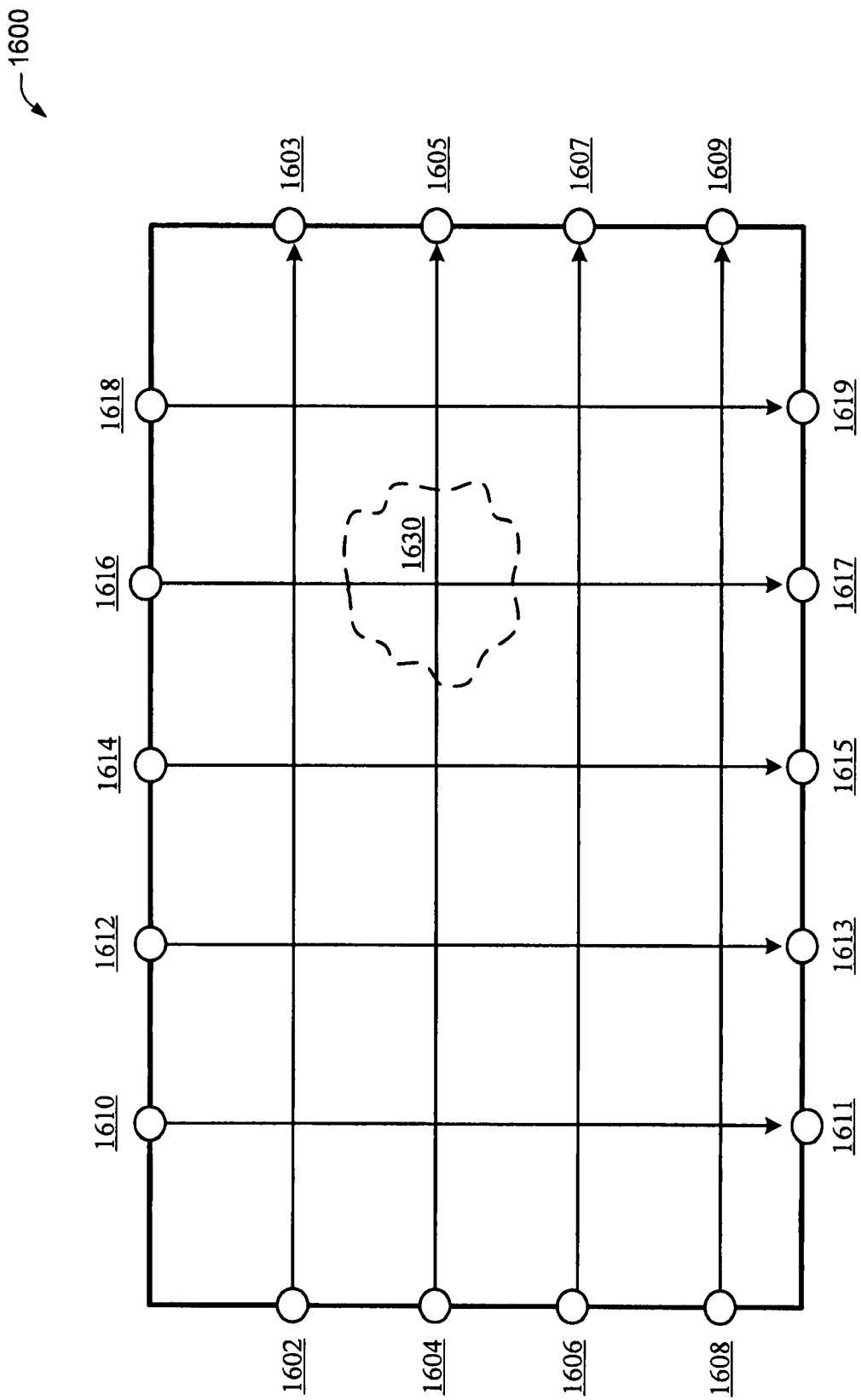
FIG. 16, shown is a diagrammatic representation of an exemplary sensor curtain 1600 which may be used as a non-contact interface for hand motion recognition according to one embodiment.

FIG. 16, shown is a diagrammatic representation of an exemplary sensor curtain 1600 which may be used as a non-contact interface for hand motion recognition according to one embodiment. According to various embodiments, various handheld devices and/or gaming systems may include non-contact interfaces for hand motion recognition such as that illustrated in FIG. 16.

In at least one embodiment, the sensor curtain may include a plurality of emitters (e.g., 1602, 1604, 1606, 1608, 1610, 1612, 1614, 1616, 1618) and sensors (e.g., 1603, 1605, 1607, 1609, 1611, 1613, 1615, 1617, 1619). As illustrated in the example of FIG. 16, signals may be emitted from one or more emitters, and at least some of the signals may be received by one or more receivers. According to specific embodiments, the signals may include infrared, radiowave, ultrasonic, and/or other signals, including still and/or video images from digital cameras.

According to one embodiment, when an object 1630 is placed within the sensor curtain region, the object 1630 can interrupt signals in the region. For example, in the example of FIG. 16, object 1630 intersects the signal between emitter 1616 and receiver 1617 and also intersects the signal between emitter 1604 and receiver 1605. When it is detected that receivers 1605 and 1617 have not received a signal emitted by emitters 1604 and 1616, respectively, the coordinates of object 1630 can be determined from the intersection of the two signals. When the sensor curtain is deployed in a handheld device and/or gaming system, the handheld device and/or gaming system may be operable to detect hand motions and/or gestures as input from a player. For example, a player may use his or her hands, fingers, stylus, playing cards, and/or other objects to interrupt signals emitted by the sensor curtain. The coordinates of these interrupted signals may be interpreted by the handheld device and/or gaming system in order to determine the intended player input information. In one embodiment, the coordinates of the sensor curtain may correspond to coordinates on a display screen. As a player points in a region proximate to the screen, the projection of his or her finger can be detected by the sensor curtain and displayed on the screen. One supplier of such a device is Keyence America (Woodcliff Lake, N.J., www.keyence.com)

Although a certain number of emitters and receivers are shown in the example of FIG. 16, any number of emitters and receivers can be used, depending on how finely the coordinates must be detected for a particular application. In addition, although the sensor curtain is shown in two dimensions, three-dimensional sensors can also be used.

Further, in at least one alternate embodiment, other types of non-contact interfaces for hand motion recognition may be utilized by one or more handheld devices and/or gaming systems. For example, in one embodiment (not shown), at least two image sensors (e.g., cameras) may be used to detect various player movements and/or gestures in three dimensions (e.g., one camera for x-y and another camera for y-z). In at least one embodiment, a plurality of different image sensors (e.g., cameras) may be positioned to monitor specific regions of space (e.g., at or proximate to a handheld device, gaming machine and/or game table) for player activities. In at least one embodiment, the captured image data from the image sensors/cameras may be analyzed according to various criteria (e.g., object recognition, acceleration, velocity, displacement, time period, etc.) in order to determine whether any meaningful player movements and/or gestures have occurred. According to one embodiment, a meaningful gesture may be identified if the characteristics of the detected gesture have been determined to have satisfied predefined threshold criteria.

In addition to eye motion recognition devices and hand motion recognition devices, various other non-contact input devices may be used according to various embodiments. For instance, voice recognition devices can be used to interpret commands, and the like. Such voice recognition devices may be configured to accept one or more languages, depending on the application and/or other criteria. Furthermore, the voice recognition devices may include features such as echo cancellation, noise cancellation, or the like, to reduce the amount of interference with player input by ambient noises. Also, unidirectional microphones may be used to reduce the amount of ambient noise detected. In another example, an image recognition system can be used to read lips, sign language, or other movements. Yet another example includes a virtual keyboard or switch panel. One example of a virtual keyboard that can be used is the Integrated Keyboard Device available from Canesta, Inc. (San Jose, Calif.).

Another example includes a virtual touch screen that can be activated when a player places his or her hands or fingers within a predefined region of space (e.g., proximate to a handheld device and/or gaming system). In one embodiment, a light curtain may be used to generate the virtual touch screen. In another example, a virtual touch screen may be generated using one or more CCD cameras.

In yet other examples, non-contact interface devices may interact with peripheral devices such as, for example, touchpads, personal digital assistants (PDAs), cellphones, pointers, gloves, and the like.

In at least some embodiments, a haptic interface may be utilized. For instance, a glove can be fit over the hand or fingertip of a player and used with items such as bar-code sensors that can emit a complex pattern within a region (such as, for example, a rotating cone or turret-shaped region) and/or detect motion of the glove within this region. In another example, a glove having resistive ink bend sensors can be used. The sensors may be used to relay the position of the glove. In other embodiments ultrasonic tracking may be used to provide the x-y-z coordinates of the glove. An example of a glove using resistive ink bend sensors is the Nintendo Power Glove, available from Nintendo Co., Ltd. (Kyoto, Japan).

Various peripheral devices can communicate with the non-contact interface devices by a wireless, or other remote connection. By using these types of input devices, a player can reduce the amount of reaching towards the handheld device and/or gaming system, which may help to reduce injuries caused, for example, by strain and/or repetitive stress. Additionally, at least a portion of the various embodiments described herein may reduce the amount of fatigue that players experience during game play, thereby increasing the players' enjoyment of the gaming activities.

Additional details relating to various aspects of gaming technology are described in U.S. patent application Ser. No. 10/871,068, by Parrott, et al, entitled "GAMING MACHINE USER INTERFACE", filed Jun. 18, 2004, previously incorporated herein by reference for all purposes.

According to specific embodiments, the non-contact interface techniques described herein may be utilized for different purposes in a variety of different gaming environments. For example, in one embodiment a motion/gesture recognition non-contact interface may be utilized by a casino operator or employee (such as, for example, a dealer at a game table) to perform a variety of game play activities such as, for example: facilitating dealing of cards (e.g., real cards or virtual cards) to players, facilitating collection of discarded cards and/or chips, facilitating payout of winnings/chips, and/or performing other types of game play activities in real and/or virtual gaming environments. Additionally, in at least some embodiments, a motion/gesture recognition non-contact interface may be utilized by a casino patron (such as, for example, a player at a game table) to perform a variety of game play activities such as, for example: providing game play instructions, facilitating placement of wagers, performing various game play activities (e.g., rolling of dice, spinning of wheels, etc.), etc.

Figure 18:
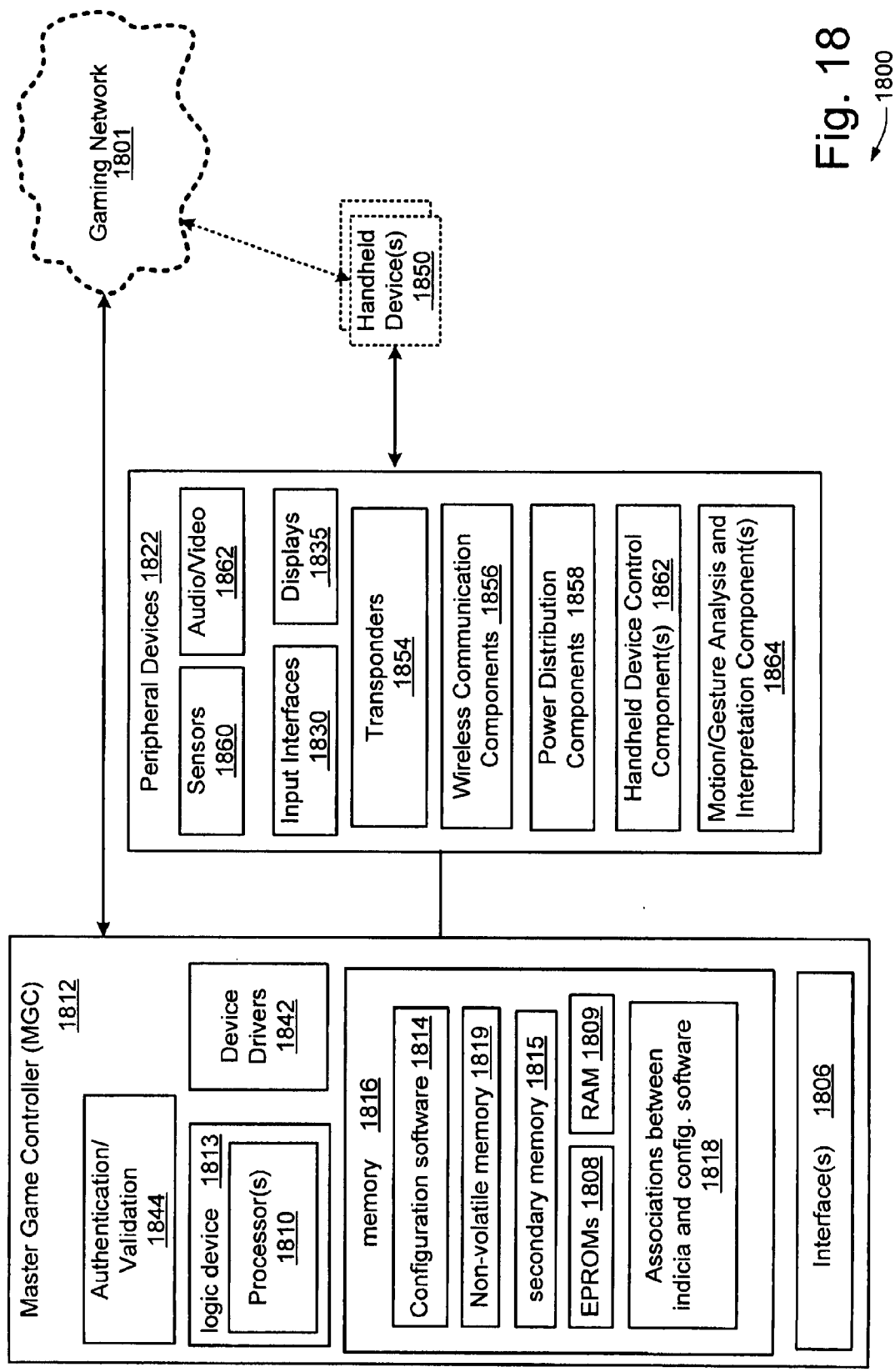
FIG. 18 is a simplified block diagram of an exemplary gaming system 1800 in accordance with a specific embodiment.

FIG. 18 is a simplified block diagram of an exemplary gaming system 1800 in accordance with a specific embodiment. As illustrated in the embodiment of FIG. 18, gaming system 1800 includes at least one processor 1810, at least one interface 1806, and memory 1816.

According to specific embodiments, the gaming system 1800 may be implemented as one of a variety of gaming devices such as, for example, an intelligent game table, a gaming machine, a gaming station, etc. In at least one embodiment, the gaming system 1800 may include one or more handheld devices which may be used by various players at the gaming system for conducting game play operations at the gaming system.

In one implementation, processor 1810 and master game controller 1812 are included in a logic device 1813 enclosed in a logic device housing. The processor 1810 may include any conventional processor or logic device configured to execute software allowing various configuration and reconfiguration tasks such as, for example: a) communicating with a remote source via communication interface 1806, such as a server that stores authentication information or game information; b) converting signals read by an interface to a format corresponding to that used by software or memory in the gaming system; c) accessing memory to configure or reconfigure game parameters in the memory according to indicia read from the device; d) communicating with interfaces, various peripheral devices 1822 and/or I/O devices; e) operating peripheral devices 1822 such as, for example, card readers, paper ticket readers, etc.; f) operating various I/O devices such as, for example, displays 1835, input devices 1830; etc. For instance, the processor 1810 may send messages including game play information to the displays 1835 to inform players of cards dealt, wagering information, and/or other desired information.

The gaming system 1800 also includes memory 1816 which may include, for example, volatile memory (e.g., RAM 1809), non-volatile memory 1819 (e.g., disk memory, FLASH memory, EPROMs, etc.), unalterable memory (e.g., EPROMs 1808), etc. The memory may be configured or designed to store, for example: 1) configuration software 1814 such as all the parameters and settings for a game playable on the gaming system; 2) associations 1818 between configuration indicia read from a device with one or more parameters and settings; 3) communication protocols allowing the processor 1810 to communicate with peripheral devices 1822 and I/O devices 1811; 4) a secondary memory storage device 1815 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming system to communicate with local and non-local devices using such protocols; etc. In one implementation, the master game controller 1812 communicates using a serial communication protocol. A few examples of serial communication protocols that may be used to communicate with the master game controller include but are not limited to USB, RS-232 and Netplex (a proprietary protocol developed by IGT, Reno, Nev.).

A plurality of device drivers 1842 may be stored in memory 1816. Example of different types of device drivers may include device drivers for gaming system components, device drivers for peripheral components 1822, etc. Typically, the device drivers 1842 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet 1875, Firewire, I/0 debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 1816 by the processor 1810 to allow communication with the device. For instance, one type of card reader in gaming system 1800 may be replaced with a second type of card reader where device drivers for both card readers are stored in the memory 1816.

In some embodiments, the software units stored in the memory 1816 may be upgraded as needed. For instance, when the memory 1816 is a hard drive, new games, game options, various new parameters, new settings for existing parameters, new settings for new parameters, device drivers, and new communication protocols may be uploaded to the memory from the master game controller 1812 or from some other external device. As another example, when the memory 1816 includes a CD/DVD drive including a CD/DVD designed or configured to store game options, parameters, and settings, the software stored in the memory may be upgraded by replacing a first CD/DVD with a second CD/DVD. In yet another example, when the memory 1816 uses one or more flash memory 1819 or EPROM 1808 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 1800 may also include various authentication and/or validation components 1844 which may be used for authenticating/validating specified gaming system components and/or information such as, for example, hardware components, software components, firmware components, peripheral device components, handheld device components, information received from one or more handheld devices, information stored in the gaming system memory 1816, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Peripheral devices 1822 may include several device interfaces such as, for example: transponders 1854, wire/wireless power distribution components 1858, input interface(s) 1830 (which, for example, may include contact and/or non-contact interfaces), sensors 1860, audio and/or video devices 1862 (e.g., cameras, speakers, etc.), wireless communication components 1856, handheld device function control components 1862, motion/gesture analysis and interpretation component(s) 1864, etc.

Sensors 1860 may include, for example, optical sensors, pressure sensors, RF sensors, Infrared sensors, image sensors, thermal sensors, biometric sensors, etc. Such sensors may be used for a variety of functions such as, for example: detecting movements and/or gestures of various objects within a predetermined proximity to the gaming system; detecting the presence and/or identity of various persons (e.g., players, casino employees, etc.), devices (e.g., handheld devices), and/or systems within a predetermined proximity to the gaming system.

In one implementation, at least a portion of the sensors 1860 and/or input devices 1830 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player displays and/or handheld device displays may include contact input interfaces and/or non-contact input interfaces for allowing players to provide desired information (e.g., game play instructions and/or other input) to the gaming system and/or other devices in the casino gaming network (such as, for example, player tracking systems, side wagering systems, etc.).

Wireless communication components 1856 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Power distribution components 1858 may include, for example, components or devices which are operable for providing wired or wireless power to other devices. For example, in one implementation, the power distribution components 1858 may include a magnetic induction system which is adapted to provide wireless power to one or more handheld devices near the gaming system. In one implementation, a handheld device docking region may be provided which includes a power distribution component that is able to recharge a handheld device without requiring metal-to-metal contact.

In at least one embodiment, handheld device function control components 1862 may be operable to control operating mode selection functionality, features, and/or components associated with one or more handheld devices (e.g., 1850). In at least one embodiment, handheld device function control components 1862 may be operable to remotely control and/or configure components of one or more handheld devices 1850 based on various parameters and/or upon detection of specific events or conditions such as, for example: time of day, player activity levels; location of the handheld device; identity of handheld device user; user input; system override (e.g., emergency condition detected); proximity to other devices belonging to same group or association; proximity to specific objects, regions, zones, etc. For example, in at least one embodiment, handheld device function control components 1862 may include and on/off keying feature whereby the gaming system is able to selectively control (e.g., via remote activation/deactivation) the transmission of wireless data from one or more handheld devices. Thus, for example, at a game table where handheld devices are being used by multiple players at the game table to convey their game play instructions, the game table may be operable to enable a selected handheld device (e.g., associated with a specific player) to transmit player input data only at times when it is that player's turn to play or provide input, and may further be operable to prevent the selected handheld device from transmitting player input data during other times when it is not that player's turn to play or provide input.

In at least one embodiment, motion/gesture analysis and interpretation component(s) 1864 may be operable to analyze and/or interpret information relating to detected player movements and/or gestures in order, for example, to determine appropriate player input information relating to the detected player movements and/or gestures.

In other embodiments (not shown) other peripheral devices include: player tracking devices, card readers, bill validator/paper ticket readers, etc. Such devices may each comprise resources for handling and processing configuration indicia such as a microcontroller that converts voltage levels for one or more scanning devices to signals provided to processor 1810. In one embodiment, application software for interfacing with peripheral devices 1822 may store instructions (such as, for example, how to read indicia from a portable device) in a memory device such as, for example, non-volatile memory, hard drive or a flash memory.

In at least one implementation, the gaming system may include card readers such as used with credit cards, or other identification code reading devices to allow or require player identification in connection with play of the card game and associated recording of game action. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA™, MASTERCARD™, banks and/or other institutions.

The gaming system may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's handheld device.

It will be apparent to those skilled in the art that other memory types, including various computer readable media, may be used for storing and executing program instructions pertaining to the operation of various gaming systems described herein. Because such information and program instructions may be employed to implement the systems/methods described herein, example embodiments may relate to machine-readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Example embodiments may also be embodied in transmission media such as a carrier wave traveling over an appropriate medium such as airwaves, optical lines, electric lines, etc. Examples of program instructions include both machine code, such as produced by a compiler, and files including higher level code that may be executed by the computer using an interpreter.

According to specific embodiments, at least some embodiments of various gaming devices, gaming machines, and/or gaming systems described herein (including, for example, various handheld or mobile devices described herein), may be implemented with special features and/or additional circuitry that differentiate such gaming devices, gaming machines, and/or gaming systems from general-purpose computers (e.g., desktop PC's and laptops). For example, gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. For purposes of illustration, a description of gaming machines relative to general-purpose computing machines and some examples of the additional (or different) components and features found in gaming machines are described below. It is noted that such description may also be applicable for describing differences between general-purpose computing devices/systems, and gaming devices/systems described herein.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed has been stored. This feature allows the game to recover operation to the current state of play in the event of a malfunction, loss of power, etc that occurred just prior to the malfunction. In at least one embodiment, the gaming machine is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the gaming machine memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas it is which the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve gaming machine critical data, although other types of non-volatile memory devices may be employed. These memory devices are typically not used in typical general-purpose computers.

Thus, in at least one embodiment, the gaming machine is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of gaming machine critical information) within a time period of 200 milliseconds (ms) or less. In at least one embodiment, the time period of 200 ms represents a maximum amount of time for which sufficient power may be available to the various gaming machine components after a power outage event has occurred at the gaming machine.

As described previously, the gaming machine may not advance from a first state to a second state until critical information that allows the first state to be reconstructed has been atomically stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Thus, for example, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758, 828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA serial interfaces provided by general-purpose computers. These interfaces may include, for example, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in at least one embodiment described herein are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of at least one embodiment described herein, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with at least one embodiment described herein are described, for example, in U.S. Pat. No. 6,149,522, herein incorporated by reference in its entirety for all purposes.

Figure 17:
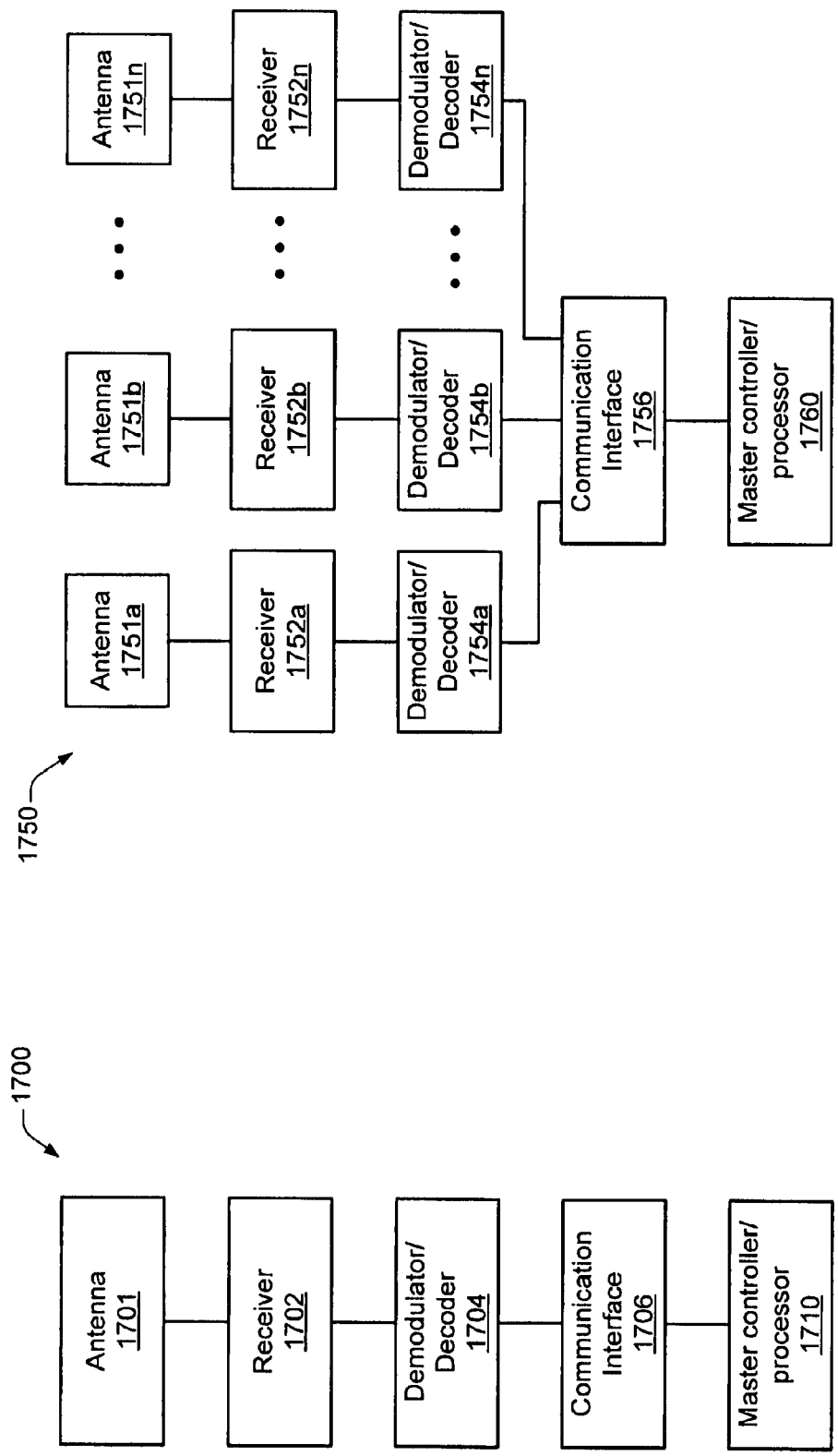
FIGS. 17A and 17B illustrate different example embodiments of receiver systems which may be utilized in one or more gaming systems described herein.

FIGS. 17A and 17B illustrate different example embodiments of receiver systems which may be utilized in one or more gaming systems described herein.

For example, as illustrated in FIG. 17A, receiver system portion 1700 may include an antenna 1701 and receiver 1702 operable for receiving wireless data communications from one or more handheld devices (and/or other wireless devices). According to different embodiments, receiver 1702 may be operable to receive wireless data which has been transmitted using a variety of different wireless communication protocols and/or modulation schemes (such as those described herein). In one embodiment, output from receiver 1702 may be provided to demodulator/decoder 1704, which may be operable to identify and/or extract various types of data which have been embedded or encoded in received wireless communication signals. In one embodiment, output from demodulator/decoder 1704 may be provided, e.g., via communication interface 1706, to a master controller 1710 (and/or other processor(s)) of a desired gaming system. In at least one embodiment, wireless communication with receiver system portion 1700 may be achieved using one or more of the following types of protocols and/or modulation schemes (and/or combinations thereof): CDMA, TDMA, FDMA, frequency modulation, amplitude modulation, baseband modulation, etc. As illustrated in FIG. 17B, receiver system portion 1750 may include one or more antennas 1751a-n and one or more receivers 1752a-n operable for receiving wireless data communications from one or more handheld devices (and/or other wireless devices). According to different embodiments, receivers 1752a-n may be operable to receive wireless data which has been transmitted using a variety of different wireless communication protocols and/or modulation schemes (such as those described herein). Additionally, the use of multiple receivers allows for simultaneous reception of multiple different wireless communication signals (e.g., sent from different handheld devices).

In one embodiment, output from receivers 1752a-n may be provided to demodulator/decoders 1754a-n, which may be operable to identify and/or extract various types of data which have been embedded or encoded in received wireless communication signals. In one embodiment, output from demodulator/decoder 1754a-n may be provided, e.g., via communication interface 1756, to a master controller 1760 (and/or other processor(s)) of a desired gaming system. In at least one embodiment, wireless communication with receiver system portion 1750 may be achieved using one or more of the following types of protocols and/or modulation schemes (and/or combinations thereof): CDMA, TDMA, FDMA, frequency modulation, amplitude modulation, baseband modulation, etc.

It will be appreciated that the various components features and capabilities of the different handheld device embodiments described herein may also be incorporated into different gaming system embodiments in order to provide such gaming system and embodiments with similar features and/or capabilities.

Additionally, it will be appreciated that the various embodiments of the handheld devices, gaming systems, non-contact interfaces, and/or motion/gesture interpretation techniques described herein may be utilized in a variety of different gaming environments, and may be operable to provide a variety of benefits and/or advantages.

For example, in at least one embodiment, the handheld device may enable a players (or other user) to intuitively scroll and navigate menus of handheld devices by simply tilting the device in one or more directions. For example, in one embodiment, a player may use the handheld device to easily navigate and access game information such as, for example, game menus, game set-up options, paytables, help menus, casino amenities (such as, for example, concierge, hotel and/or restaurant services, etc.), etc. For example, in one embodiment when a player views a game theme menu on the handheld device display, instructions may be displayed to the user to move the handheld device in different directions in order to access different features/information. For example, in one embodiment, instructions at the handheld device may direct the user to tilt the handheld device to the left to view each game's paytable, tilt the handheld device to the right to view game set-up options, tilt the handheld device down to access the casino's hospitality menu to order food or beverages, etc.

Another advantage of various handheld device embodiments described herein is that it may allow players to intuitively navigate within a game environment by moving their handheld device. For example, in one embodiment, a bonus round, for instance, may be designed so that a player navigates (along a three dimensional path) by tilting their device in various directions to view bonus choices.

At least some embodiments described herein may be especially advantageous for use in Server Based System environments. Additionally, various embodiments described herein may be used to resolve the search-frustration associated with conventional menu display techniques which involve drilling down through multiple pages or layers of information rich environments.

Another advantage is that various embodiments may be utilized to eliminate the costs, complexities and operability lifetime issues associated with conventional input mechanisms such as, for example buttons, keypads, styluses, thumb mice, jog wheels and/or similar navigational hardware.

Other advantages relate to improved security and improved player tracking session data acquisition. For example, conventional techniques for receiving and/or verifying player game play instructions at game tables often rely upon a human (e.g., dealer, croupier, casino employee, etc.) to interpret the movements or gestures of a player. Such human interpretation is subjective in nature, and introduces security issues as well as auditing issues. For example, a player and a dealer may conspire to cheat at a game table by allowing the dealer to subjectively interpret the player's game play gestures in a manner which results in increased winnings to that player. Such cheating techniques are difficult to detect and track using conventional surveillance mechanisms. Moreover, conventional casino surveillance mechanisms typically do not have the capability of automatically determining player instructions based upon the detection and interpretation of player movements/gestures. Rather, most conventional casino surveillance mechanisms involve the use of multiple video surveillance cameras which capture and store video feeds of selected activities occurring throughout the casino. Typically, in order to perform an audit of gaming activities occurring at a particular gaming station, a human operator is required to access, playback, and visually observe the captured video feeds relating to the event(s) to be audited. Accordingly, it will be appreciated that such conventional casino surveillance techniques typically require relatively large amounts of human resources. Additionally, because there is no automated process of detecting and indexing player movements/gestures for subsequent analysis, the task of locating, accessing and viewing a desired video feed (e.g., which shows a player's movements during a specific gaming activity) may also consume a great deal of resources which, for example, may involve a human visually scanning through minutes or hours of recorded video feeds in order to identify the desired video feed portion(s) of interest.

However, various embodiments described herein may be utilized to overcome many of the problems and disadvantages associated with conventional casino surveillance, security and/or auditing techniques. For example, in at least one embodiment, a player's movements and/or gestures may automatically be detected and recorded. In some embodiments, a handheld device may be operable to detect and record meaningful gestures and/or other movements performed by a player (e.g., who is using the handheld device). In other embodiments, a gaming system may be operable to detect and record meaningful gestures and/or other movements performed by a player.

In at least one embodiment, the recorded player movement/gesture information may be stored in a database along with other information (e.g., contemporaneous information such as, for example, timestamp information, player location information, game state information, etc.) which may be used, for example, to facilitate subsequent access, retrieval and/or analysis of the player movement/gesture information.

For example, according to one embodiment, a handheld device may be operable to store the player movement/gesture information at a local "player activity" database. In one embodiment, information from the "player activity" database may be periodically downloaded (e.g., via a manual process and/or an automated process) from the handheld device to a remote system such as, for example, a casino game play surveillance system. In another embodiment, a gaming system (e.g., 1404) may be operable to receive the player movement/gesture information from the handheld device and forward (e.g., via a manual process and/or an automated process) at least a portion of the player movement/gesture information to a remote system such as, for example, a casino game play surveillance system.

Additionally, in at least one embodiment, player instruction information (which, for example, has been generated based upon a player's detected movements and/or gestures) may automatically be determined and recorded. For example, in one embodiment, the handheld device may be operable to determine a player's instructions (e.g., game play instructions, wager instructions, etc) based on gestures and/or other movements performed by a player using a handheld device. In at least one embodiment, the player instruction information may be stored in a database along with other information (e.g., contemporaneous information such as, for example, timestamp information, player location information, game state information, etc.) which may be used, for example, to facilitate subsequent access, retrieval and/or analysis of the player movement/gesture information.

For example, according to one embodiment, a handheld device may be operable to store a player's game play instruction information (and/or other desired information) at a local "player instruction" database. In one embodiment, information from the "player instruction" database may be periodically downloaded (e.g., via a manual process and/or an automated process) from the handheld device to a remote system such as, for example, a casino game play surveillance system. In another embodiment, a gaming system (e.g., 1404) may be operable to receive the player's game play instruction information from the handheld device and forward (e.g., via a manual process and/or an automated process) at least a portion of the player's game play instruction information to a remote system such as, for example, a casino game play surveillance system for storage and analysis (if desired).

Additionally, because the player's movements, gestures, and/or instructions may be automatically detected and interpreted, such information may be automatically indexed and stored in a manner which allows such information to be easily accessed and/or retrieved using various types of automated database queries, Further, it will be appreciated that various techniques described herein enable automatic and substantially objective detection and/or interpretation of a player's movements, gestures, and/or instructions. Such features may result in increased security and/or increased fraud prevention. For example, in at least one embodiment, advancement of the game state at a gaming system may be based on a player's instructions which has been provided via a handheld device (as described in various embodiments herein) based upon an objective interpretation of the player's movements/gestures. Such a feature helps to reduce the occurrence of cheating or fraud at the gaming system. For example, by providing a mechanism for objectively interpreting a player's movements/gestures/instructions, one may eliminate the use of a dealer to subjectively interpret the player's game play gestures in a manner which results in increased winnings to that player, thereby reducing or eliminating cheating which may occur as a result of a player and a dealer conspiring together.

Another advantage of the techniques described herein relates to increased accuracy in table game state tracking, and/or player session tracking. For example, in at least some embodiments where advancement of the game state at a game table be based on player instructions provided via each player's handheld device, the current game state at the game table may be automatically determined and tracked. Additionally, in such embodiments, game play and wager activities relating to each player at the game table may be automatically determined and tracked. Further, using at least some of the techniques described herein, game outcomes and/or individual player outcomes may be automatically determined and tracked. In addition, payment of wins and/or collection of losses may be more accurately and automatically determined and tracked.

Another advantage of the various techniques described herein is that it helps to reduce the various activities and/or tasks typically required to be performed by dealers and/or other game table operators. As a result, the skill sets typically required by the casino of their dealers and/or other game table operators may be reduced. Additionally, by automating various activities at the game table, dealers and/or other casino operators are able to focus their attention on other matters, such as, for example, increased player interaction. Further, another advantage of automating various activities at game tables is that it allows for more games to be played for a given time period, thereby resulting in increased revenue for the casino.

Another advantage of the techniques described herein relates to the ability to retain the "look and feel" of traditional game play activities. For example, in embodiments where the handheld device is implemented as a wearable device (such as, for example, a wrist watch, a bracelet, a ring, and/or other items which may be worn on a player's hand, wrist or arm), various automated mechanisms described herein (e.g., player movement/gesture detection mechanisms, player instruction interpretation mechanisms, etc.) may be implemented in a manner which is transparent to the player, thereby allowing game play to closely resemble that of conventional or traditional game play.

Another advantage of the techniques described herein relates to the ability to automatically and dynamically adapt to changing conditions at a given gaming system. For example, in at least some embodiments the handheld device is able to dynamically change its State of operation based upon a currently active game type being played at the gaming system. As a result, the gaming system is not limited by the constraints of the handheld device, and may dynamically change its currently active game type from one game type to another, as desired.

Other System Embodiments

Figure 15:
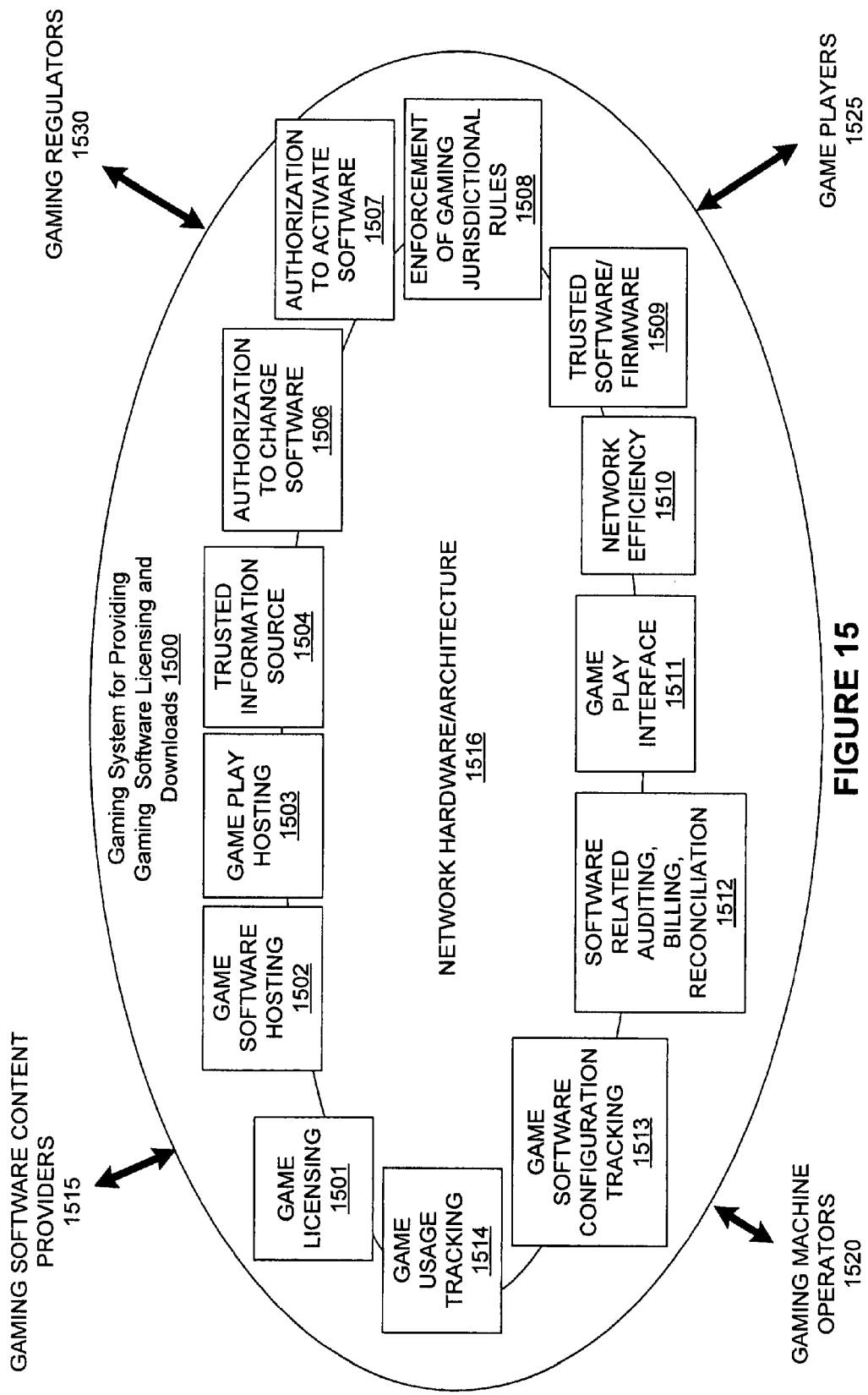
FIG. 15 shows a block diagram illustrating components of a gaming system 1500 which may be used for implementing various aspects of example embodiments.

FIG. 15 shows a block diagram illustrating components of a gaming system 1500 which may be used for implementing various aspects of example embodiments. In FIG. 15, the components of a gaming system 1500 for providing game software licensing and downloads are described functionally. The described functions may be instantiated in hardware, firmware and/or software and executed on a suitable device. In the system 1500, there may be many instances of the same function, such as multiple game play interfaces 1511. Nevertheless, in FIG. 15, only one instance of each function is shown. The functions of the components may be combined. For example, a single device may comprise the game play interface 1511 and include trusted memory devices or sources 1509.

The gaming system 1500 may receive inputs from different groups/entities and output various services and or information to these groups/entities. For example, game players 1525 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1500, receive revenue for the use of their software and compensate the gaming machine operators. The gaming regulators 1530 may provide rules and regulations that must be applied to the gaming system and may receive reports and other information confirming that rules are being obeyed.

In the following paragraphs, details of each component and some of the interactions between the components are described with respect to FIG. 15. The game software license host 1501 may be a server connected to a number of remote gaming devices that provides licensing services to the remote gaming devices. For example, in other embodiments, the license host 1501 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1514 may track the usage of game software on a plurality of devices in communication with the host. The game usage-tracking host 1514 may be in communication with a plurality of game play hosts and gaming machines. From the game play hosts and gaming machines, the game usage tracking host 1514 may receive updates of an amount that each game available for play on the devices has been played and on amount that has been wagered per game. This information may be stored in a database and used for billing according to methods described in a utility based licensing agreement.

The game software host 1502 may provide game software downloads, such as downloads of game software or game firmware, to various devious in the game system 1500. For example, when the software to generate the game is not available on the game play interface 1511, the game software host 1502 may download software to generate a selected game of chance played on the game play interface. Further, the game software host 1502 may download new game content to a plurality of gaming machines via a request from a gaming machine operator.

In one embodiment, the game software host 1502 may also be a game software configuration-tracking host 1513. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with example embodiments are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1503 may be a host server connected to a plurality of remote clients that generates games of chance that are displayed on a plurality of remote game play interfaces 1511. For example, the game play host device 1503 may be a server that provides central determination for a bingo game play played on a plurality of connected game play interfaces 1511. As another example, the game play host device 1503 may generate games of chance, such as slot games or video card games, for display on a remote client. A game player using the remote client may be able to select from a number of games that are provided on the client by the host device 1503. The game play host device 1503 may receive game software management services, such as receiving downloads of new game software, from the game software host 1502 and may receive game software licensing services, such as the granting or renewing of software licenses for software executed on the device 1503, from the game license host 1501.

In particular embodiments, the game play interfaces or other gaming devices in the gaming system 1500 may be portable devices, such as electronic tokens, cell phones, smart cards, tablet PC's and PDA's. The portable devices may support wireless communications and thus, may be referred to as wireless mobile devices. The network hardware architecture 1516 may be enabled to support communications between wireless mobile devices and other gaming devices in gaming system. In one embodiment, the wireless mobile devices may be used to play games of chance.

The gaming system 1500 may use a number of trusted information sources. Trusted information sources 1504 may be devices, such as servers, that provide information used to authenticate/activate other pieces of information. CRC values used to authenticate software, license tokens used to allow the use of software or product activation codes used to activate to software are examples of trusted information that might be provided from a trusted information source 1504. Trusted information sources may be a memory device, such as an EPROM, that includes trusted information used to authenticate other information. For example, a game play interface 1511 may store a private encryption key in a trusted memory device that is used in a private key-public key encryption scheme to authenticate information from another gaming device.

When a trusted information source 1504 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1500 of example embodiments may include devices 1506 that provide authorization to download software from a first device to a second device and devices 1507 that provide activation codes or information that allow downloaded software to be activated. The devices, 1506 and 1507, may be remote servers and may also be trusted information sources. One example of a method of providing product activation codes that may be used with example embodiments is describes in previously incorporated U.S. Pat. No. 6,264,561.

A device 1506 that monitors a plurality of gaming devices to determine adherence of the devices to gaming jurisdictional rules 1508 may be included in the system 1500. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1500 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 1516 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 1510 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 1512. For example, a software licensing billing server may generate a bill for a gaming device operator based upon a usage of games over a time period on the gaming devices owned by the operator. In another example, a software auditing server may provide reports on game software downloads to various gaming devices in the gaming system 1500 and current configurations of the game software on these gaming devices.

At particular time intervals, the software auditing server 1512 may also request software configurations from a number of gaming devices in the gaming system. The server may then reconcile the software configuration on each gaming device. In one embodiment, the software auditing server 1512 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 15. Many of the interactions are coupled. For example, methods used for game licensing may affect methods used for game downloading and vice versa. For the purposes of explanation, details of a few possible interactions between the components of the system 1500 relating to software licensing and software downloads have been described. The descriptions are selected to illustrate particular interactions in the game system 1500. These descriptions are provided for the purposes of explanation only and are not intended to limit the scope of example embodiments described herein.

Techniques and mechanisms of the present invention will sometimes be described in singular form for clarity. However, it should be noted that particular embodiments include multiple iterations of a technique or multiple instantiations of a mechanism unless noted otherwise.

Additional details relating to various aspects of gaming technology are described in U.S. patent application Ser. No. 11/825,481, by Mattice, et al., entitled "GESTURE CONTROLLED CASINO GAMING SYSTEM," filed concurrently herewith, the entirety of which is incorporated herein by reference for all purposes.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A gaming system in a casino gaming network, comprising:
   a gaming controller;
   a memory;
   at least one interface configured to communicate with at least one other device in the gaming network;
   a first gesture input interface device configured to detect movements of the first gesture input interface device associated with one or more persons, wherein the first gesture input interface device is included within a first mobile handheld device in communication with the gaming controller; and
   a first gesture interpretation component configured to identify selected movements or gestures detected by the first gesture input interface device and to generate gesture interpretation information relating to interpretation of the selected movements or gestures,
   wherein the gaming system is configured to:
      detect one or more identification gestures by a first player via the first gesture input interface, wherein the one or more identification gestures are detected by the first gesture input interface device and comprise movement of the first gesture input interface device,
      determine an identity of the first player based on the detected one or more identification gestures,
      detect a first gesture by the first player participating in a first game session at the gaming system, wherein the first gesture is detected by the first gesture input interface device, and wherein the first gesture comprises movement of the first gesture input interface device,
      interpret the first gesture with respect to a first set of criteria;
      generate gesture interpretation information relating to the interpretation of the first gesture,
      advance a state of the first game session using at least a portion of the gesture interpretation information, and
      communicate the advancement of the state of the first game session to the first player via the first mobile handheld device.

2. The gaming system of claim 1 wherein the gesture interpretation information includes a first portion of information selected from a group consisting of: game play instructions, wager instructions, command instructions for initiating execution of one or more commands, and function instructions for initiating execution of one or more functions.

3. The gaming system of claim 1 wherein the first set of criteria includes a first portion of criteria selected from a group consisting of: criteria relating to one or more characteristics of the first gesture, game state criteria, location criteria, player profile criteria, player tracking criteria, player account criteria, gaming system status criteria, and game rule criteria.

4. The gaming system of claim 1 being further configured to:
   associate the first gesture with at least one first game play instruction relating to the first game session; and advance the state of the first game session in accordance with the at least one first game play instructions.

5. The gaming system of claim 1:
wherein the gaming system is further configured to associate the first gesture with at least one first game play instruction relating to the first game session;
wherein the gesture interpretation information includes information relating to the at least one first game play instruction relating to the first game session; and
wherein the gaming system is further configured to store at least a portion of the gesture interpretation information, including the information relating to the at least one first game play instruction, at a first data structure.

6. The gaming system of claim 1 being further configured to:
associate the first gesture with at least one first game play instruction relating to the first game session; and
store information relating to the at least one first game play instruction in a first data structure.

7. The gaming system of claim 1 being further configured to:
associate the first gesture with at least one first game play instruction relating to the first game session;
create a first player input/game state association which associates the at least one first game play instruction with the advance of the state of the first game session; and
store, in at least one data structure, information relating to the at least one first game play instruction, information relating to the advance of the state of the first game session, and information relating to the first player input/game state association.

8. The gaming system of claim 1 being further configured to:
verify an identity of the first player using information relating to detected movements of the first gesture input interface device associated with the first player.

9. The gaming system of claim 1 being further configured to:
generate first player movement profile information using information relating to detected movements of the first gesture input interface device associated with the first player;
compare the first gesture to the first player movement profile information; and
modify access to at least one game play feature provided by the gaming system based on the comparison of the first gesture to the first player movement profile information.

10. The gaming system of claim 1 being further configured to:
determine a current state of the first game session at the gaming system; and
interpret the first gesture based at least in part upon the current state of the first game session at the gaming system.

11. The gaming system of claim 1 being further configured to:
determine an active game type of the first game session at the gaming system; and
interpret the first gesture based at least in part upon the active game type of the first game session at the gaming system.

12. The gaming system of claim 1 being further configured to:
determine an active game theme of the first game session at the gaming system; and
interpret the first gesture based at least in part upon the active game theme of the first game session at the gaming system.

13. The gaming system of claim 1 being further configured to:
determine at least one rule associated with game play activity relating to the first game session; and
interpret the first gesture based at least in part upon the at least one rule.

14. The gaming system of claim 1 being further configured to:
associate the first gesture with a first game play instruction relating to the first game session; and
wherein the gesture interpretation information includes the first game play instruction.

15. The gaming system of claim 1 being further configured to:
record information describing the first gesture as part of a game history relating to the first game session.

16. The gaming system of claim 1 being further configured to:
record at least a portion of the gesture interpretation information as part of a game history relating to the first game session.

17. The gaming system of claim 1 wherein the first gesture includes a first movement of the first player.

18. The gaming system of claim 1 wherein the first gesture includes a first sequence of movements of the first player.

19. The gaming system of claim 1 further comprising a first game table.

20. The gaming system of claim 1 further comprising a first gaming machine.

21. The gaming system of claim 1, wherein the gaming system is configured or designed as a hand-held, mobile computing device.

22. A method for controlling a wager-based game played at a gaming system, the method comprising:
detecting one or more identification gestures by a first player participating in a first game session at the gaming system;
identifying the first player based on the detected one or more identification gestures;
automatically detecting a first gesture by the first player;
interpreting the first gesture with respect to a first set of criteria;
generating gesture interpretation information relating to the interpretation of the first gesture;
advancing a state of the first game session using at least a portion of the gesture interpretation information; and
communicating the advancement of the state of the first game session to the first player via a mobile, handheld device.

23. The method of claim 22 wherein the gesture interpretation information includes a first portion of information selected from a group consisting of: game play instructions, wager instructions, command instructions for initiating execution of one or more commands, and function instructions for initiating execution of one or more functions.

24. The method of claim 22 further comprising:
associating the first gesture with at least one first game play instruction relating to the first game session; and
advancing the state of the first game session in accordance with the at least one first game play instruction.

25. The method of claim 22, further comprising:
associating the first gesture with at least one first game play instruction relating to the first game session, wherein the gesture interpretation information includes information relating to the at least one first game play instruction relating to the first game session; and storing at least a portion of the gesture interpretation information, including the information relating to the at least one first game play instruction, at a first data structure.

26. The method of claim 22 further comprising:
associating the first gesture with at least one first game play instruction relating to the first game session; and
storing information relating to the at least one first game play instruction in a first data structure.

27. The method of claim 22 further comprising:
associating the first gesture with at least one first game play instruction relating to the first game session;
creating a first player input/game state association which associates the at least one first game play instruction with the advance of the state of the first game session; and
storing, in at least one data structure, information relating to the at least one first game play instruction, information relating to the advance of the state of the first game session, and information relating to the first player input/game state association.

28. The method of claim 22 further comprising:
verifying an identity of the first player using information relating to detected movements of the first gesture input interface device associated with the first player.

29. The method of claim 22 further comprising:
generating first player movement profile information using information relating to detected movements of the first gesture input interface device associated with the first player;
comparing the first gesture to the first player movement profile information; and
modifying access to at least one game play feature at the gaming system in response to the comparison of the first gesture to the first player movement profile information.

30. The method of claim 22 further comprising:
determining a current state of the first game session at the gaming system; and
interpreting the first gesture based at least in part upon the current state of the first game session at the gaming system.

31. The method of claim 22 further comprising:
determining an active game type of the first game session at the gaming system; and
interpreting the first gesture based at least in part upon the active game type of the first game session at the gaming system.

32. The method of claim 22 further comprising:
determining an active game theme of the first game session at the gaming system; and
interpreting the first gesture based at least in part upon the active game theme of the first game session at the gaming system.

33. The method of claim 22 further comprising:
determining at least one rule associated with game play activity relating to the first game session; and
interpreting the first gesture based at least in part upon the at least one rule.

34. The method of claim 22 further comprising:
associating the first gesture with a first game play instruction relating to the first game session;
including the first game play instruction in the gesture interpretation information.

35. The method of claim 22 further comprising:
recording information describing the first gesture as part of a game history relating to the first game session.

36. The method of claim 22 further comprising:
recording at least a portion of the gesture interpretation information as part of a game history relating to the first game session.

37. The method of claim 22 wherein the first gesture includes a first movement of the first player.

38. The method of claim 22 wherein the first gesture includes a first sequence of movements of the first player.

39. A system for controlling a wager-based game played at a gaming system, the system comprising:
a gaming controller configured to provide a wager-based game;
a gesture input interface device configured to detect:
a first gesture by a first player participating in a first game session of the wager-based game, and
one or more identification gestures by the first player; and
a gesture interpretation component configured to:
identify the first gesture with respect to a first set of criteria, and
identify the one or more identification gestures with respect to a set of identification criteria;
generate gesture interpretation information relating to the interpretation of the first gesture, and
generate identification gesture interpretation information relating to the interpretation of the one or more identification gestures;
wherein the gaming controller is configured to:
determine an identity of the first player using the identification gesture information,
advance a state of the first game session using at least a portion of the gesture interpretation information,
associate the first gesture with at least one first game play instruction relating to the first game session,
store information relating to the at least one first game play instruction at a first data structure, and
communicate the advancement of the state of the first game session to the first player via a first mobile handheld device.

40. A mobile hand-held device for use in a casino gaming network, comprising:
a gaming controller;
a memory;
at least one interface configured to communicate with at least one other device in the gaming network;
a first gesture input interface device configured to detect movements of the first gesture input interface device associated with one or more persons, wherein the first gesture input interface device is included within a first mobile handheld device in communication with the gaming controller; and
a first gesture interpretation component configured to identify selected movements or gestures detected by the first gesture input interface device and generate gesture interpretation information relating to interpretation of the selected movements or gestures;
wherein the mobile hand-held device is configured to:
detect one or more identification gestures by a first player participating in a first game session provided by the hand-held device via the first gesture input interface, wherein the one or more identification gestures are detected by the first gesture input interface device and comprise movement of the first gesture input interface device,
determine an identity of the first player using information relating to the detected one or more identification gestures, detect a first gesture by the first player, wherein the first gesture is detected by the first gesture input interface device, and wherein the first gesture comprises movement of the first gesture input interface device;

interpret the first gesture with respect to a first set of criteria;

generate gesture interpretation information relating to the interpretation of the first gesture;

advance a state of the first game session using at least a portion of the gesture interpretation information; and communicate the advancement of the state of the first game session to the first player via the first mobile handheld device.

41. The hand-held device of claim 40 wherein the gesture interpretation information includes a first portion of information selected from a group consisting of: game play instructions, wager instructions, command instructions for initiating execution of one or more commands, and function instructions for initiating execution of one or more functions.

42. The hand-held device of claim 40 wherein the first set of criteria includes a first portion of criteria selected from a group consisting of: criteria relating to one or more characteristics of the first gesture, game state criteria, location criteria, player profile criteria, player tracking criteria, player account criteria, hand-held device status criteria, and game rule criteria.

43. The hand-held device of claim 40 being further configured to:
associate the first gesture with at least one first game play instruction relating to the first game session; and
advance the state of the first game session in accordance with the at least one first game play instructions.

44. The hand-held device of claim 40:
wherein the hand-held device is further configured to associate the first gesture with at least one first game play instruction relating to the first game session;
wherein the gesture interpretation information includes information relating to the at least one first game play instruction relating to the first game session; and
wherein the hand-held device is further configured to store at least a portion of the gesture interpretation information, including the information relating to the at least one first game play instruction, at a first data structure.

45. The hand-held device of claim 40 being further configured to:
associate the first gesture with at least one first game play instruction relating to the first game session; and
store information relating to the at least one first game play instruction in a first data structure.

46. The hand-held device of claim 40 being further configured to:
associate the first gesture with at least one first game play instruction relating to the first game session;
create a first player input/game state association which associates the at least one first game play instruction with the advance of the state of the first game session; and
store, in at least one data structure, information relating to the at least one first game play instruction, information relating to the advance of the state of the first game session, and information relating to the first player input/game state association.

47. The hand-held device of claim 40 being further configured to:
verify an identity of the first player using information relating to detected movements of the first gesture input interface device associated with the first player.

48. The hand-held device of claim 40 being further configured to:
generate first player movement profile information using information relating to detected movements of the first gesture input interface device associated with the first player;
compare the first gesture to the first player movement profile information; and
modify access to at least one game play feature provided by the hand-held device based on the comparison of the first gesture to the first player movement profile information.

49. The hand-held device of claim 40 being further configured to:
determine a current state of the first game session at the hand-held device; and
interpret the first gesture based at least in part upon the current state of the first game session at the hand-held device.

50. The hand-held device of claim 40 being further configured to:
determine an active game type of the first game session at the hand-held device; and
interpret the first gesture based at least in part upon the active game type of the first game session at the hand-held device.

51. The hand-held device of claim 40 being further configured to:
determine an active game theme of the first game session at the hand-held device; and
interpret the first gesture based at least in part upon the active game theme of the first game session at the hand-held device.

52. The hand-held device of claim 40 being further configured to:
determine at least one rule associated with game play activity relating to the first game session; and
interpret the first gesture based at least in part upon the at least one rule.

53. The hand-held device of claim 40 being further configured to:
associate the first gesture with a first game play instruction relating to the first game session; and
wherein the gesture interpretation information includes the first game play instruction.

54. The hand-held device of claim 40 being further configured to:
record information describing the first gesture as part of a game history relating to the first game session.

55. The hand-held device of claim 40 being further configured to:
record at least a portion of the gesture interpretation information as part of a game history relating to the first game session.

56. The hand-held device of claim 40 wherein the first gesture includes a first movement of the first player.

57. The hand-held device of claim 40 wherein the first gesture includes a first sequence of movements of the first player.

* * * * *